(12) United States Patent
Björsell et al.

(10) Patent No.: US 9,565,307 B2
(45) Date of Patent: *Feb. 7, 2017

(54) EMERGENCY ASSISTANCE CALLING FOR VOICE OVER IP COMMUNICATIONS SYSTEMS

(71) Applicant: VOIP-PAL.COM, INC., Bellevue, WA (US)

(72) Inventors: Johan Emil Viktor Björsell, Vancouver (CA); Maksym Sobolyev, New Warminster (CA)

(73) Assignee: VOIP-PAL.COM, INC., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/968,217

(22) Filed: Aug. 15, 2013

(65) Prior Publication Data

US 2013/0329864 A1    Dec. 12, 2013

Related U.S. Application Data

(63) Continuation of application No. 12/532,989, filed as application No. PCT/CA2008/000545 on Mar. 20, 2008, now Pat. No. 8,537,805.

(Continued)

(51) Int. Cl.
   *H04W 4/22*      (2009.01)
   *H04M 3/51*      (2006.01)
   (Continued)

(52) U.S. Cl.
   CPC ........ *H04M 3/5116* (2013.01); *H04L 65/1069* (2013.01); *H04L 65/40* (2013.01); *H04M 7/006* (2013.01); *H04M 2242/04* (2013.01)

(58) Field of Classification Search
   None
   See application file for complete search history.

(56) References Cited

U.S. PATENT DOCUMENTS 4,747,124 A    5/1988  Ladd
4,916,491 A    4/1990  Katoh
(Continued)

FOREIGN PATENT DOCUMENTS

BR    PI 0718312-7 A2    11/2013
BR    PI 0719682-2 A2    1/2014
(Continued)

OTHER PUBLICATIONS

Handley et al. "SIP: Session Initiation Protocol", RFC 2543, Mar. 1999, pp. 19-20.*

(Continued)

*Primary Examiner* — Gregory Sefcheck
*Assistant Examiner* — Jenkey Van
(74) *Attorney, Agent, or Firm* — Knobbe Martens Olson & Bear LLP

(57) ABSTRACT

In accordance with one aspect of the invention, a process for handling emergency calls from a caller in a voice over IP system is described. The process involves receiving a routing request message including a caller identifier and a callee identifier. The process also involves setting an emergency call flag active in response to the callee identifier matching an emergency call identifier pre-associated with the caller. The process further involves producing an emergency response center identifier in response to the emergency call identifier. The process also involves determining whether the caller identifier is associated with a pre-associated direct inward dialing (DID) identifier. The process further involves producing a direct inward dialing (DID) identifier for the caller by associating a temporary DID identifier with the (Continued)

caller identifier when the emergency call flag is active and it is determined that the caller has no pre-associated DID. The process also involves producing a routing message including the emergency response center identifier and the temporary DID identifier for receipt by a routing controller operable to cause a route to be established between the caller and the emergency response center.

41 Claims, 22 Drawing Sheets

Related U.S. Application Data

(60) Provisional application No. 60/907,224, filed on Mar. 26, 2007.

(51) Int. Cl.
*H04M 7/00* (2006.01)
*H04L 29/06* (2006.01)

(56) References Cited

U.S. PATENT DOCUMENTS

| | | |
|---|---|---|
| 4,992,971 A | 2/1991 | Hayashi |
| 5,146,491 A | 9/1992 | Silver et al. |
| 5,247,571 A | 9/1993 | Kay et al. |
| 5,303,297 A | 4/1994 | Hillis |
| 5,325,421 A | 6/1994 | Hou et al. |
| 5,359,642 A | 10/1994 | Castro |
| 5,425,085 A | 6/1995 | Weinberger et al. |
| 5,440,621 A | 8/1995 | Castro |
| 5,454,030 A | 9/1995 | de Oliveira et al. |
| 5,469,497 A | 11/1995 | Pierce et al. |
| 5,506,893 A | 4/1996 | Buscher et al. |
| 5,519,769 A | 5/1996 | Weinberger et al. |
| 5,559,871 A | 9/1996 | Smith |
| 5,590,133 A | 12/1996 | Billstrom et al. |
| 5,608,786 A | 3/1997 | Gordon |
| 5,621,787 A | 4/1997 | McKoy et al. |
| 5,633,913 A | 5/1997 | Talarmo |
| 5,661,790 A | 8/1997 | Hsu |
| 5,677,955 A | 10/1997 | Doggett et al. |
| 5,712,907 A | 1/1998 | Wegner et al. |
| 5,719,926 A | 2/1998 | Hill |
| 5,722,067 A | 2/1998 | Fougnies et al. |
| 5,724,355 A | 3/1998 | Bruno et al. |
| 5,726,984 A | 3/1998 | Kubler et al. |
| 5,737,414 A | 4/1998 | Walker et al. |
| 5,742,596 A | 4/1998 | Baratz et al. |
| 5,751,961 A | 5/1998 | Smyk |
| 5,793,762 A | 8/1998 | Penners et al. |
| 5,799,072 A | 8/1998 | Vulcan et al. |
| 5,802,502 A | 9/1998 | Gell et al. |
| 5,825,863 A | 10/1998 | Walker |
| 5,828,740 A | 10/1998 | Khuc et al. |
| 5,838,682 A | 11/1998 | Dekelbaum et al. |
| 5,845,267 A | 12/1998 | Ronen |
| 5,850,433 A | 12/1998 | Rondeau |
| 5,864,610 A | 1/1999 | Ronen |
| 5,867,495 A | 2/1999 | Elliott et al. |
| 5,883,810 A | 3/1999 | Franklin et al. |
| 5,883,891 A | 3/1999 | Williams et al. |
| 5,889,774 A | 3/1999 | Mirashrafi et al. |
| 5,905,736 A | 5/1999 | Ronen et al. |
| 5,907,547 A | 5/1999 | Foladare et al. |
| 5,910,946 A | 6/1999 | Csapo |
| 5,915,005 A | 6/1999 | He |
| 5,915,093 A | 6/1999 | Berlin et al. |
| 5,917,899 A | 6/1999 | Moss et al. |
| 5,923,659 A | 7/1999 | Curry et al. |
| 5,930,343 A | 7/1999 | Vasquez |
| 5,937,045 A | 8/1999 | Yaoya et al. |
| 5,940,598 A | 8/1999 | Strauss et al. |
| 5,953,504 A | 9/1999 | Sokal et al. |
| 5,956,391 A | 9/1999 | Melen et al. |
| 5,970,477 A | 10/1999 | Roden |
| 5,974,043 A | 10/1999 | Solomon |
| 5,991,291 A | 11/1999 | Asai et al. |
| 5,991,378 A | 11/1999 | Apel |
| 6,005,870 A | 12/1999 | Leung et al. |
| 6,005,926 A | 12/1999 | Mashinsky |
| 6,014,379 A | 1/2000 | White et al. |
| 6,021,126 A | 2/2000 | White et al. |
| 6,029,062 A | 2/2000 | Hanson |
| 6,052,445 A | 4/2000 | Bashoura et al. |
| 6,058,300 A | 5/2000 | Hanson |
| 6,069,890 A | 5/2000 | White et al. |
| 6,073,013 A * | 6/2000 | Agre .................. H04B 7/18539 455/404.2 |
| 6,078,647 A | 6/2000 | D'Eletto |
| 6,104,704 A | 8/2000 | Buhler et al. |
| 6,104,711 A | 8/2000 | Voit |
| 6,115,737 A | 9/2000 | Ely et al. |
| 6,128,304 A | 10/2000 | Gardell et al. |
| 6,137,869 A | 10/2000 | Voit et al. |
| 6,141,404 A | 10/2000 | Westerlage et al. |
| 6,151,385 A * | 11/2000 | Reich ..................... H04M 3/42 379/45 |
| 6,173,272 B1 | 1/2001 | Thomas et al. |
| 6,188,752 B1 | 2/2001 | Lesley |
| 6,243,689 B1 | 6/2001 | Norton |
| 6,249,573 B1 | 6/2001 | Hudson |
| 6,282,574 B1 | 8/2001 | Voit |
| 6,298,062 B1 | 10/2001 | Gardell et al. |
| 6,327,351 B1 | 12/2001 | Walker et al. |
| 6,351,464 B1 | 2/2002 | Galvin et al. |
| 6,359,880 B1 | 3/2002 | Curry et al. |
| 6,430,275 B1 | 8/2002 | Voit et al. |
| 6,434,143 B1 | 8/2002 | Donovan |
| 6,445,694 B1 | 9/2002 | Swartz |
| 6,507,644 B1 | 1/2003 | Henderson et al. |
| 6,553,025 B1 | 4/2003 | Kung et al. |
| 6,560,224 B1 | 5/2003 | Kung et al. |
| 6,574,328 B1 | 6/2003 | Wood et al. |
| 6,597,686 B1 | 7/2003 | Smyk |
| 6,597,783 B1 | 7/2003 | Tada et al. |
| 6,603,977 B1 * | 8/2003 | Walsh .................. G01S 5/0009 379/45 |
| 6,636,833 B1 | 10/2003 | Flitcroft et al. |
| 6,650,641 B1 | 11/2003 | Albert et al. |
| 6,674,745 B1 | 1/2004 | Schuster et al. |
| 6,724,860 B2 | 4/2004 | Stumer et al. |
| 6,744,858 B1 * | 6/2004 | Ryan et al. ..................... 379/45 |
| 6,766,159 B2 | 7/2004 | Lindholm |
| 6,772,188 B1 | 8/2004 | Cloutier |
| 6,775,534 B2 | 8/2004 | Lindgren et al. |
| 6,785,266 B2 | 8/2004 | Swartz |
| 6,798,767 B1 | 9/2004 | Alexander et al. |
| 6,819,929 B2 | 11/2004 | Antonucci et al. |
| 6,873,599 B1 | 3/2005 | Han |
| 6,892,184 B1 | 5/2005 | Komem et al. |
| 6,934,279 B1 | 8/2005 | Sollee et al. |
| 6,937,713 B1 | 8/2005 | Kung et al. |
| 6,954,453 B1 | 10/2005 | Schindler et al. |
| 6,961,334 B1 | 11/2005 | Kaczmarczyk |
| 6,963,557 B2 | 11/2005 | Knox |
| 6,963,739 B2 | 11/2005 | Dorenbosch et al. |
| 6,985,440 B1 | 1/2006 | Albert et al. |
| 6,993,015 B2 | 1/2006 | Kobayashi |
| 7,006,508 B2 | 2/2006 | Bondy et al. |
| 7,010,727 B1 | 3/2006 | Stucker |
| 7,027,564 B2 | 4/2006 | James |
| 7,042,985 B1 * | 5/2006 | Wright .................. H04M 7/006 370/352 |
| 7,046,658 B1 | 5/2006 | Kundaje |
| 7,051,072 B2 | 5/2006 | Stewart et al. |
| 7,055,174 B1 | 5/2006 | Cope et al. |
| 7,068,668 B2 | 6/2006 | Feuer |
| 7,068,772 B1 | 6/2006 | Widger et al. |
| 7,079,526 B1 | 7/2006 | Wipliez et al. |
| 7,120,682 B1 | 10/2006 | Salama |
| 7,151,772 B1 | 12/2006 | Kalmanek, Jr. et al. |

(56) References Cited

U.S. PATENT DOCUMENTS

| | | |
|---|---|---|
| 7,174,156 B1 | 2/2007 | Mangal |
| 7,177,399 B2 | 2/2007 | Dawson et al. |
| 7,203,478 B2 | 4/2007 | Benco et al. |
| 7,212,522 B1 | 5/2007 | Shankar et |
| 7,218,722 B1 | 5/2007 | Turner et al. |
| 7,277,528 B2 | 10/2007 | Rao et al. |
| 7,330,835 B2 | 2/2008 | Deggendorf |
| 7,366,157 B1 * | 4/2008 | Valentine ............ H04M 3/5116 370/352 |
| 7,400,881 B2 | 7/2008 | Kallio |
| 7,426,492 B1 | 9/2008 | Bishop et al. |
| 7,436,835 B2 | 10/2008 | Castleberry et al. |
| 7,437,665 B2 | 10/2008 | Perham |
| 7,440,442 B2 | 10/2008 | Grabelsky et al. |
| 7,447,707 B2 | 11/2008 | Gaurav et al. |
| 7,454,200 B2 | 11/2008 | Cai et al. |
| 7,454,510 B2 | 11/2008 | Kleyman et al. |
| 7,486,664 B2 | 2/2009 | Swartz |
| 7,486,667 B2 | 2/2009 | Feuer |
| 7,486,684 B2 | 2/2009 | Chu et al. |
| 7,512,117 B2 | 3/2009 | Swartz |
| 7,565,131 B2 | 7/2009 | Rollender et al. |
| 7,573,982 B2 | 8/2009 | Breen et al. |
| 7,580,886 B1 | 8/2009 | Schulz |
| 7,587,036 B2 | 9/2009 | Wood et al. |
| 7,593,390 B2 | 9/2009 | Lebizay |
| 7,593,884 B2 | 9/2009 | Rothman et al. |
| 7,599,944 B2 | 10/2009 | Gaurav et al. |
| 7,639,792 B2 | 12/2009 | Qiu et al. |
| 7,644,037 B1 | 1/2010 | Ostrovsky |
| 7,647,500 B2 | 1/2010 | Machiraju et al. |
| 7,657,011 B1 | 2/2010 | Zielinski et al. |
| 7,664,495 B1 | 2/2010 | Bonner et al. |
| 7,676,215 B2 | 3/2010 | Chin et al. |
| 7,676,431 B2 | 3/2010 | O'Leary et al. |
| 7,680,114 B2 | 3/2010 | Yazaki et al. |
| 7,680,737 B2 | 3/2010 | Smith et al. |
| 7,702,308 B2 | 4/2010 | Rollender |
| 7,715,821 B2 | 5/2010 | Rollender |
| 7,734,544 B2 | 6/2010 | Schleicher |
| 7,738,384 B2 | 6/2010 | Pelletier |
| 7,764,777 B2 | 7/2010 | Wood et al. |
| 7,764,944 B2 | 7/2010 | Rollender |
| 7,765,261 B2 | 7/2010 | Kropivny |
| 7,765,266 B2 | 7/2010 | Kropivny |
| 7,774,711 B2 | 8/2010 | Valeski |
| 7,797,459 B1 | 9/2010 | Roy et al. |
| 7,882,011 B2 | 2/2011 | Sandhu et al. |
| 7,894,441 B2 | 2/2011 | Yazaki et al. |
| 7,899,742 B2 | 3/2011 | Berkert et al. |
| 7,907,551 B2 | 3/2011 | Croy et al. |
| 7,929,955 B1 | 4/2011 | Bonner |
| 7,944,909 B2 | 5/2011 | James |
| 7,950,046 B2 | 5/2011 | Kropivny |
| 7,958,233 B2 | 6/2011 | Gutierrez |
| 7,965,645 B2 | 6/2011 | Pelletier |
| 7,979,529 B2 | 7/2011 | Kreusch et al. |
| 7,995,589 B2 | 8/2011 | Sollee et al. |
| 8,024,785 B2 | 9/2011 | Andress et al. |
| 8,027,333 B2 | 9/2011 | Grabelsky et al. |
| 8,036,366 B2 | 10/2011 | Chu |
| 8,041,022 B1 | 10/2011 | Andreasen et al. |
| 8,050,273 B2 | 11/2011 | Gass |
| 8,060,887 B2 | 11/2011 | Kropivny |
| 8,078,164 B2 | 12/2011 | Ganesan |
| 8,111,690 B2 | 2/2012 | Hussain et al. |
| 8,116,307 B1 | 2/2012 | Thesayi et al. |
| 8,125,982 B2 | 2/2012 | Feuer |
| 8,127,005 B2 | 2/2012 | Gutierrez |
| 8,145,182 B2 | 3/2012 | Rudolf et al. |
| 8,161,078 B2 | 4/2012 | Gaurav et al. |
| 8,166,533 B2 | 4/2012 | Yuan |
| 8,166,547 B2 | 4/2012 | Bevan et al. |
| 8,189,568 B2 | 5/2012 | Qiu et al. |
| 8,190,739 B2 | 5/2012 | Gutierrez |
| 8,200,575 B2 | 6/2012 | Torres et al. |
| 8,204,044 B2 | 6/2012 | Lebizay |
| 8,219,115 B1 | 7/2012 | Nelissen |
| 8,223,927 B2 | 7/2012 | Di Serio et al. |
| 8,228,837 B2 | 7/2012 | Sheriff et al. |
| 8,228,897 B2 | 7/2012 | Mitchell |
| 8,243,730 B2 | 8/2012 | Wong et al. |
| 8,244,204 B1 | 8/2012 | Chen et al. |
| 8,275,404 B2 | 9/2012 | Berger et al. |
| 8,300,632 B2 | 10/2012 | Davis et al. |
| 8,306,063 B2 | 11/2012 | Erdal et al. |
| 8,315,521 B2 | 11/2012 | Leiden et al. |
| 8,363,647 B2 | 1/2013 | Fangman et al. |
| 8,364,172 B2 | 1/2013 | Guanfeng et al. |
| 8,396,445 B2 | 3/2013 | Crawford et al. |
| 8,410,907 B2 | 4/2013 | Twitchell, Jr. |
| 8,417,791 B1 | 4/2013 | Peretz et al. |
| 8,422,507 B2 | 4/2013 | Björsell et al. |
| 8,423,791 B1 | 4/2013 | Yu et al. |
| 8,427,981 B2 | 4/2013 | Wyss et al. |
| 8,437,340 B2 | 5/2013 | James |
| 8,462,915 B2 | 6/2013 | Breen et al. |
| 8,468,196 B1 | 6/2013 | Roskind et al. |
| 8,493,931 B1 | 7/2013 | Nix |
| 8,509,225 B2 | 8/2013 | Grabelsky et al. |
| 8,526,306 B2 | 9/2013 | Jungck et al. |
| 8,532,075 B2 | 9/2013 | Rassool et al. |
| 8,537,805 B2 | 9/2013 | Björsell et al. |
| 8,542,815 B2 | 9/2013 | Perreault et al. |
| 8,543,477 B2 | 9/2013 | Love et al. |
| 8,594,298 B2 | 11/2013 | Klein et al. |
| 8,599,747 B1 | 12/2013 | Saleem et al. |
| 8,599,837 B2 | 12/2013 | Kyle |
| 8,605,714 B2 | 12/2013 | Lebizay |
| 8,605,869 B1 | 12/2013 | Mobarak et al. |
| 8,607,323 B2 | 12/2013 | Yuan |
| 8,611,354 B2 | 12/2013 | Keränen et al. |
| 8,625,578 B2 | 1/2014 | Roy et al. |
| 8,627,211 B2 | 1/2014 | Kropivny |
| 8,630,234 B2 | 1/2014 | Björsell et al. |
| 8,634,838 B2 | 1/2014 | Hellwig et al. |
| 8,675,566 B2 | 3/2014 | Huttunen et al. |
| 8,682,919 B1 | 3/2014 | Golliher |
| 8,702,505 B2 | 4/2014 | Kropivny |
| 8,713,098 B1 | 4/2014 | Adya et al. |
| 8,724,643 B2 | 5/2014 | Feuer |
| 8,749,610 B1 | 6/2014 | Gossweiler et al. |
| 8,750,290 B2 | 6/2014 | Vance et al. |
| 8,763,081 B2 | 6/2014 | Bogdanovic et al. |
| 8,767,717 B2 | 7/2014 | Siegel et al. |
| 8,768,951 B2 | 7/2014 | Crago |
| 8,774,171 B2 | 7/2014 | Mitchell |
| 8,774,378 B2 | 7/2014 | Björsell et al. |
| 8,774,721 B2 | 7/2014 | Hertel et al. |
| 8,780,703 B1 | 7/2014 | Eidelson et al. |
| 8,792,374 B1 | 7/2014 | Jain et al. |
| 8,792,905 B1 | 7/2014 | Li et al. |
| 8,804,705 B2 | 8/2014 | Fangman et al. |
| 8,805,345 B2 | 8/2014 | Ling et al. |
| 8,810,392 B1 | 8/2014 | Teller et al. |
| 8,819,566 B2 | 8/2014 | Mehin et al. |
| 8,837,360 B1 | 9/2014 | Mishra et al. |
| 8,838,539 B1 | 9/2014 | Ashcraft et al. |
| 8,848,887 B2 | 9/2014 | Willman |
| 8,862,701 B2 | 10/2014 | Havriluk |
| 8,885,609 B2 | 11/2014 | Nix |
| 8,903,051 B2 | 12/2014 | Li et al. |
| 8,903,360 B2 | 12/2014 | Celi, Jr. et al. |
| 8,909,556 B2 | 12/2014 | Huxham |
| 8,938,209 B2 | 1/2015 | Crawford et al. |
| 8,938,534 B2 | 1/2015 | Le et al. |
| 8,948,061 B2 | 2/2015 | Sridhar |
| 8,972,612 B2 | 3/2015 | Le et al. |
| 8,982,719 B2 | 3/2015 | Seetharaman et al. |
| 8,995,428 B2 | 3/2015 | Haster |
| 9,003,306 B2 | 4/2015 | Mehin et al. |
| 9,137,385 B2 | 9/2015 | Björsell et al. |
| 9,143,608 B2 | 9/2015 | Björsell et al. |
| 9,154,417 B2 | 10/2015 | Huttunen et al. |

(56) References Cited

U.S. PATENT DOCUMENTS

| | | | |
|---|---|---|---|
| 9,179,005 B2 | 11/2015 | Perreault et al. | |
| 2001/0027478 A1 | 10/2001 | Meier et al. | |
| 2001/0052081 A1 | 12/2001 | McKibben et al. | |
| 2002/0002041 A1 | 1/2002 | Lindgren et al. | |
| 2002/0018445 A1 | 2/2002 | Kobayashi | |
| 2002/0051518 A1 | 5/2002 | Bondy et al. | |
| 2002/0057764 A1* | 5/2002 | Salvucci | H04M 3/51 379/37 |
| 2002/0116464 A1 | 8/2002 | Mak | |
| 2002/0122391 A1 | 9/2002 | Shalit | |
| 2002/0141352 A1 | 10/2002 | Fangman et al. | |
| 2003/0012196 A1 | 1/2003 | Ramakrishnan | |
| 2003/0043974 A1 | 3/2003 | Emerson, III | |
| 2003/0095539 A1 | 5/2003 | Feuer | |
| 2003/0179747 A1 | 9/2003 | Pyke et al. | |
| 2003/0200311 A1 | 10/2003 | Baum | |
| 2003/0219103 A1 | 11/2003 | Rao et al. | |
| 2004/0022237 A1 | 2/2004 | Elliot et al. | |
| 2004/0034793 A1 | 2/2004 | Yuan | |
| 2004/0157629 A1 | 8/2004 | Kallio et al. | |
| 2004/0165709 A1 | 8/2004 | Pence et al. | |
| 2004/0181599 A1 | 9/2004 | Kreusch et al. | |
| 2004/0202295 A1 | 10/2004 | Shen et al. | |
| 2004/0203565 A1 | 10/2004 | Chin et al. | |
| 2004/0203582 A1 | 10/2004 | Dorenbosch et al. | |
| 2004/0240439 A1 | 12/2004 | Castleberry et al. | |
| 2004/0255126 A1 | 12/2004 | Reith | |
| 2005/0007999 A1* | 1/2005 | Becker | H04L 69/329 370/352 |
| 2005/0025043 A1 | 2/2005 | Mussman et al. | |
| 2005/0063519 A1 | 3/2005 | James | |
| 2005/0069097 A1 | 3/2005 | Hanson et al. | |
| 2005/0083911 A1 | 4/2005 | Grabelsky et al. | |
| 2005/0094651 A1 | 5/2005 | Lutz et al. | |
| 2005/0131813 A1 | 6/2005 | Gallagher et al. | |
| 2005/0169248 A1 | 8/2005 | Truesdale et al. | |
| 2005/0171898 A1 | 8/2005 | Bishop et al. | |
| 2005/0174937 A1 | 8/2005 | Scoggins et al. | |
| 2005/0177843 A1 | 8/2005 | Williams | |
| 2005/0188081 A1 | 8/2005 | Gibson et al. | |
| 2005/0190892 A1 | 9/2005 | Dawson et al. | |
| 2005/0192897 A1 | 9/2005 | Rogers et al. | |
| 2005/0192901 A1 | 9/2005 | McCoy et al. | |
| 2005/0198499 A1 | 9/2005 | Salapaka et al. | |
| 2005/0202799 A1 | 9/2005 | Rollender | |
| 2005/0222952 A1 | 10/2005 | Garrett et al. | |
| 2005/0267842 A1 | 12/2005 | Weichert et al. | |
| 2005/0287979 A1 | 12/2005 | Rollender | |
| 2006/0006224 A1 | 1/2006 | Modi | |
| 2006/0007940 A1 | 1/2006 | Sollee et al. | |
| 2006/0013266 A1 | 1/2006 | Vega-Garcia et al. | |
| 2006/0030290 A1 | 2/2006 | Rudolf et al. | |
| 2006/0036522 A1 | 2/2006 | Perham | |
| 2006/0072547 A1 | 4/2006 | Florkey et al. | |
| 2006/0072550 A1 | 4/2006 | Davis et al. | |
| 2006/0078094 A1 | 4/2006 | Breen et al. | |
| 2006/0093135 A1 | 5/2006 | Fiatal et al. | |
| 2006/0095320 A1 | 5/2006 | Jones | |
| 2006/0109960 A1* | 5/2006 | D'Evelyn | H04W 4/22 379/37 |
| 2006/0111116 A1 | 5/2006 | Palmer et al. | |
| 2006/0116892 A1 | 6/2006 | Grimes et al. | |
| 2006/0142011 A1 | 6/2006 | Kallio | |
| 2006/0146797 A1 | 7/2006 | Lebizay | |
| 2006/0153342 A1 | 7/2006 | Sasaki | |
| 2006/0160565 A1 | 7/2006 | Singh et al. | |
| 2006/0177035 A1 | 8/2006 | Cope et al. | |
| 2006/0189303 A1 | 8/2006 | Rollender | |
| 2006/0195398 A1 | 8/2006 | Dheer et al. | |
| 2006/0205383 A1 | 9/2006 | Rollender et al. | |
| 2006/0209768 A1 | 9/2006 | Yan et al. | |
| 2006/0233317 A1* | 10/2006 | Coster | H04M 7/0075 379/45 |
| 2006/0248186 A1 | 11/2006 | Smith | |
| 2006/0251056 A1 | 11/2006 | Feuer | |
| 2006/0258328 A1 | 11/2006 | Godoy | |
| 2006/0264200 A1 | 11/2006 | Laiho et al. | |
| 2006/0268921 A1 | 11/2006 | Ekstrom et al. | |
| 2006/0281437 A1 | 12/2006 | Cook | |
| 2007/0016524 A1 | 1/2007 | Diveley et al. | |
| 2007/0036139 A1* | 2/2007 | Patel | H04L 65/4007 370/352 |
| 2007/0036143 A1 | 2/2007 | Alt et al. | |
| 2007/0047548 A1 | 3/2007 | Yazaki et al. | |
| 2007/0053382 A1 | 3/2007 | Bevan et al. | |
| 2007/0064919 A1 | 3/2007 | Chen et al. | |
| 2007/0092070 A1 | 4/2007 | Croy et al. | |
| 2007/0112964 A1 | 5/2007 | Guedalia et al. | |
| 2007/0115935 A1 | 5/2007 | Qiu et al. | |
| 2007/0121593 A1 | 5/2007 | Vance et al. | |
| 2007/0127676 A1 | 6/2007 | Khadri | |
| 2007/0174469 A1 | 7/2007 | Andress et al. | |
| 2007/0217354 A1 | 9/2007 | Buckley | |
| 2007/0220038 A1 | 9/2007 | Crago | |
| 2007/0253418 A1 | 11/2007 | Shiri et al. | |
| 2007/0253429 A1 | 11/2007 | James | |
| 2007/0263609 A1 | 11/2007 | Mitchell | |
| 2007/0297376 A1 | 12/2007 | Gass | |
| 2008/0013523 A1 | 1/2008 | Nambakkam | |
| 2008/0037715 A1 | 2/2008 | Prozeniuk et al. | |
| 2008/0056235 A1 | 3/2008 | Albina et al. | |
| 2008/0056243 A1 | 3/2008 | Roy et al. | |
| 2008/0056302 A1 | 3/2008 | Erdal et al. | |
| 2008/0063153 A1* | 3/2008 | Krivorot et al. | 379/45 |
| 2008/0160953 A1 | 7/2008 | Mia et al. | |
| 2008/0166999 A1 | 7/2008 | Guedalia et al. | |
| 2008/0167019 A1 | 7/2008 | Guedalia et al. | |
| 2008/0167020 A1 | 7/2008 | Guedalia et al. | |
| 2008/0167039 A1 | 7/2008 | Guedalia et al. | |
| 2008/0187122 A1 | 8/2008 | Baker | |
| 2008/0188198 A1 | 8/2008 | Patel et al. | |
| 2008/0188227 A1 | 8/2008 | Guedalia et al. | |
| 2008/0205378 A1 | 8/2008 | Wyss et al. | |
| 2008/0310599 A1 | 12/2008 | Purnadi et al. | |
| 2009/0003535 A1 | 1/2009 | Grabelsky et al. | |
| 2009/0017842 A1 | 1/2009 | Fukasaku | |
| 2009/0028146 A1 | 1/2009 | Kleyman et al. | |
| 2009/0129566 A1 | 5/2009 | Feuer | |
| 2009/0135724 A1 | 5/2009 | Zhang et al. | |
| 2009/0135735 A1 | 5/2009 | Zhang et al. | |
| 2009/0141883 A1 | 6/2009 | Bastien | |
| 2009/0213839 A1 | 8/2009 | Davis et al. | |
| 2009/0214000 A1 | 8/2009 | Patel et al. | |
| 2009/0238168 A1 | 9/2009 | Lavoie et al. | |
| 2009/0268615 A1 | 10/2009 | Pelletier | |
| 2009/0292539 A1 | 11/2009 | Jaroker | |
| 2009/0296900 A1 | 12/2009 | Breen et al. | |
| 2009/0325558 A1 | 12/2009 | Pridmore et al. | |
| 2010/0002701 A1 | 1/2010 | Hsieh et al. | |
| 2010/0008345 A1 | 1/2010 | Lebizay | |
| 2010/0039946 A1 | 2/2010 | Imbimbo et al. | |
| 2010/0083364 A1 | 4/2010 | Gutierrez | |
| 2010/0086119 A1 | 4/2010 | De Luca et al. | |
| 2010/0105379 A1 | 4/2010 | Bonner et al. | |
| 2010/0114896 A1 | 5/2010 | Clark et al. | |
| 2010/0115018 A1 | 5/2010 | Yoon et al. | |
| 2010/0128729 A1 | 5/2010 | Yazaki et al. | |
| 2010/0142382 A1 | 6/2010 | Jungck et al. | |
| 2010/0150138 A1 | 6/2010 | Björsell et al. | |
| 2010/0150328 A1 | 6/2010 | Perreault et al. | |
| 2010/0172345 A1 | 7/2010 | Björsell et al. | |
| 2010/0177671 A1 | 7/2010 | Qiu et al. | |
| 2010/0220852 A1 | 9/2010 | Willman et al. | |
| 2010/0233991 A1 | 9/2010 | Crawford et al. | |
| 2010/0246589 A1 | 9/2010 | Pelletier | |
| 2010/0272242 A1 | 10/2010 | Croy et al. | |
| 2010/0278534 A1 | 11/2010 | Leiden et al. | |
| 2010/0316195 A1 | 12/2010 | Di Serio et al. | |
| 2011/0013541 A1 | 1/2011 | Croy et al. | |
| 2011/0072095 A1 | 3/2011 | Havriluk | |
| 2011/0122827 A1 | 5/2011 | Björsell et al. | |
| 2011/0153809 A1 | 6/2011 | Ghanem et al. | |
| 2011/0167164 A1 | 7/2011 | Gutierrez | |
| 2011/0176541 A1 | 7/2011 | James | |

(56) References Cited

U.S. PATENT DOCUMENTS

| | | |
|---|---|---|
| 2011/0201321 A1 | 8/2011 | Bonner |
| 2011/0208859 A1 | 8/2011 | Gutierrez |
| 2011/0235543 A1 | 9/2011 | Seetharaman et al. |
| 2011/0255553 A1 | 10/2011 | Bobba et al. |
| 2011/0261717 A1 | 10/2011 | Akuzuwa et al. |
| 2011/0267986 A1 | 11/2011 | Grabelsky et al. |
| 2011/0273526 A1 | 11/2011 | Mehin et al. |
| 2011/0276903 A1 | 11/2011 | Mehin et al. |
| 2011/0276904 A1 | 11/2011 | Mehin et al. |
| 2011/0292929 A1 | 12/2011 | Haster |
| 2012/0014383 A1 | 1/2012 | Geromel et al. |
| 2012/0089717 A1 | 4/2012 | Chen |
| 2012/0096145 A1 | 4/2012 | Le et al. |
| 2012/0099599 A1 | 4/2012 | Keränen et al. |
| 2012/0113981 A1 | 5/2012 | Feuer |
| 2012/0155333 A1 | 6/2012 | Yoon et al. |
| 2012/0170574 A1 | 7/2012 | Huttunen |
| 2012/0195236 A1 | 8/2012 | Knight |
| 2012/0195415 A1 | 8/2012 | Wyss et al. |
| 2012/0227101 A1 | 9/2012 | Yuan |
| 2012/0250624 A1 | 10/2012 | Lebizay |
| 2012/0259975 A1 | 10/2012 | Le et al. |
| 2012/0270554 A1 | 10/2012 | Hellwig et al. |
| 2012/0282881 A1 | 11/2012 | Mitchell |
| 2012/0314699 A1 | 12/2012 | Qiu et al. |
| 2013/0039226 A1 | 2/2013 | Sridhar |
| 2013/0097308 A1 | 4/2013 | Le et al. |
| 2013/0114589 A1 | 5/2013 | Fangman et al. |
| 2013/0128879 A1 | 5/2013 | Kyle |
| 2013/0148549 A1 | 6/2013 | Crawford et al. |
| 2013/0173534 A1 | 7/2013 | Nelakonda et al. |
| 2013/0223276 A1 | 8/2013 | Padgett |
| 2013/0229950 A1 | 9/2013 | Björsell et al. |
| 2013/0237198 A1 | 9/2013 | Vashi et al. |
| 2013/0254301 A1 | 9/2013 | Lin et al. |
| 2013/0272297 A1 | 10/2013 | Breen et al. |
| 2013/0281147 A1 | 10/2013 | Denman et al. |
| 2013/0287006 A1 | 10/2013 | Nix |
| 2013/0310002 A1 | 11/2013 | Celi, Jr. et al. |
| 2013/0318166 A1 | 11/2013 | Jungck et al. |
| 2013/0329722 A1 | 12/2013 | Perrault et al. |
| 2013/0329864 A1 | 12/2013 | Björsell et al. |
| 2014/0010119 A1 | 1/2014 | Björsell et al. |
| 2014/0016764 A1 | 1/2014 | Björsell et al. |
| 2014/0024367 A1 | 1/2014 | Björsell et al. |
| 2014/0101749 A1 | 4/2014 | Yuan |
| 2014/0141884 A1 | 5/2014 | Kropivny |
| 2014/0153477 A1 | 6/2014 | Huttunen et al. |
| 2014/0211789 A1 | 7/2014 | Feuer |
| 2014/0215642 A1 | 7/2014 | Huxham |
| 2014/0220944 A1 | 8/2014 | Balasubramanian |
| 2014/0244393 A1 | 8/2014 | Rimmer et al. |
| 2014/0247730 A1 | 9/2014 | Thota et al. |
| 2014/0269624 A1 | 9/2014 | Khay-Ibbat et al. |
| 2014/0307858 A1 | 10/2014 | Li et al. |
| 2014/0321333 A1 | 10/2014 | Björsell et al. |
| 2014/0324969 A1 | 10/2014 | Riddle |
| 2014/0337961 A1 | 11/2014 | Chien et al. |
| 2014/0337962 A1 | 11/2014 | Brandstatter |
| 2014/0349602 A1 | 11/2014 | Majumdar et al. |
| 2015/0327320 A1 | 11/2015 | Huttunen et al. |
| 2015/0358470 A1 | 12/2015 | Björsell et al. |
| 2016/0006882 A1 | 1/2016 | Björsell |
| 2016/0028619 A1 | 1/2016 | Perreault et al. |

FOREIGN PATENT DOCUMENTS

| | | |
|---|---|---|
| CA | 2 218 218 A1 | 10/1997 |
| CA | 2249668 | 4/1999 |
| CA | 2 299 037 A1 | 8/2000 |
| CA | 2 437 275 A1 | 10/2002 |
| CA | 2598200 A1 | 2/2008 |
| CA | 2668025 A1 | 5/2008 |
| CA | 2670510 A1 | 6/2008 |
| CA | 2681984 A1 | 10/2008 |
| CA | 2 690 236 A1 | 12/2008 |
| CA | 2 659 007 A1 | 9/2009 |
| CA | 2732148 A1 | 2/2010 |
| CA | 2 778 905 A1 | 8/2010 |
| CA | 2812174 A1 | 3/2011 |
| CN | 1498029 A | 5/2004 |
| CN | 1498482 A | 5/2004 |
| CN | 1668137 A | 9/2005 |
| CN | 1274114 C | 9/2006 |
| CN | 101005503 A | 7/2007 |
| CN | 101069390 A | 11/2007 |
| CN | 101095329 A | 12/2007 |
| CN | 101584150 A | 11/2009 |
| CN | 101584166 A | 11/2009 |
| CN | 101605342 A | 12/2009 |
| CN | 1498029 B | 5/2010 |
| CN | 101772929 A | 7/2010 |
| CN | 101069390 B | 12/2010 |
| CN | 102137024 A | 7/2011 |
| CN | 102457494 A | 5/2012 |
| CN | 102484656 A | 5/2012 |
| CN | 102572123 A | 7/2012 |
| CN | 101095329 B | 10/2012 |
| CN | 101605342 B | 12/2012 |
| CN | 102833232 A | 12/2012 |
| CN | 101005503 B | 1/2013 |
| CN | 101772929 B | 7/2014 |
| CN | 102457494 B | 10/2014 |
| DE | 602 01 827 T2 | 11/2005 |
| DE | 11 2005 003 306 T5 | 1/2008 |
| DE | 601 33 316 T2 | 7/2008 |
| DE | 603 17 751 T2 | 11/2008 |
| EP | 0 841 832 A2 | 5/1998 |
| EP | 0 841 832 A3 | 5/1999 |
| EP | 1 032 224 A2 | 8/2000 |
| EP | 1 032 224 A3 | 8/2000 |
| EP | 1 244 250 A1 | 9/2002 |
| EP | 1 266 516 A2 | 12/2002 |
| EP | 1 362 456 A2 | 11/2003 |
| EP | 1 371 173 A1 | 12/2003 |
| EP | 1 389 862 A1 | 2/2004 |
| EP | 1 411 743 A1 | 4/2004 |
| EP | 1 389 862 B1 | 11/2004 |
| EP | 1 526 697 A2 | 4/2005 |
| EP | 1 362 456 A4 | 5/2005 |
| EP | 1 575 327 A1 | 9/2005 |
| EP | 1 610 583 A1 | 12/2005 |
| EP | 1 526 697 A3 | 3/2006 |
| EP | 1 721 446 A1 | 11/2006 |
| EP | 1 829 300 A1 | 9/2007 |
| EP | 1 371 173 B1 | 11/2007 |
| EP | 1 411 743 B1 | 11/2007 |
| EP | 1 362 456 B1 | 3/2008 |
| EP | 1 974 304 A2 | 10/2008 |
| EP | 1 974 304 A4 | 10/2008 |
| EP | 1 610 583 B1 | 8/2009 |
| EP | 2 084 868 | 8/2009 |
| EP | 2 090 024 | 8/2009 |
| EP | 2 127 232 A1 | 12/2009 |
| EP | 2 165 489 A1 | 3/2010 |
| EP | 2 215 755 A1 | 8/2010 |
| EP | 2 227 048 A1 | 9/2010 |
| EP | 2 127 232 A4 | 3/2011 |
| EP | 2 165 489 A4 | 3/2011 |
| EP | 2 311 292 | 4/2011 |
| EP | 1 829 300 A4 | 5/2012 |
| EP | 2 449 749 A1 | 5/2012 |
| EP | 2 478 678 | 7/2012 |
| EP | 2 215 755 A4 | 10/2012 |
| EP | 1 829 300 B1 | 11/2012 |
| EP | 2 449 749 B1 | 3/2014 |
| EP | 1 266 516 B1 | 5/2014 |
| ID | W00200902627 | 9/2009 |
| IN | 24/2009 | 6/2009 |
| IN | 29/2009 | 7/2009 |
| JP | 2011-199384 A | 10/2011 |
| KR | 10-2009-0086428 A | 8/2009 |
| KR | 10-2009-0095621 A | 9/2009 |
| MX | 2009004811 A | 8/2009 |

(56) References Cited

FOREIGN PATENT DOCUMENTS

| | | |
|---|---|---|
| MX | 2009005751 A | 8/2009 |
| SG | 151991 | 6/2009 |
| SG | 152752 | 6/2009 |
| SG | 155474 | 10/2009 |
| WO | WO 01/50693 A1 | 7/2001 |
| WO | WO 01/69899 A2 | 9/2001 |
| WO | WO 01/69899 A3 | 9/2001 |
| WO | WO 01/80587 A1 | 10/2001 |
| WO | WO 01/89145 A2 | 11/2001 |
| WO | WO 02/082728 A1 | 10/2002 |
| WO | WO 02/082782 A2 | 10/2002 |
| WO | WO 02/082782 A3 | 10/2002 |
| WO | WO 03/027801 A2 | 4/2003 |
| WO | WO 2005/084002 A1 | 9/2005 |
| WO | WO 2006/067269 A1 | 6/2006 |
| WO | WO 2006/072099 A1 | 7/2006 |
| WO | WO 2006/078175 A2 | 7/2006 |
| WO | WO 2006/078175 A3 | 7/2006 |
| WO | WO 2007/044454 A2 | 4/2007 |
| WO | WO 2007/056158 A2 | 5/2007 |
| WO | WO 2007/087077 A2 | 8/2007 |
| WO | WO 2007/087077 A3 | 8/2007 |
| WO | WO 2008/027065 A1 | 3/2008 |
| WO | WO 2008/052340 A1 | 5/2008 |
| WO | WO 2008/064481 A1 | 6/2008 |
| WO | WO 2008/085614 A2 | 7/2008 |
| WO | WO 2008/085614 A3 | 7/2008 |
| WO | WO 2008/086350 A2 | 7/2008 |
| WO | WO 2008/086350 A3 | 7/2008 |
| WO | WO 2008/103652 A1 | 8/2008 |
| WO | WO 2008/116296 A1 | 10/2008 |
| WO | WO 2008/085614 A8 | 12/2008 |
| WO | WO 2008/151406 A1 | 12/2008 |
| WO | WO 2008/151406 A8 | 12/2008 |
| WO | WO 2009/070202 A1 | 6/2009 |
| WO | WO 2009/070278 A1 | 6/2009 |
| WO | WO 2010/012090 A2 | 2/2010 |
| WO | WO 2011/000405 A1 | 1/2011 |
| WO | WO 2011/032256 A1 | 3/2011 |
| WO | WO 2013/013189 A2 | 1/2013 |
| WO | WO 2013/120069 A1 | 8/2013 |
| WO | WO 2014/066155 A2 | 5/2014 |
| WO | WO 2014/117599 A1 | 8/2014 |
| WO | WO 2014-166258 A1 | 10/2014 |

OTHER PUBLICATIONS

Extended European Search Report dated Apr. 16, 2014 for European Patent Application No. EP 09 802 316.1 which shares priority of U.S. Appl. No. 61/129,898, filed Jul. 28, 2008 with U.S. Appl. No. 13/056,277, filed Jan. 27, 2011, which is related to captioned U.S. Appl. No. 13/968,217, and cites above-identified reference Nos. 1 and 2.
Extended European Search Report dated Nov. 2, 2012 for European Application No. EP 07 855 436.7.
Extended European Search Report dated Dec. 20, 2013 for European Application No. EP 09 849 358.8.
F. Baker et al. "RFC 3924—Cisco Architecture for Lawful Intercept in IP Networks." Oct. 2004.
Cisco. "*Lawful Intercept Requirements Summary*." http://www.faqs.org/rfcs/rfc3924.html. Nov. 8, 2006.
Sippy SIP B2BUA. "*About Sippy RTPproxy*." http://www.rtpproxy.org. Jul. 15, 2009.
ETSI Technical Specification. "Lawful Interception (LI); Handover Interface and Service-Specific Details (SSD) for IP delivery; Part 5: Service-specific details for IP Multimedia Services." Apr. 2008, 25 pgs, v.2.3.1, France.
M. Handley et al. "RFC 2543—SIP: Session Initiation Protocol." Mar. 1999.
The International Search Report and Written Opinion of the International Searching Authority completed Jun. 6, 2008 for related PCT/CA2008/000545.

The International Search Report and Written Opinion of the International Searching Authority completed Feb. 6, 2008 for corresponding PCT/CA2007/001956.
The International Preliminary Report on Patentability mailed May 14, 2009 for corresponding PCT/CA2007/001956.
The International Search Report and Written Opinion of the International Searching Authority completed Mar. 3, 2008 for related PCT/CA2007/002150.
The International Preliminary Report on Patentability mailed Feb. 13, 2009 for related PCT/CA2007/002150.
The International Preliminary Report on Patentability and Written Opinion of the International Searching Authority mailed Feb. 10, 2011 for related PCT Application No. PCT/CA2009/001062, Feb. 1, 2011.
The Written Opinion and International Search Report completed on Jun. 18, 2010 for related PCT Application No. PCT/CA2009/001317.
The International Search Report and Written Opinion mailed on Mar. 12, 2010 for corresponding PCT Application No. PCT/CA2009/001062.
The International Preliminary Report on Patentability issued on Sep. 29, 2009 for PCT/CA2008/000545.
The International Preliminary Report on Patentability issued on Mar. 20, 2012 for PCT/CA2009/001317.
Townsley, et al.; "RFC 2661—Layer Two Tunneling Protocol 'L2TP'", Aug. 1999.
IP2Location, http://www.ip2location.com/; printed Jun. 20, 2012.
DOTS IP Address Validation, "Overview", http://www.serviceobjects.com/products/dots_ipgeo.asp; printed Jun. 21, 2012.
List of North American Numbering Plan area codes, http://en.wikipedia.org/wiki/List_of_NANP_area_codes; printed Jun. 20, 2012.
DOTS Phone Exchange, "Overview", http://www.serviceobjects.com/demos/PhoneExchangeDemo.asp (URL no longer valid, current URL is http://www.serviceobjects.com/products/phone/phone-exchange); printed Jun. 21, 2012.
Rosenberg, et al.; "RFC 3261—SIP: Session Initiation Protocol", Jun. 2002.
Lind AT&T S: "ENUM Call Flows for VoIP Interworking; draft-lind-enum-callflowS-03.txt", Feb. 1, 2002, No. 3, Feb. 1, 2002, pp. 1-17, XP015004214, ISSN: 0000-0004.
IETF ENUM WG R STASTNY OEFEG Informational Numbering for VOIP and Other IP Communications: "Numbering for ViOP and other IP Communications, draft-stastny-enum-numbering-voip-00.txt", Oct. 1, 2003, pp. 1-43, XP015035676, ISSN: 0000-0004.
Supplementary European Search Report for European Application No. 07816106, dated Jun. 18, 2012.
Supplementary European Search Report for European Application No. 07816106, dated Nov. 2, 2012.
Wikipedia, "International mobile subscriber identity (IMSI)," http://en.wikipedia.org/wiki/IMSI, Jul. 16, 2013.
Wikipedia, "Roaming," http://en.wikipedia.org/wiki/Roarning, Jul. 16, 2013.
Baker et al., "Cisco Support for Lawful Intercept in IP Networks," Internet Draft—working document of the Internet Engineering Task Force (IETF), accessible at http://www.ietf.org/ietf/lid-abstracts.txt, Apr. 2003, expires Sep. 30, 2003, pp. 1-15.
Bhushan et al., "Federated Accounting: Service Charging and Billing in a Business-to-Business Environment," 0-7803-6719-7/01, © 2001 IEEE, pp. 107-121.
Jajszczyk et al., "Emergency Calls in Flow-Aware Networks," *IEEE Communications Letters*, vol. 11, No. 9, Sep. 2007, pp. 753-755.
Kim et al., "An Enhanced VoIP Emergency Services Prototype," *Proceedings of the 3$^{rd}$ International ISRAM Conference* (B. Van de Walle and M. Turoff, eds.), Newark, NJ (USA), May 2006, pp. 1-8.
Kornfeld et al., "DVB-H and IP Datacast—Broadcast to Handheld Devices," *IEEE Transactions On Broadcasting*, vol. 53, No. 1, Mar. 2007, pp. 161-170.
Kortebi et al., "SINR-Based Routing in Multi-Hop Wireless Networks to Improve VoIP Applications Support," 1-4244-0667-6/07, © 2007 IEEE, pp. 491-496.

(56) References Cited

OTHER PUBLICATIONS

Lee et al., "VoIP Interoperation with KT-NGN," in *The 6th International Conference on Advanced Communication Technology*, Technical Proceedings, 2004, pp. 126-128, accompanied by Title and Contents—4 pages.
Lin et al., "Effective VoIP Call Routing in Wlan and Cellular Integration," *IEEE Communications Letters*, vol. 9, No. 10, Oct. 2005, pp. 874-876.
Ma et al., "Realizing MPEG4 Video Transmission Based on Mobile Station over GPRS," 0-7803-9335X/05, © 2005 IEEE, pp. 1241-1244.
Mintz-Habib et al., "A VoIP Emergency Services Architecture and Prototype," {mm2571,asr,hgs,xiaotaow}@cs.columbia.edu, 0-7803-9428-3/05, © 2005 IEEE, pp. 523-528.
Munir, Muhammad Farukh, "Study of an Adaptive Scheme for Voice Transmission on IP in a Wireless Networking Environment 802.11e," *Dept. of Networks and Distributed Computing, Ecole Supérieure En Sciences Informatiques (ESSI)*, Université De Nice, Jun. 2005, (pp. 1-35), Best Available Copy—pp. 1-11.
Sripanidkulchai et al., "Call Routing Management in Enterprise VoIP Networks," Copyright 2007 ACM 978-1-59593-788-9/07/0008, 6 pages.
Thernelius, Fredrik, "SIP, NAT, and Firewalls," Master's Thesis, *ERICSSON, Department of Teleinformatics*, May 2000, pp. 1-69.
Trad et al., "Adaptive. VoIP Transmission over Heterogeneous Wired/Wireless Networks," V. Roca and F. Rousscau (Eds.): *MIPS 2004, LNCS* 3311, pp. 25-36, 2004, © Springer-Verlag Berlin Heidelberg 2004.
Yu et al., "Service-Oriented Issues: Mobility, Security, Charging and Billing Management in Mobile Next Generation Networks," *IEEE BcN2006*, 1-4244-0146-1/06, © 2006 IEEE, pp. 1-10.
ETSI TS 122 173 V12.7.0 (Oct. 2014) Digital cellular telecommunications system (Phase 2+); Technical Specification 8.2.2.3—Interoperability with PSTN/ISDN and mobile CS Networks, Contents and Forward, pp. 1-9; Sec. 8, pp. 14-17.
Huitema et al., "Architecture for Internet Telephony Service for Residential Customers," Academic Paper for Bellcore, Mar. 2, 1999, pp. 1-14.
Stallings, William, "The Session Initiation Protocol," *The Internet Protocol Journal*, vol. 6, No. 1, Mar. 2003, pp. 20-30.
Ketchpel et al. "U-PAI: A universal payment application interface" *Second USENIX Workshop on Electronic Commerce Proceedings*, Aug. 1996, pp. 1-17.
Moberg & Drummond, "MIME-Based Secure Peer-to-Peer Business Data Interchange Using HTTP, Applicability Statement 2 (AS2)," *Network Working Group, Request for Comments: 4130*, Category: Standards Track, Copyright © The Internet Society Jul. 2005, pp. 1-47.
Abrazhevich, Dennis. "Electronic Payment Systems: a User-Centered Perspective and Interaction Design," *Thesis under the auspices of the J.F. Schouten School for User-System Interaction Research*, Technische Universiteit Eindhoven, Netherlands, 2004, pp. Cover page-p. 189.
Chinese Office Action dated Mar. 24, 2011 for Chinese Patent Application No. CN 200780049791.5.
Chinese Office Action dated Jun. 23, 2011 for Chinese Patent Application No. CN 200780049136.X.
Indonesian Examination Report dated Jul. 5, 2012 for Indonesian Patent Application No. W-00200901414.
Indonesian Examination Report dated Feb. 8, 2013 for Indonesian Patent Application No. W-00200901165.
Mexican Exam Report dated Jul. 11, 2011 for Mexican Patent Application No. MX/a/2009/004811.
Mexican Notice of Allowance dated Sep. 2, 2011 for Mexican Patent Application No. MX/a/2009/005751.
Canadian Office Action dated Jan. 27, 2015 for Canadian Patent Application No. CA 2,681,984.
Document Title: Complaint for Patent Infringement [Jury Demand]; Case Title: *VoIP-Pal.com, Inc., a Nevada corporation*, Plaintiff, v. *Verizon Wireless Services, LLC, a Delaware limited liability corporation; Verizon Communications, Inc., a Delaware corporation; AT&T, Inc., a Delaware corporation; AT&T Corp., a Delaware corporation; and DOES I through X, inclusive*, Defendants; Case No. 2:16-CV-00271; Court: United States District Court District of Nevada. Attachments: Table of Exhibits; Exhibit A; Exhibit B; Exhibit C; Exhibit D; Exhibit E; Chart 1 to Exhibit E; Chart 2 to Exhibit E; Chart 3 to Exhibit E; Chart 4 to Exhibit E; Chart 5 to Exhibit E; Chart 6 to Exhibit E; Exhibit F; Chart 1 to Exhibit F; Chart 2 to Exhibit F; Chart 3 to Exhibit F; Chart 4 to Exhibit F; Chart 5 to Exhibit F; Chart 6 to Exhibit F; Exhibit G; Exhibit H; and Addendum 1 to Exhibit H.
Document Title: Complaint for Patent Infringement [Jury Demand]; Case Title: *VoIP-Pal.com, Inc., a Nevada corporation*, Plaintiff, v. *Apple, Inc., a California corporation*; Defendants; Case No. 2:16-CV-00260; Court: United States District Court District of Nevada. Attachments: Table of Exhibits; Exhibit A; Exhibit B; Exhibit C; Exhibit D; Chart 1 to Exhibit D; Chart 2 to Exhibit D; Chart 3 to Exhibit D; Chart 4 to Exhibit D; Exhibit E; Exhibit F; and Addendum 1 to Exhibit F.
Letter dated November 30, 2015, from VoIP-Pal.com Inc. giving notice and inviting the company listed herein below to contact VoIP-Pal.com about U.S. Pat. No. 9,179,005 and U.S. Pat. No. 8,542,815 and related patents listed in the accompanying Attachment A. Sent to the following company: Apple Inc. in the U.S.
Letter dated December 1, 2015, from VoIP-Pal.com Inc. giving notice and inviting the company listed herein below to contact VoIP-Pal.com about U.S. Pat. No. 9,179,005 and U.S. Pat. No. 8,542,815 and related patents listed in the accompanying Attachment A. Sent to the following company: Verizon Communications in the U.S.
Letters dated December 18, 2015, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. (Please Note: Attachment A is attached here only to the first letter.) Sent to the following companies: Airtel in India; Alcatel-Lucent in France; Avaya Inc. in the U.S.; AT&T in the U.S.; Blackberry in Canada; Cable One in the U.S.; Century Link in the U.S.; Charter Communications in the U.S.; Cisco Systems in the U.S.; Comcast in the U.S.; Cox Communications in the U.S.; Cricket Wireless in the U.S.; Facebook in the U.S.; Freedom Pop in the U.S.; Frontier Communications in the U.S.; Google Inc. in the U.S.; HP in the U.S.; Juniper Networks in the U.S.;.LoopPay, Inc. in the U.S.; Magic Jack in the U.S.; MetroPCS in the U.S.; Ooma in the U.S.; PayPal in the U.S.; Republic Wireless in the U.S.; Rok Mobile in the U.S.; Samsung Electronics-America in the U.S.; ShoreTel, Inc. in the U.S.; Siemens in Germany; Skype USA in the U.S.; Sprint in the U.S.; Square Cash in the U.S.; Suddenlink Communications in the U.S.; Talktone in the U.S.; Tango in the U.S.; Time Warner Cable in the U.S.; T-Mobile in the U.S.; Twitter in the U.S.; US Cellular in the U.S.; Venmo in the U.S.; Virgin Mobile USA in the U.S.; and Vonage in the U.S.
Letters dated January 4, 2016, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. (Please Note: Attachment A is attached here only to the first letter.) Sent to the following companies: Rogers Communications Inc. in Canada; Shaw Cable in Canada; Walmart in Alaska; and Wind Mobile in Canada.
Letters dated January 21, 2016, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. (Please Note: Attachment A is attached here only to the first letter.) Sent to the following companies: Alibaba (China) Co., Ltd in China; Comwave Telecommunications in Canada; and Intel in the U.S.
Letters dated February 2, 2016, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. (Please Note: Attachment A is attached here only to the first

(56) References Cited

OTHER PUBLICATIONS letter.) Sent to the following companies: Netflix Inc. in the U.S.; Skype Technologies in the U.S.; and WhatsApp Inc. in the U.S.
Canadian Office Action dated Mar. 3, 2016 for Canadian Patent Application No. CA 2,670,510.
Canadian Office Action dated Nov. 18, 2015 for Canadian Patent Application No. CA 2,681,984.
Canadian Office Action dated Dec. 1, 2015 for Canadian Patent Application No. CA 2,812,174.
Canadian Office Action dated Jan. 22, 2016 for Canadian Patent Application No. CA 2,916,220.
European Examination Report dated Nov. 26, 2015 for European Patent Application No. EP 07 816 106.4 which claims priority of U.S. Appl. No. 60/856,212, filed Nov. 2, 2006. References cited in the Examination Report are previously of record in the subject application.
Technical Report, "3rd Generation Partnership Project; Technical Specification Group Core Network and Terminals; Study into routeing of MT-SMs via the HPLMN (Release 7)," 3GPP TR 23.840 V0.1.0 (Feb. 2006), 13 pages.
Communication for European Patent Application No. EP 07 816 106.4—Invitation pursuant to Article 94(3) and Rule 71(1) EPC dated Apr. 15, 2016, All pages.
Canadian Office Action dated Jun. 8, 2016 for Canadian Patent Application No. CA 2,916,217.
First Examination Report dated Dec. 9, 2015, India Patent Application No. 1047/MUMNP/2009.
Document Title: Petition for Inter Partes Review of U.S. Pat. No. 8,542,815; United States Patent and Trademark Office; Before the Patent Trial and Appeal Board; *Unified Patents Inc., Petitioner* v. *Voip-Pal.com Inc.*, Patent Owner; IPR2016-01082; U.S. Pat. No. 8,542,815; Producing Routing Messages for Voice Over IP Communications; Dated May 24, 2016. 64 sheets.
Document Title: Declaration of Michael Caloyannides; United States Patent and Trademark Office; Before the Patent Trial and Appeal Board; *Unified Patents Inc., Petitioner* v. *Voip-Pal.com Inc.*, Patent Owner; IPR2016-01082; U.S. Pat. No. 8,542,815; Producing Routing Messages for Voice Over IP Communications; Signed May 23, 2016; Filed May 24, 2016. 84 sheets.
Document Title: Public Switched Telephone Networks: A Network Analysis of Emerging Networks; Daniel Livengood, Jijun Lin and Chintan Vaishnav; Engineering Systems Division; Massachusetts Institute of Technology; Submitted May 16, 2006; To Dan Whitney, Joel Moses and Chris Magee, 27 sheets.
Document Title: A Brief History of VoIP; Document One—The Past; Joe Hallock; joe@sitedifference.com; date on cover page: Nov. 26, 2004; Evolution and Trends in Digital Media Technologies—COM 538; Masters of Communication in Digital Media; University of Washington. 17 sheets.
Document Title: Petitioner's Voluntary Interrogatory Responses; United States Patent and Trademark Office; Before the Patent Trial and Appeal Board; *Unified Patents Inc., Petitioner* v. *Voip-Pal.com Inc.*, Patent Owner; IPR20161082; U.S. Pat. No. 8,542,815; Producing Routing Messages for Voice Over IP Communications; Signed and Filed not later than May 24, 2016. 8 sheets.
Document Title: VoIP-Pal, The World is Calling!, "Over $7 Billion in Lawsuits File by *Voip-Pal.com Inc.* vs *Apple, Verizon and AT&T* for Various Patent Infringements," Business Wire®, A Berkshire Hathaway Company, Feb. 11, 2016. 2 sheets.
Document Title: United States Patent and Trademark Office; Before the Patent Trial and Appeal Board; *Apple Inc., Petitioner* v. *Voip-Pal.com Inc.*, Patent Owner; Case No. TBD, U.S. Pat. No. 9,179,005; Petition for Inter Partes Review of U.S. Pat. No. 9,179,005; Dated Jun. 15, 2016. 70 sheets.
Document Title: In the United States Patent and Trademark Office; Petition for Inter Partes Review Pursuant to 37 C.F.R. §42.100 Et Seq.; In re U.S. Pat. No. 9,179,005; Currently in Litigation Styled: *VoIP-Pal.com, Inc.* v. *Apple Inc.*, Case No. 2:16-cv-00260-RFB-VCF; Issued: Nov. 3, 2015; Application Filed: Aug. 13, 2013; Applicant: Clay Perreault, et al.; Title: Producing Routing Messages for Voice Over IP Communications; Declaration of Henry H. Houh, PhD; Signed Jun. 14, 2016. 143 sheets.
Document Title: United States Patent and Trademark Office; Before the Patent Trial and Appeal Board; *Apple Inc., Petitioner* v. *Voip-Pal.com Inc.*, Patent Owner; Case No. TBD, U.S. Pat. No. 8,542,815; Petition for Inter Partes Review of U.S. Pat. No. 8,542,815; Dated Jun. 15, 2016. 67 sheets.
Document Title: In the United States Patent and Trademark Office; Petition for Inter Partes Review Pursuant to 37 C.F.R. §42.100 Et Seq.; In re U.S. Pat. No. 8,542,815; Currently in Litigation Styled: *VoIP-Pal.com, Inc.* v. *Apple Inc.*, Case No. 2:16-cv-00260-RFB-VCF; Issued: Sep. 24, 2013; Application Filed: Nov. 1, 2007; Applicant: Clay Perreault, et al.; Title: Producing Routing Messages for Voice Over IP Communications; Declaration of Henry H. Houh, PhD; Signed Jun. 14, 2016. 143 sheets.
Canadian Office Action dated Aug. 16, 2016 for Canadian Patent Application No. 2,681,984.
European Examination Report dated Aug. 29, 2016 for European Patent Application No. EP 07 855 4361.
Communication under Rule 71(3) EPC—Intention to Grant—dated Oct. 14, 2016 for European Patent Application No. EP 07 816 106.4.
Decision: Denying Institution of Inter Partes Review, 37 C.F.R. § 42.108, United States Patent and Trademark Office, Before the Patent Trial and Appeal Board, *Unified Patents Inc., Petitioner* v. *Voip-Pal.com Inc.*, Patent Owner, Case IPR2016-01082, U.S. Pat. No. 8,542,815 B2, Paper 8, Entered: Nov. 18, 2016.
Decision: Institution of Inter Partes Review, 37 C.F.R. § 42.108, United States Patent and Trademark Office, Before the Patent Trial and Appeal Board, *Apple Inc., Petitioner* v. *Voip-Pal.com Inc.*, Patent Owner, Case IPR2016-01201, U.S. Pat. No. 8,542,815 B2, Paper 6, Entered: Nov. 21, 2016.
Decision: Institution of Inter Partes Review, 37 C.F.R. § 42.108, United States Patent and Trademark Office, Before the Patent Trial and Appeal Board, *Apple Inc., Petitioner* v. *Voip-Pal.com Inc.*, Patent Owner, Case IPR2016-01198, U.S. Pat. No. 9,179,005 B2, Paper 6, Entered: Nov. 21, 2016.
Scheduling Order: United States Patent and Trademark Office, Before the Patent Trial and Appeal Board, *Apple Inc., Petitioner* v. *Voip-Pal.com Inc.*, Patent Owner, Cases IPR2016-01201, IPR2016-01198, U.S. Pat. No. 8,542,815 B2, U.S. Pat. No. 9,179,005 B2, Paper 7, Entered: Nov. 21, 2016.
Complaint for Patent Infringement, United States District Court, District of Nevada, Case No. 2:16-cv-2338, *Voip-Pal.com, Inc., a Nevada corporation, Plaintiff* v. *Twitter, Inc., a California corporation*, Defendant, Filed Oct. 6, 2016, 8 pages.
Civil Docket for Case #: 2:16-cv-02338-RFB-CWH, United States District Court, District of Nevada (Las Vegas), *Voip-Pal.com, Inc.* v. *Twitter, Inc.*, Date Filed: Oct. 6, 2016, 2 pages.
Table of Exhibits, *Case 2:16-cv-02338-RFB-CWH, Filed Oct. 6, 2016*, 1 page.
Exhibit A, *Case 2:16-cv-02338-RFB-CWH, Filed Oct. 6, 2016*, U.S. Pat. No. 8,542,815 B2, Issued Sep. 24, 2013, to Clay Perrault et al., 60 pages.
Exhibit B, *Case 2:16-cv-02338-RFB-CWH*, Filed Oct. 6, 2016, U.S. Pat. No. 9,179,005 B2, Issued Nov. 3, 2015, to Clay Perrault et al., 63 pages.
Exhibit C, *Case 2:16-cv-02338-RFB-CWH, Filed Oct. 6, 2016*, Letter dated Dec. 18, 2015 giving notice of U.S. Pat. Nos. 8,542,815 B2; 9,179,005 B2; and related Patents listed in Attachment A, 4 pages.
Exhibit D, *Case 2:16-cv-02338-RFB-CWH, Filed Oct. 6, 2016*, Asserted Claims and Infringement Conditions, United States District Court, District of Nevada, *Voip-Pal.com, Inc., a Nevada corporation, Plaintiff* v. *Twitter, Inc., a California corporation*, Defendants, 6 pages.
Chart 1 to Exhibit D, *Case 2:16-cv-02338-RFB-CWH, Filed Oct. 6, 2016*, Chart 1, Asserted Claims and Infringement Conditions Concerning U.S. Pat. No. 8,542,815, United States District Court, District of Nevada, *Voip-Pal.com, Inc., a Nevada corporation, Plaintiff* v. *Twitter, Inc., a California corporation*, Defendants, 20 pages.
Chart 2 to Exhibit D, *Case 2:16-cv-02338-RFB-CWH, Filed Oct. 6, 2016*, Chart 2, Asserted Claims and Infringement Conditions Con-

(56) References Cited

OTHER PUBLICATIONS cerning U.S. Pat. No. 9,179,005, United States District Court, District of Nevada, *Voip-Pal.com, Inc., a Nevada corporation, Plaintiff* V. *Twitter, Inc., a California corporation*, Defendants, 28 pages.
Exhibit E, *Case 2:16-cv-02338-RFB-CWH, Filed Oct. 6, 2016*, VPLM Active U.S. Patent Matters as of Oct. 1, 2016, 2 pages.
Exhibit F, *Case 2:16-cv-02338-RFB-CWH, Filed Oct. 6, 2016*, Twitter Royalty Monetization Analysis Overview, 4 pages.
Patent Owner's Preliminary Response, *Case No. IPR2016-01082, U.S. Pat. No. 8,542,815, Unified Patents Inc., Petitioner*, v. *Voip-Pal.com Inc.*, Patent Owner, Filing Date: Aug. 26, 2016, 80 pages.
Voip-Pal.com, Inc. Exhibit 2001, Comparison of portions of Petition with portions of Declaration, IPR2016-01082, *Unified Patents* v. *Voip-Pal*, Filing Date: Aug. 26, 2016, 9 pages.
Patent Owner's Preliminary Response to Petition for Inter Partes Review, *Case No. IPR2016-01201*, U.S. Pat. No. 8,542,815, *Apple Inc., Petitioner*, v. *Voip-Pal.com Inc.*, Patent Owner, Filing Date: Sep. 19, 2016, 74 pages.
Voip-Pal.com, Inc. Exhibit 2001, Comparison of Petition (Ground 1) with Petition (Ground 2), IPR2016-01201, *Apple* v. *Voip-Pal*, Filing Date: Sep. 19, 2016, 19 pages.
Patent Owner's Preliminary Response to Petition for Inter Partes Review, Case No. IPR2016-01198, U.S. Pat. No. 9,179,005, *Apple Inc., Petitioner*, v. *Voip-Pal.com Inc.*, Patent Owner, Filing Date: Sep. 21, 2016, 74 pages.
Voip-Pal.com, Inc. Exhibit 2001, Comparison of Petition (Ground 1) with Petition (Ground 2), IPR2016-01198, *Apple* v. *Voip-Pal*, Filing Date: Sep. 21, 2016, 21 pages.

\* cited by examiner

SIP Invite Message ← 59

60 — Caller           2001 1050 8667
62 — Callee           4401 1062 4444
64 — Digest Parameters XXXXXXX
65 — Call ID          FF10@ 192.168.0.20
67 — Caller IP Address 192.168.0.20
69 — Caller UDP port  12345

RC Request Message ⟵150

152 — Caller  2001 1050 8667
154 — Callee  4401 1062 4444 (911)
156 — Digest  XXXXXXX
158 — Call ID  FF10@ 192.168.0.20
160 — Type   Subscriber

Dialing Profile for a User → 256

| | | |
|---|---|---|
| 258 | Username | Assigned on Subscription |
| 260 | Domain | Domain Associated with User |
| 262 | NDD | 1 |
| 264 | IDD | 011 |
| 266 | Country Code | 1 |
| 267 | Local Area Codes | 604;778 |
| 268 | Caller Minimum Local Length | 10 |
| 270 | Caller Maximum Local Length | 10 |
| 273 | Reseller | Retailer |
| 275 | Subscriber Address | The Users Street Address |
| 277 | Emergency Short# | Local Emergency No. (e.g. 911) |
| 279 | ERC# | Emergency Response Center Number |

FIG. 9

Dialing Profile for Vancouver Subscriber → 276

| | | |
|---|---|---|
| 258 | Username | 2001 1050 8667 (284: 61, 63, 70, 74) |
| 260 | Domain | sp.yvr.digifonica.com ← 282 (286, 288, 290) |
| 262 | NDD | 1 |
| 264 | IDD | 011 |
| 266 | Country Code | 1 |
| 267 | Local Area Codes | 604;778 (Vancouver) |
| 268 | Caller Minimum Local Length | 10 |
| 270 | Caller Maximum Local Length | 10 |
| 273 | Reseller | Klondike |
| 275 | User Address | 2200 650 Georgia St. Van. B.C. Canada V4M 3G8 |
| 277 | Emergency Call Identifier# | 911 |
| 279 | ERC# | 604 666 3655 |

FIG. 10

Dialing Profile for ERC Subscriber

| | |
|---:|:---|
| Username | 2001 1050 6969 |
| Domain | sp.yvr.digifonica.com |
| NDD | 1 |
| IDD | 011 |
| Country Code | 1 |
| Local Area Codes | 604 |
| Caller Minimum Local Length | 7 |
| Caller Maximum Local Length | 10 |
| Reseller | Klondike |
| User Address | #Epson downs, Tripson Falls B.C. Canada V0N 2N3 |
| Emergency Call Identifier# | 911 |
| ERC# | 604 666 3655 |

FIG. 10A

Dialing Profile for Calgary Subscriber

| | |
|---:|:---|
| Username | 2001 1050 2222 |
| Domain | sp.yvr.digifonica.com |
| NDD | 1 |
| IDD | 011 |
| Country Code | 1 |
| Local Area Codes | 403 |
| Caller Minimum Local Length | 7 |
| Caller Maximum Local Length | 10 |
| User Address | 1210 Deerfoot Trail SE, Calgary Alberta Canada H0H 0H0 |
| Emergency Short# | 911 |
| ERC# | 403 123 4567 |

FIG. 11

Dialing Profile for London Subscriber

| | |
|---:|:---|
| Username | 4401 1062 4444 |
| Domain | sp.lhr.digifonica.com |
| NDD | 0 |
| IDD | 00 |
| Country Code | 44 |
| Local Area Codes | 20 (London) |
| Caller Minimum Local Length | 10 |
| Caller Maximum Local Length | 11 |
| User Address | 21 Basil Rd. Faulty Towers, London NW1 4NS |
| Emergency Short# | 911 |
| ERC# | 7487-7973 |

FIG. 12

DID Bank Table Record Format ←268

| | 291 —Username | System subscriber |
|---|---|---|
| | 272 —User Domain | Host name of supernode |
| | 274 —DID | E164# |
| For temporary DID records only | Creation Time | Current time when record is created |
| | Expiration Time | Time at which record is to be deleted |

FIG. 13

DID Bank Table Record for Vancouver Subscriber ←276

291 —Username  2001 1050 8667
272 —User Domain  sp.yvr.digifonica.com
274 —DID  1 604 321 3353
         293 295 297 299

FIG. 13A

DID Bank Table Record for Calgary Subscriber ←276

291 —Username  2001 1050 2222
272 —User Domain  sp.yvr.digifonica.com
274 —DID  1 403 516 0744
         293 295 297 299

FIG. 13B

DID Bank Table Record for London Subscriber ←276

291 —Username  4401 1062 4444
272 —User Domain  sp.lhr.digifonica.com
274 —DID  44 020 7487 7900
         293 295 297 299

FIG. 14

Routing Message Buffer — 352

- 354 — Supplier Prefix (optional)   Code identifying supplier traffic
- 356 — Delimiter   Symbol separating fields
- 358 — Callee   PSTN compatible number or Digifonica number
- 360 — Route   Domain name and IP address
- 362 — Time to Live(TTL)   In seconds
- 364 — Caller ID   DID number or username (contents of callee ID buffer)

FIG. 15

Routing Message for Emergency Call — 366

200110506969@sp.yvr.digifonica.com;ttl=9999;CLI=16043213353

Routing Message   Different Node — 366

440110624444@sph.lhr.digifonica.com;ttl=9999;CLI=200110508667

Prefix to Supernode Table Record Format — 370

- 372 — Prefix   First n digits of callee identifier
- 374 — Supernode Address   IP address or fully qualified domain name

FIG. 17

Prefix to Supernode Table Record for London Subscriber

Prefix   4
Supernode Address   sp.lhr.digifonica.com

FIG. 18

Master List Record Format

| | | |
|---|---|---|
| 500 — | ml_id | 1019 |
| 502 — | Dialing code | 1604 |
| 504 — | Country code | The country code is the national prefix to be used when dialing TO a particular country FROM another country. |
| 506 — | Nat Sign #(Area Code) | 604 |
| 508 — | Min Length | 7 |
| 510 — | Max Length | 7 |
| 512 — | NDD | The NDD prefix is the access code used to make a call WITHIN that country from on city to another (when calling another city in the same vicinity, this may not be necessary). |
| 514 — | IDD | The IDD prefix is the international prefix needed to dial a call FROM the country listed TO another country. |
| 516 — | Buffer rate | Safe charge rate above the highest rate charged by suppliers |

FIG. 19

Example: Master List Record with Populated Fields

| | |
|---|---|
| ml_id | 1019 |
| Dialing code | 1604 |
| Country code | 1 |
| Nat Sign #(Area Code) | 604 |
| Min Length | 7 |
| Max Length | 7 |
| NDD | 1 |
| IDD | 011 |
| Buffer rate | $0.009/min |

FIG. 20

Suppliers List Record Format

- 540 — Sup_id — Name code
- 542 — MI_id — Numeric code
- 544 — Prefix (optional) — String identifying supplier's traffic #
- 546 — Route — IP address
- 548 — NDD/IDD rewrite
- 550 — Rate — Cost per second to Digifonica to use this route

FIG. 21

(Telus) Supplier Record

| | |
|---|---|
| Sup_id | 2010 (Telus) |
| MI_id | 1019 |
| Prefix (optional) | 4973# |
| Route | 72.64.39.58 |
| NDD/IDD rewrite | 011 |
| Rate | $0.02/min |

FIG. 22

(Shaw) Supplier Record

| | |
|---|---|
| Sup_id | 2011 (Shaw) |
| MI_id | 1019 |
| Prefix (optional) | 4974# |
| Route | 73.65.40.59 |
| NDD/IDD rewrite | 011 |
| Rate | $0.025/min |

FIG. 23

(Sprint) Supplier Record

| | |
|---|---|
| Sup_id | 2012 (Sprint) |
| MI_id | 1019 |
| Prefix (optional) | 4975# |
| Route | 74.66.41.60 |
| NDD/IDD rewrite | 011 |
| Rate | $0.03/min |

FIG. 24

Routing Message Buffer for Gateway Call — 356

570 — 4973#0116046663655@72.64.39.58;ttl=3600;16046827780
572 — 4974#0116046663655@73.65.40.59;ttl=3600;16046827780
574 — 4975#0116046663655@74.66.41.60;ttl=3600;16046827780

FIG. 25

Call Block Table Record Format

604 — Username       Digifonica #
606 — Block Pattern  PSTN compatible or Digifonica #

FIG. 26

Call Block Table Record for Calgary Subscriber

604 — Username of Callee   2001 1050 2222
606 — Block Pattern        2001 1050 8664

FIG. 27

Call Forwarding Table Record Format for Callee

614 — Username of Callee    Digifonica #
616 — Destination Number    Digifonica #
618 — Sequence Number       Integer indicating order to try this

FIG. 28

Call Forwarding Table Record for Calgary Subscriber

| | | |
|---|---|---|
| 614 — | Username of Callee | 2001 1050 2222 |
| 616 — | Destination Number | 2001 1055 2223 |
| 618 — | Sequence Number | 1 |

FIG. 29

Voicemail Table Record Format

| | | |
|---|---|---|
| 624 — | Username of Callee | Digifonica # |
| 626 — | Vm Server | domain name |
| 628 — | Seconds to Voicemail | time to wait before engaging voicemail |
| 630 — | Enabled | yes/no |

FIG. 30

Voicemail Table Record for Calgary Subscriber

| | | |
|---|---|---|
| 624 — | Username of Callee | 2001 1050 2222 |
| 626 — | Vm Server | vm.yvr.digifonica.com |
| 628 — | Seconds to Voicemail | 20 |
| 630 — | Enabled | 1 |

FIG. 31

Routing Message Buffer for CF/VM Routing Message

650 — 200110502222@sp.yvr.digifonica.com;ttl=3600
652 — 200110552223@sp.yvr.digifonica.com;ttl=3600
654 — vm.yvr.digifonica.com;20;ttl=60
656 — sp.yvr.digifonica.com

FIG. 32

Bye Message

| | | |
|---|---|---|
| 902 ~ | Caller | Username |
| 904 ~ | Callee | PSTN compatible # or Username |
| 906 ~ | Call ID | unique call identifier (hexadecimal string@IP) |

Bye Message

| | | |
|---|---|---|
| 902 ~ | Caller | 2001 1050 8667 |
| 904 ~ | Callee | 2001 1050 2222 |
| 906 ~ | Call ID | FA10@192.168.0.20 |

RC Call Stop Message ⟋1000

| | | |
|---|---|---|
| 1002 — | Caller | Username |
| 1004 — | Callee | PSTN compatible # or Username |
| 1006 — | Call ID | unique call identifier (hexadecimal string@IP) |
| 1008 — | Acct Start Time | start time of call |
| 1010 — | Acct Stop Time | time the call ended |
| 1012 — | Acct Session Time | start time-stop time (in seconds) |
| 1014 — | Route | IP address for the communications link that was established |

FIG. 36

RC Call Stop Message for Calgary Subscriber ⟋1020

| | | |
|---|---|---|
| 1002 — | Caller | 2001 1050 8667 |
| 1004 — | Callee | 2001 1050 2222 |
| 1006 — | Call ID | FA10@192.168.0.20 |
| 1008 — | Acct Start Time | 2006-12-30 12:12:12 |
| 1010 — | Acct Stop Time | 2006-12-30 12:12:14 |
| 1012 — | Acct Session Time | 2 |
| 1014 — | Route | 72.64.39.58 |

FIG. 37

EMERGENCY ASSISTANCE CALLING FOR VOICE OVER IP COMMUNICATIONS SYSTEMS

CROSS REFERENCE TO RELATED APPLICATIONS

This application is a continuation of U.S. application Ser. No. 12/532,989, filed Mar. 5, 2010, which is a national phase entry of PCT/CA2008/00545, filed Mar. 20, 2008, which claims priority to U.S. Provisional Application No. 60/907,224, filed Mar. 26, 2007, all of which are incorporated in their entirety.

BACKGROUND OF THE INVENTION

Field of the Invention

This invention relates to emergency assistance calling, voice over internet protocol communications and methods and apparatus for emergency assistance calling for voice over IP data communications.

An essential feature of traditional telephone systems (PSTN) is the ability of its subscribers to dial a universal emergency number (911 in North America) to access a host of emergency services such as fire, police and ambulance. Because of the hierarchical nature of telephone networks and numbering schemes, a call coming from a specific telephone number on the PSTN network is automatically routed to a nearest Emergency Response Center (ERC) based on the area code and exchange code contained in the specific telephone number. Normally, the specific telephone number will be compliant with the E.164 standard set by the International Telecommunication Union. When the call comes into the ERC, call information presended the ERC operator includes the phone number, and where available, the address associated with this phone number.

Since the late 1990s, an enhanced emergency service (E911) was mandated for PSTN and cellular carriers in North America and elsewhere. In particular, with this enhanced service the information automatically provided to the ERC includes the physical location of the person calling, even where the caller is using a cellular telephone. Moreover, a callback functionality is integrated into E911-compliant systems allowing an ERC operator to call back the person who placed the emergency call even if the original phone call was disconnected or if the calling line became busy.

In the realm of VoIP networks, implementation of 911 and E911 services often presents significant problems.

Even to provide basic 911 services, VoIP systems present a number of problems because they do not employ hierarchical numbering schemes, and the phone numbers assigned to VoIP system subscribers, while still in the E.164 format, do not actually reflect the subscribers physical location via area code and exchange codes. As a result, a VoIP provider is not able to automatically route an emergency call to an ERC nearest to the subscriber. Because VoIP subscriber phone numbers are assigned from a bulk of phone numbers that VoIP providers purchase from wireline PSTN carriers, a VoIP 911 emergency services call coming into the ERC is not associated with a subscriber address that can be accessed by the ERC operator.

In addition, because VoIP systems are not based on the Signaling System 7 (SS7) protocol, they do not natively support special short phone numbers such as 911. In particular, they do not natively support variable length phone number dialing, or dynamic translation of dialed universal phone numbers into actual destination phone numbers based on user attributes such as location or service type.

VoIP systems are also typically not able to comply with E911 service requirements, for the same reasons they are not able to comply with regular 911 services.

In accordance with one aspect of the invention, there is provided a process for handling emergency calls from a caller in a voice over IP system. The method involves receiving a routing request message including a caller identifier and a callee identifier. The method also involves setting an emergency call flag active in response to the callee identifier matching an emergency call identifier pre-associated with the caller. The method further involves producing an emergency response center identifier in response to the emergency call identifier. The method also involves determining whether the caller identifier is associated with a pre-associated direct inward dialing (DID) identifier. The method further involves producing a direct inward dialing (DID) identifier for the caller by associating a temporary DID identifier with the caller identifier when the emergency call flag is active and it is determined that the caller has no pre-associated DID identifier. The method also involves producing a routing message including the emergency response center identifier and the temporary DID identifier for receipt by a routing controller operable to cause a route to be established between the caller and the emergency response center.

Setting the emergency call flag active may involve retrieving a dialing profile associated with the caller and setting the emergency call flag active when the contents of ~n emergency call identifier field of the dialing profile match the callee identifier.

Determining whether the caller identifier is associated with a pre-associated DID identifier may involve searching a database for a DID record associating a DID identifier with the caller and determining that the caller identifier is associated with a pre-associated DID identifier when the record associating a DID identifier with the caller is found.

Associating a pre-assigned DID identifier with the caller identifier may involve copying the pre-associated DID identifier from the DID record to a DID identifier buffer.

Producing the routing message may involve causing the contents of the DID identifier buffer to define the DID identifier in the routing message.

Determining whether the caller identifier is associated with a pre-associated DID identifier may involve searching a database for a DID record associating a DID identifier with the caller and determining that the caller identifier is not associated with a pre-associated DID identifier when a record associating a DID identifier with the caller is not found.

Associating a temporary DID identifier with the caller identifier may involve associating with the caller identifier a DID identifier from a pool of predetermined DID identifiers.

Associating the DID identifier from the pool may involve associating a temporary DID record with the caller, the temporary DID record having a DID identifier field populated with the DID identifier from the pool.

Associating the DID identifier from the pool may involve copying the DID identifier from the temporary DID record to a DID identifier buffer.

The method may involve canceling the temporary DID record after a predefined period of time.

Producing the emergency response center identifier may involve obtaining an emergency response center identifier from an emergency response center field of the dialing profile associated with the caller.

Obtaining may involve copying an emergency response center identifier from the dialing profile associated with the caller to a routing message buffer such that the emergency response center identifier is included in the routing message.

Producing the routing message may involve causing the routing message to specify a maximum call time for the emergency call, the maximum call time exceeding a duration of an average non-emergency telephone call.

In accordance with another aspect of the invention, there is provided an apparatus for handling emergency calls from a caller in a voice over IP system. The apparatus includes provisions for receiving a routing request message including a caller identifier and a callee identifier. The apparatus also includes setting provisions for setting an emergency call flag active in response to the callee identifier matching an emergency call identifier pre-associated with the caller. The apparatus further includes provisions for producing an emergency response center identifier in response to the emergency call identifier. The apparatus also includes provisions for determining whether the caller identifier is associated with a pre-associated direct inward dialing (DID) identifier. The apparatus further includes provisions for producing a direct inward dialing (DID) identifier for the caller including provisions for associating a temporary DID identifier with the caller identifier in response to the emergency call flag being active and the caller identifier not being pre-associated with direct inward dialing identifier. The provisions for producing a direct inward dialing (DID) identifier for the caller further include provisions for associating a pre-assigned DID identifier with the caller identifier when the caller identifier has no pre-associated direct inward dialing identifier. The apparatus also includes provisions for producing a routing message including the emergency response center identifier and the temporary DID identifier for receipt by a routing controller operable to cause a route to be established between the caller and the emergency response center.

The apparatus may further include provisions for accessing a database of dialing profiles associated with respective subscribers to the system, each of the dialing profiles including an emergency call identifier field and an emergency call center field and the setting provisions may comprise provisions for retrieving a dialing profile associated with the caller and for setting the emergency call flag active when the contents of the emergency call identifier field of the dialing profile match the callee identifier.

The apparatus may further include database accessing provisions for accessing a database including direct inward dialing (DID) records associated with at least some subscribers to the system, each of the direct inward dialing records comprising a system username and a direct inward dialing number, and wherein the determining provisions comprise searching provisions for searching a database for a DID record associating a DID identifier with the caller. The determining provisions may be operably configured to determine that the caller identifier is associated with a pre-associated DID identifier when a record associating a DID identifier with the caller is found.

The apparatus may further include a DID identifier buffer and the provisions for associating a pre-assigned DID identifier with the caller identifier may comprise provisions for copying the pre-associated DID identifier from the DID record to the DID identifier buffer.

The provisions for producing the routing message may include provisions for causing the contents of the DID identifier buffer to define the DID identifier in the routing message.

The apparatus may further include database accessing provisions for accessing a database including direct inward dialing records associated with at least some subscribers to the system, each of the direct inward dialing records comprising a system username and a direct inward dialing number and the determining provisions may comprise searching provisions for searching a database for a DID record associating a DID identifier with the caller and wherein the determining provisions may be operably configured to determine that the caller identifier is not associated with a pre-associated DID identifier when a record associating a DID identifier with the caller is not found.

The apparatus may further include provisions for accessing a pool of predetermined DID identifiers and the provisions for associating a temporary DID identifier with the caller identifier may comprise provisions for associating a DID identifier from the pool of pre-determined DID identifiers with the caller identifier.

The provisions for associating the DID identifier from the pool may include provisions for associating a temporary DID record with the caller, the temporary DID record having a DID identifier field populated with the DID identifier from the pool.

The provisions for associating the DID identifier may include provisions for copying the DID identifier from the temporary DID record to a DID identifier buffer.

The apparatus may further include provisions for canceling the temporary DID record after a period of time.

The provisions for producing the emergency response center identifier may include provisions for obtaining an emergency response center identifier from an emergency response center field of the dialing profile associated with the caller.

The apparatus may include a routing message buffer and the provisions for obtaining may include provisions for copying the contents of the emergency response center field of the dialing profile associated with the caller to the routing message buffer such that the contents of the emergency response center field are included in the routing message.

The provisions for producing the routing message may include provisions for causing the routing message to include a maximum call time for the emergency call, the maximum call time exceeding a duration of an average non-emergency telephone call.

In accordance with another aspect of the invention, there is provided an apparatus for handling emergency calls from a caller in a voice over IP system. The apparatus includes an processor circuit operably configured to receive a routing request message including a caller identifier and a callee identifier. The processor circuit is also operably configured to set an emergency call flag active in response to the callee identifier matching an emergency call identifier pre-associated with the caller. The processor circuit is further operably configured to produce an emergency response center identifier in response to the emergency call identifier and to determine whether the caller identifier is associated with a pre-associated direct inward dialing (DID) identifier. The processor circuit is also operably configured to produce a direct inward dialing (DID) identifier for the caller by associating a temporary DID identifier with the caller identifier when the emergency call flag is active and it is determined that the caller identifier has no pre-associated DID identifier. The processor circuit is further operably configured to produce a routing message including the emergency response center identifier and the temporary DID identifier for receipt by a routing controller operable to cause a route to be established between the caller and the emergency response center.

The processor circuit may be operably configured to retrieve a dialing profile associated with the caller and to set the emergency call flag active when the contents of an emergency call identifier field of the dialing profile match the callee identifier.

The processor circuit may be operably configured to search a database for a DID record associating a DID identifier with the caller and to determine that the caller identifier is associated with a pre-associated DID identifier when the record associating a DID identifier with the caller is found.

The processor circuit may be operably configured to copy the pre-associated DID identifier from the DID record to a DID identifier buffer.

The processor circuit may be operably configured to cause the contents of the DID identifier buffer to define the DID identifier in the routing message.

The processor circuit may be operably configured to search a database for a DID record associating a DID identifier with the caller and to determine that the caller identifier is not associated with a pre-associated DID identifier when a record associating a DID identifier with the caller is not found.

The processor circuit may be operably configured to associate with the caller identifier a DID identifier from a pool of pre-determined DID identifiers.

The processor circuit may be operably configured to associate a temporary DID record with the caller, the temporary DID record having a DID identifier field populated with the DID identifier from the pool.

The processor circuit may be operably configured to copy the DID identifier from the temporary DID record to a DID buffer.

The processor circuit may be operably configured to cancel the temporary DID record after a period of time.

The processor circuit may be operably configured to obtain an emergency response center identifier from an emergency response center field of the dialing profile associated with the caller.

The apparatus may further a routing message buffer and the processor circuit may be operably configured to copy an emergency response center identifier from the dialing profile associated with the caller to the routing message buffer such that the emergency response center identifier is included in the routing message.

The processor circuit may be operably configured to cause the routing message to include a maximum call time for the emergency call, the maximum call time exceeding a duration of an average non-emergency telephone call.

In accordance with another aspect of the invention, there is provided a computer readable medium encoded with codes for directing a processor circuit to handle emergency calls from callers in a voice over IP system. The codes direct the processor circuit to receive a routing request message including a caller identifier and a callee identifier. The codes also direct the processor circuit to set an emergency call flag active in response to the callee identifier matching an emergency call identifier pre-associated with the caller. The codes further direct the processor circuit to produce an emergency response center identifier in response to the emergency call identifier. The codes also direct the processor circuit to determine whether the caller identifier is associated with a pre-associated direct inward dialing (DID) identifier. The codes further direct the processor circuit to produce a direct inward dialing (DID) identifier for the caller by associating a temporary DID identifier with the caller identifier when the emergency call flag is active and it is determined that the caller identifier has no pre-associated DID identifier. The codes also direct the processor circuit to produce a routing message including the emergency response center identifier and the temporary DID identifier for receipt by a routing controller operable to cause a route to be established between the caller and the emergency response center.

BRIEF DESCRIPTION OF THE DRAWINGS

In drawings which illustrate embodiments of the invention,

FIG. 9 is a tabular representation of a dialing profile stored in a database accessible by the RC shown in FIG. 1;

FIG. 10 is a tabular representation of a dialing profile for a Vancouver caller using the caller telephone shown in FIG. 1;

FIG. 10A is a tabular representation of a dialing profile for the Emergency Response Center subscriber shown in FIG. 1;

FIG. 11 is a tabular representation of a dialing profile for the Calgary subscriber shown in FIG. 1;

FIG. 12 is a tabular representation of a dialing profile for the London subscriber shown in FIG. 1;

FIG. 13 is a tabular representation of a DID bank table record stored in the database shown in FIG. 1;

FIG. 13A is a tabular representation of an exemplary DID bank table record for the Vancouver subscriber;

FIG. 13B is a tabular representation of an exemplary DID bank table record for the Calgary subscriber;

FIG. 14 is a tabular representation of an exemplary DID bank table record for the London subscriber;

FIG. 15 is a tabular representation of a routing message buffer for holding a routing message to be transmitted from the RC to the call controller shown in FIG. 1;

FIG. 16 is a tabular representation of a routing message for routing a call to the Emergency Response Center;

FIG. 16A is a tabular representation of a routing message for routing a call to the London subscriber;

FIG. 17 is a tabular representation of a prefix to supernode table record stored in the database shown in FIG. 1;

FIG. 18 is a tabular representation of a prefix to supernode table record that would be used for the London subscriber;

FIG. 19 is a tabular representation of a master list record stored in a master list table in the database shown in FIG. 1;

FIG. 20 is a tabular representation of an exemplary populated master list record;

FIG. 21 is a tabular representation of a suppliers list record stored in the database shown in FIG. 1;

FIG. 22 is a tabular representation of a specific supplier list record for a first supplier;

FIG. 23 is a tabular representation of a specific supplier list record for a second supplier;

FIG. 24 is a tabular representation of a specific supplier list record for a third supplier;

FIG. 25 is a tabular representation of a routing message buffer for holding a routing message identifying a plurality of possible suppliers that may carry the call;

FIG. 26 is a tabular representation of a call block table record;

FIG. 27 is a tabular representation of a call block table record for the Calgary subscriber;

FIG. 28 is a tabular representation of a call forwarding table record;

FIG. 29 is a tabular representation of an exemplary call forwarding table record specific to the Calgary subscriber;

FIG. 30 is a tabular representation of a voicemail table record specifying voicemail parameters to enable the caller to leave a voicemail message for the callee;

FIG. 31 is a tabular representation of an exemplary voicemail table record for the Calgary subscriber;

FIG. 32 is a tabular representation of an exemplary routing message, held in a routing message buffer, indicating call forwarding numbers and a voicemail server identifier;

FIG. 36 is a tabular representation of an exemplary RC Call Stop message;

FIG. 37 is a tabular representation of an exemplary RC Call Stop message for the Calgary subscriber;

DETAILED DESCRIPTION

Figure 1:
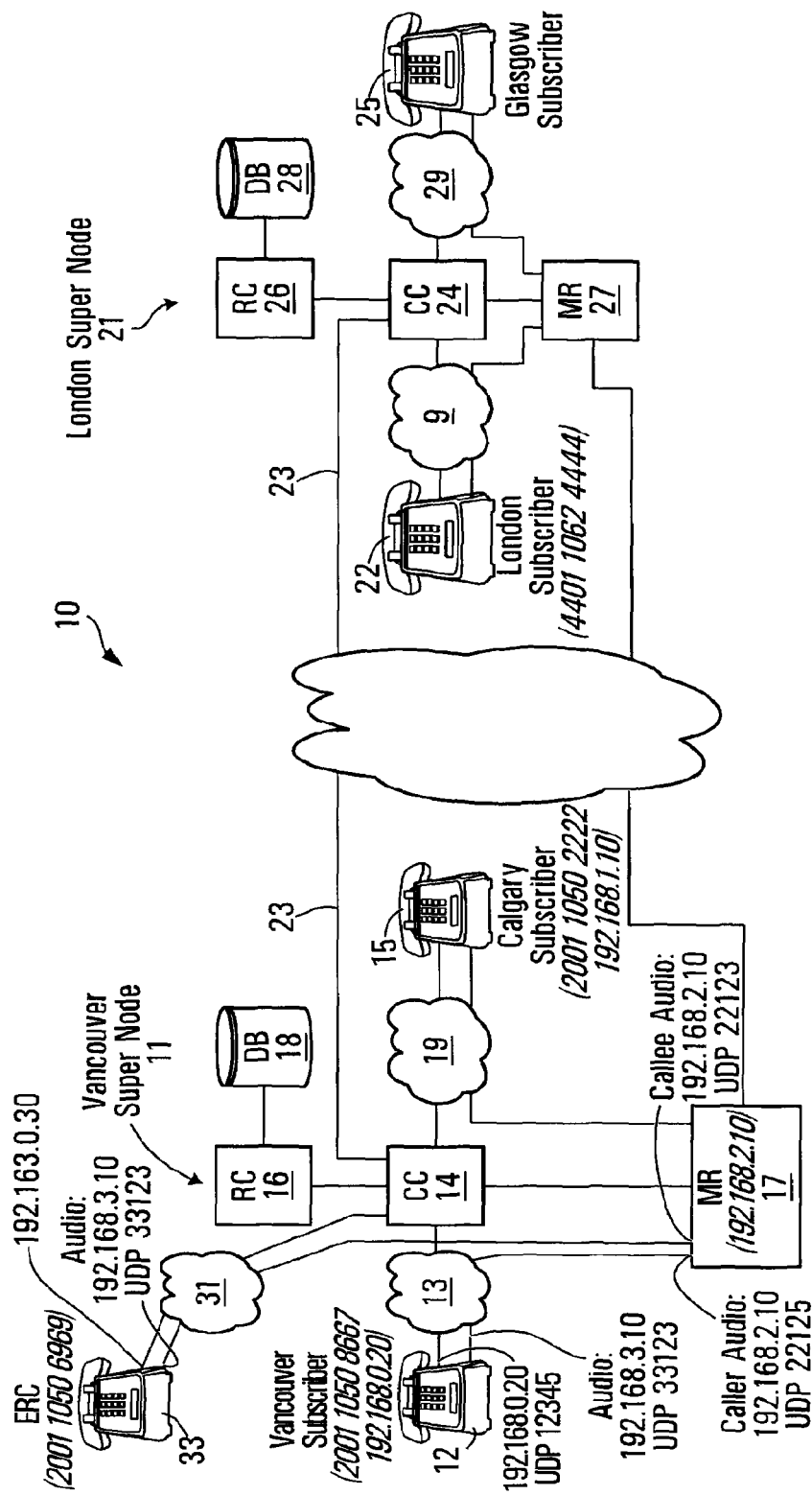
FIG. 1 is a block diagram of a system according to a first embodiment of the invention.

Referring to FIG. 1, a system for making voice over IP telephone calls including emergency calls is shown generally at 10. The system includes a first supernode shown generally at 11 and a second supernode shown generally at 21. The first supernode 11 is located in a geographical area, such as Vancouver B.C., for example and the second supernode 21 is located in London, England, for example. Different supernodes may be located in different geographical regions throughout the world to provide telephone service to subscribers in respective regions. These supernodes may be in communication with each other through high speed/high data throughput links including optical fiber, satellite and/or cable links, for example, forming a system backbone. These supernodes may alternatively or in addition be in communication with each other through conventional Internet services. In the embodiment shown, data communication media for providing for data communications between the first and second supernodes 11 and 21 are shown generally at 23 and may include very high speed data links, for example.

In the embodiment shown, the Vancouver supernode 11 provides telephone service to a geographical region comprising Western Canadian customers from Vancouver Island to Ontario and includes a Vancouver subscriber, a Calgary subscriber and an emergency response center (ERC) that is also a subscriber. The second supernode 21 may be located in London, England, for example, to service London and Glasgow subscribers, 22 and 25, for example through their own service providers 9 and 29. As will be seen below however, the emergency response center need not be a subscriber.

Other supernodes similar to the type shown may also be employed within the geographical area serviced by a supernode, to provide for call load sharing, for example within a region of the geographical area serviced by the supernode. However, in general, all supernodes are similar and have the properties described below in connection with the Vancouver supernode 11.

In this embodiment, the Vancouver supernode includes a call controller (CC) 14, a outing controller (RC) 16, a database 18 and a media relay (MR) 17. Subscribers such as the Vancouver subscriber, the Calgary subscriber and the Emergency Response Center subscriber communicate with the Vancouver supernode 11 using their own Internet Service Providers (ISPs) 13, 19 and 31 respectively which route Internet Protocol (IP) traffic from these subscribers to the Vancouver Supernode over the Internet. To these subscribers the Vancouver supernode 11 is accessible through their ISP at a pre-determined IP address or a fully qualified domain name (FQDN). The subscriber in the city of Vancouver uses a telephone 12 that is capable of communicating with the Vancouver supernode 11 using Session Initiation Protocol (SIP) messages, and the Calgary and Emergency Response Center subscribers use similar telephones 15 and 33 respectively, to communicate with the Vancouver supernode from their locations. The London supernode 21 also has a call controller 24, a routing controller 26 and a database 28 and functions in a manner similar to the Vancouver supernode 11.

It should be noted that throughout the description of the embodiments of this invention, the IP/UDP addresses of all elements such as the caller and callee telephones, call controller, media relay, and any others, will be assumed to be valid IP/UDP addresses directly accessible via the Internet or a private IP network, for example, depending on the specific implementation of the system. As such, it will be assumed, for example, that the caller and callee telephones will have IP/UDP addresses directly accessible by the call controllers and the media relays on their respective supernodes, and those addresses will not be obscured by Network Address Translation (NAT) or similar mechanisms. In other words, the IP/UDP information contained in SIP messages (for example the SIP Invite message or the RC Request message which will be described below) will match the IP/UDP addresses of the IP packets carrying these SIP messages.

It will be appreciated that in many situations, the IP addresses assigned to various elements of the system may be in a private IP address space, and thus not directly accessible from other elements. Furthermore, it will also be appreciated that NAT is commonly used to share a "public" IP address between multiple devices, for example between home PCs and IP telephones sharing a single Internet connection. For example, a home PC may be assigned an IP address such as 192.168.0.101 and a Voice over IP telephone may be assigned an IP address of 192.168.0.103. These addresses are located in so called "non-routable" (IP) address space and cannot be accessed directly from the Internet. In order for these devices to communicate with other computers located on the Internet, these IP addresses have to be converted into a "public" IP address, for example 24.10.10.123 assigned by the Internet Service Provider to the subscriber, by a device performing NAT, typically a home router. In addition to translating the IP addresses, NAT typically also translates UDP port numbers, for example an audio path originating at a VoIP telephone and using a UDP port 12378 at its private IP address, may have been translated to UDP port 23465 associated with the public IP address of the NAT device. In other words, when a packet originating from the above VoIP telephone arrives at an Internet-based supernode, the source IP/UDP address contained in the IP packet header will be 24.10.10.123:23465, whereas the source IP/UDP address information contained in the SIP message inside this IP packet will be 192.168.0.103:12378. The mismatch in the IP/UDP addresses may cause a problem for SIP-based VoIP systems because, for example, a supernode will attempt to send messages to a private address of a telephone—the messages will never get there.

It will be appreciated that a number of methods are available to overcome this problem. For example, the SIP NATHelper open source software module may run on the supernode to correlate public IP/UDP address contained in the headers of the IP packets arriving from SIP devices with private IP/UDP addresses in the SIP messages contained in these packets. Therefore, the embodiments of the invention described below will function whether or not any of the elements of the system are located behind NAT devices that obscure their real IP/UDP addresses.

Referring to FIG. 1, in an attempt to make a regular call by the Vancouver telephone 12 to the London telephone 22, for example, the Vancouver telephone sends a SIP Invite message to the Vancouver supernode 11 and in response, the call controller 14 sends an RC Request message to the routing controller 16 which makes various enquiries of the database 18 to produce a routing message which is sent to the call controller. The call controller 14 then causes a communications link, including audio paths, to be established through the media relay 17 which may include the same Vancouver supernode 11, a different supernode or a communications supplier gateway, for example, to carry voice traffic to and from the call recipient or callee.

In an attempt to make an emergency call, generally the call is made by dialing a short number such as 911 and the call is routed to an emergency response center (ERC) associated with the caller such as the emergency response center associated with the telephone 33. However, as will be appreciated from the description below, this system will permit emergency calls originating from subscribers associated with one supernode to be received by emergency response centers associated with a different supernode, if necessary.

Subscriber Telephone

Figure 2:
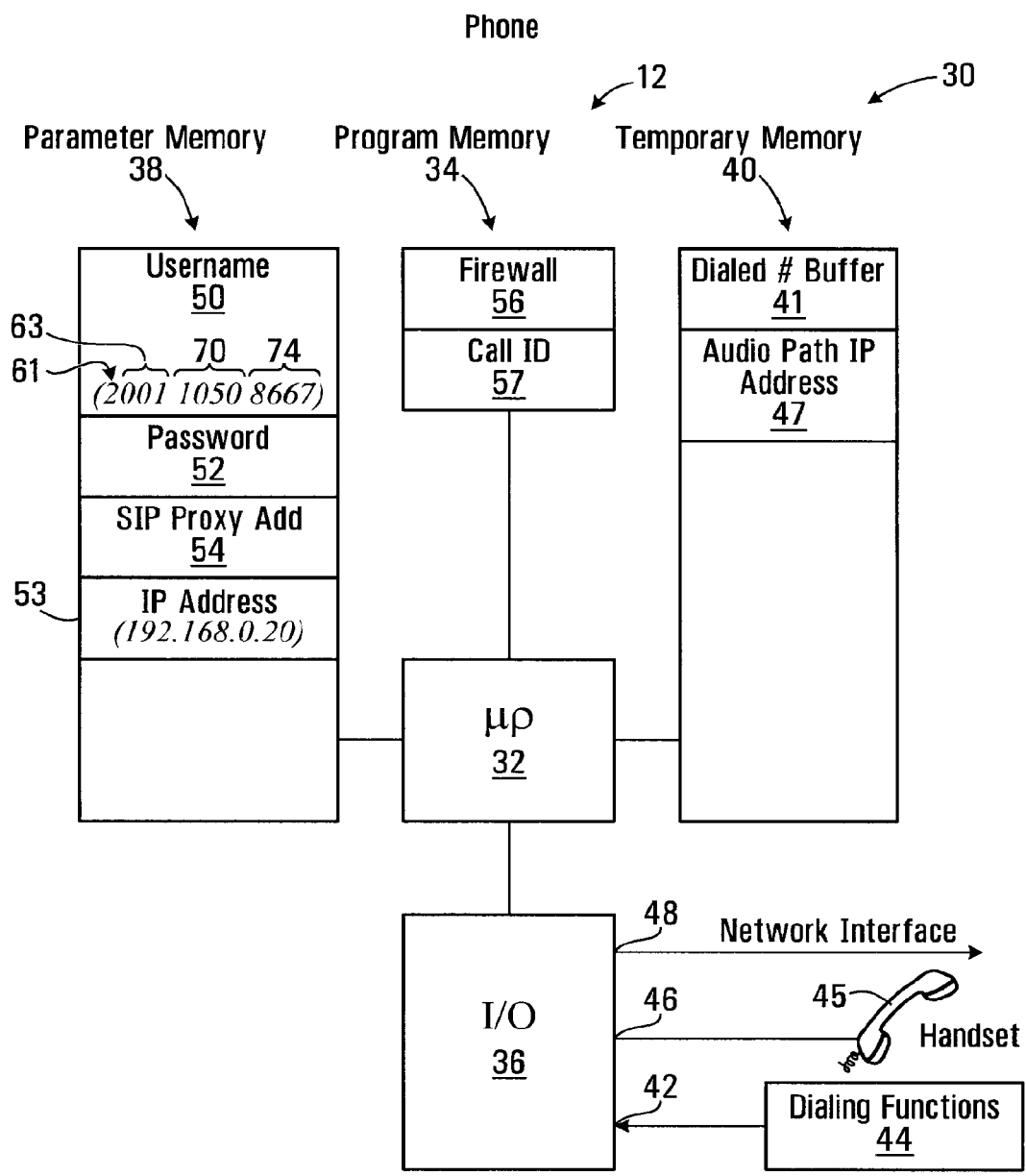
FIG. 2 is a block diagram of a caller VoIP telephone according to the first embodiment of the invention.

Referring to FIG. 2, in this embodiment, the telephone 12 includes a processor circuit shown generally at 30 comprising a microprocessor 32, program memory 34, an input/output (I/O) interface 36, parameter memory 38 and temporary memory 40. The program memory 34, I/O interface 36, parameter memory 38 and temporary memory 40 are all in communication with the microprocessor 32. The I/O interface 36 has a dial input 42 for receiving a dialed telephone number from a keypad. For example, or from a voice recognition unit or from pre-stored telephone numbers stored in the parameter memory 38, for example. For simplicity, a box labeled dialing functions 44 represents any device capable of informing the microprocessor 32 of a callee identifier, e.g., a callee telephone number.

The processor 32 stores the callee identifier in a dialed number buffer 41. Where the callee is the London subscriber, the callee identifier may be 4401 1062 4444, for example, identifying the London subscriber or the callee identifier may be a standard telephone number, or where the callee is the Emergency Response Center, the callee identifier may be 911, for example.

The I/O interface 36 also has a handset interface 46 for receiving and producing signals from and to a handset that receives user's speech to produce audio signals and produces sound in response to received audio signals. The handset interface 46 may include a BLUETOOTH™ wireless interface, a wired interface or speakerphone, for example. The handset 45 acts as a termination point for an audio path (not shown) which will be appreciated later.

The I/O interface 36 also has a network interface 48 to an IP network, and is operable, for example, to connect the telephone to an ISP via a high speed Internet connection. The network interface 48 also acts as a part of the audio path, as will be appreciated later.

The parameter memory 38 has a username field 50, a password field 52, an IP address field 53 and a SIP proxy address field 54. The username field 50 is operable to hold a username associated with the telephone 12, which in this case is 2001 1050 8667. The username is assigned upon subscription or registration into the system and, in this embodiment includes a twelve digit number having a prefix 61, a country code 63, a dealer code 70 and a unique number code 74. The prefix 61 is comprised of the first or left-most digit of the username in this embodiment. The prefix may act as a continent code in some embodiments, for example. The country code 63 is comprised of the next three digits. The dealer code 70 is comprised of the next four digits and the unique number code 74 is comprised of the last four digits. The password field 52 holds a password of up to 512 characters, in this example. The IP address field 53 stores an IP address of the telephone 30, which for this explanation is 192.168.0.20. The SIP proxy address field 54 stores an IP address of a SIP proxy which may be provided to the telephone 12 through the network interface 48 as part of a registration procedure, for example.

The program memory 34 stores blocks of codes for directing the microprocessor 32 to carry out the functions of the telephone 12, one of which includes a firewall block 56 which provides firewall functions to the telephone, to prevent unauthorized access through the network interface 48 to the microprocessor 32 and memories 34, 38 and 40. The program memory 34 also stores codes 57 for establishing a call ID. The call ID codes 57 direct the microprocessor 32 to produce call identifiers, that may, for example have the format of a hexadecimal string and an IP address of the telephone stored in IP address field 53. Thus, an exemplary call identifier for a call might be FF10 @ 192.168.0.20.

Figures 3, 4:
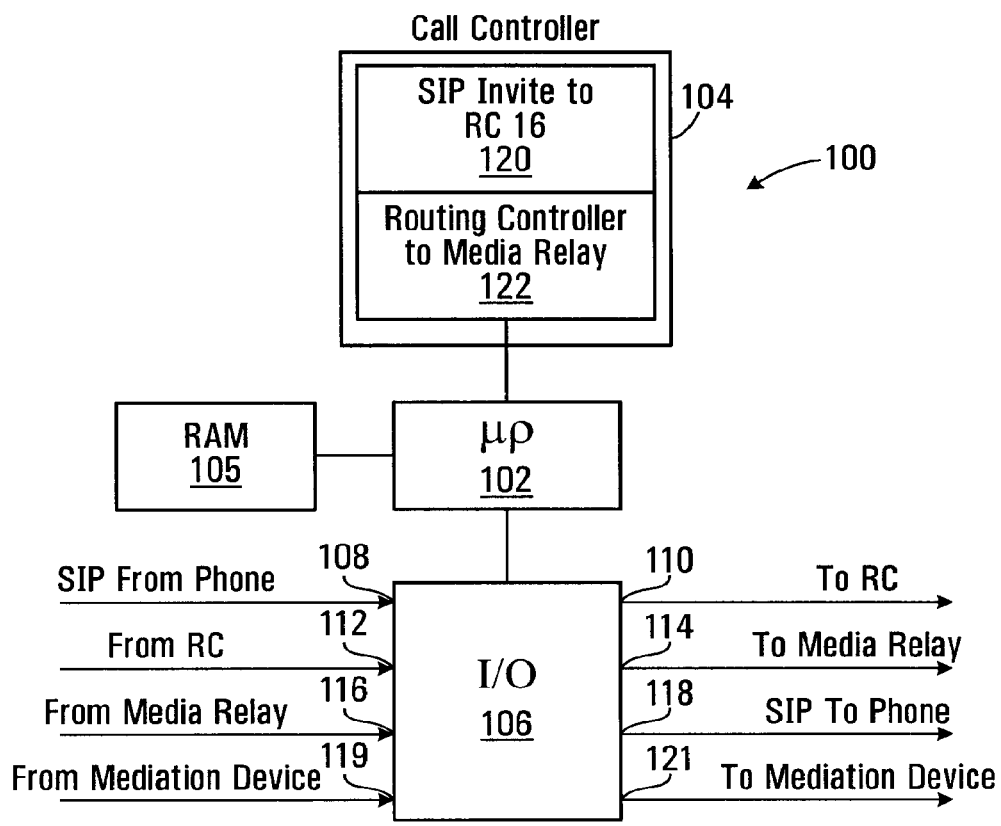
FIG. 3 is a schematic representation of a SIP Invite message transmitted between the caller telephone and a call controller (CC) shown in FIG. 1.
FIG. 4 is a block diagram of the call controller shown in FIG. 1.

Generally, in response to activating the handset 45 and using the dialing function 44, the microprocessor 32 produces and sends a SIP Invite message 59 as shown in FIG. 3, to the routing controller (RC) 14 shown in FIG. 1.

Referring to FIG. 3, the SIP Invite message includes a caller identifier field 60, a callee identifier field 62, a digest parameters field 64, a call ID field 65, a caller IP address field 67 and a caller UDP port field 69. In this embodiment, the caller identifier field 60 includes the username 2001 1050 8667, which is the username stored in the username field 50 of the parameter memory 38 in the Vancouver telephone 12 shown in FIG. 2. In addition, as an example, referring back to FIG. 3, where the call is a normal, non-emergency call to the London subscriber the callee identifier field 62 includes the username 4401 1062 4444 which is the dialed number of the London subscriber stored in the dialed number buffer 41 shown in FIG. 2. The digest parameters field 64 includes digest parameters and the call ID field 65 includes a code comprising a generated prefix code (FF10, for example) and a suffix which is the IP address of the telephone 12 stored in the IP address field 53. The IP address field 67 and UDP port field 69 define a socket for audio communications. The IP address field 67 holds the IP address assigned to the telephone, in this embodiment 192.168.0.20, and the caller UDP port field 69 includes a UDP port identifier identifying a UDP port at which the audio path will be terminated at the caller's telephone.

Call Controller

Referring to FIG. 4, a call controller circuit of the call controller 14 (FIG. 1) is shown in greater detail at 100. The call controller circuit 100 includes a microprocessor 102, program memory 104, random access memory 105 and an I/O interface 106. The call controller circuit 100 may include a plurality of microprocessors, a plurality of program memories and a plurality of I/O interfaces to be able to handle a large volume of calls. However, for simplicity, the call controller circuit 100 will be described as having only one microprocessor, program memory and I/O interface, it being understood that there may be more.

Generally, the I/O interface 106 includes an input 108 for receiving messages, such as the SIP Invite message shown in FIG. 3, from the telephone 12 shown in FIG. 2. The 110 interface 106 also has an RC Request message output 110 for transmitting an RC Request message to the routing controller 16 in FIG. 1, an RC message input 112 for receiving routing messages from the RC 16, a MR output 114 for transmitting messages to the media relay 17 (FIG. 1) to advise the media relay to establish an audio path, and a MR input 116 for receiving messages from the media relay to which a message has been sent to attempt to establish the audio path. The 110 interface 106 further includes a SIP output 118 for transmitting SIP messages to the telephone 12 (FIG. 2) to advise the telephone of the IP address of the media relay 17 (FIG. 1) which will establish the audio path.

While certain inputs and outputs have been shown as separate, it will be appreciated that some may be associated with a single IP address and TCP or UDP port. For example, the messages sent and received from the RC 16 may be transmitted and received at the same single IP address and TCP or UDP port.

The program memory 104 of the call controller circuit 100 includes blocks of code for directing the microprocessor 102 to carry out various functions of the call controller 14. For example, these blocks of code include a first block 120 for causing the call controller circuit 100 to execute a SIP Invite to RC request process to produce a RC Request message in response to a received SIP Invite message. In addition, there is a Routing Message to Media Relay message block 122 which causes the call controller circuit 100 to produce an MR Query message in response to a received routing message from the routing controller 16.

Figure 5:
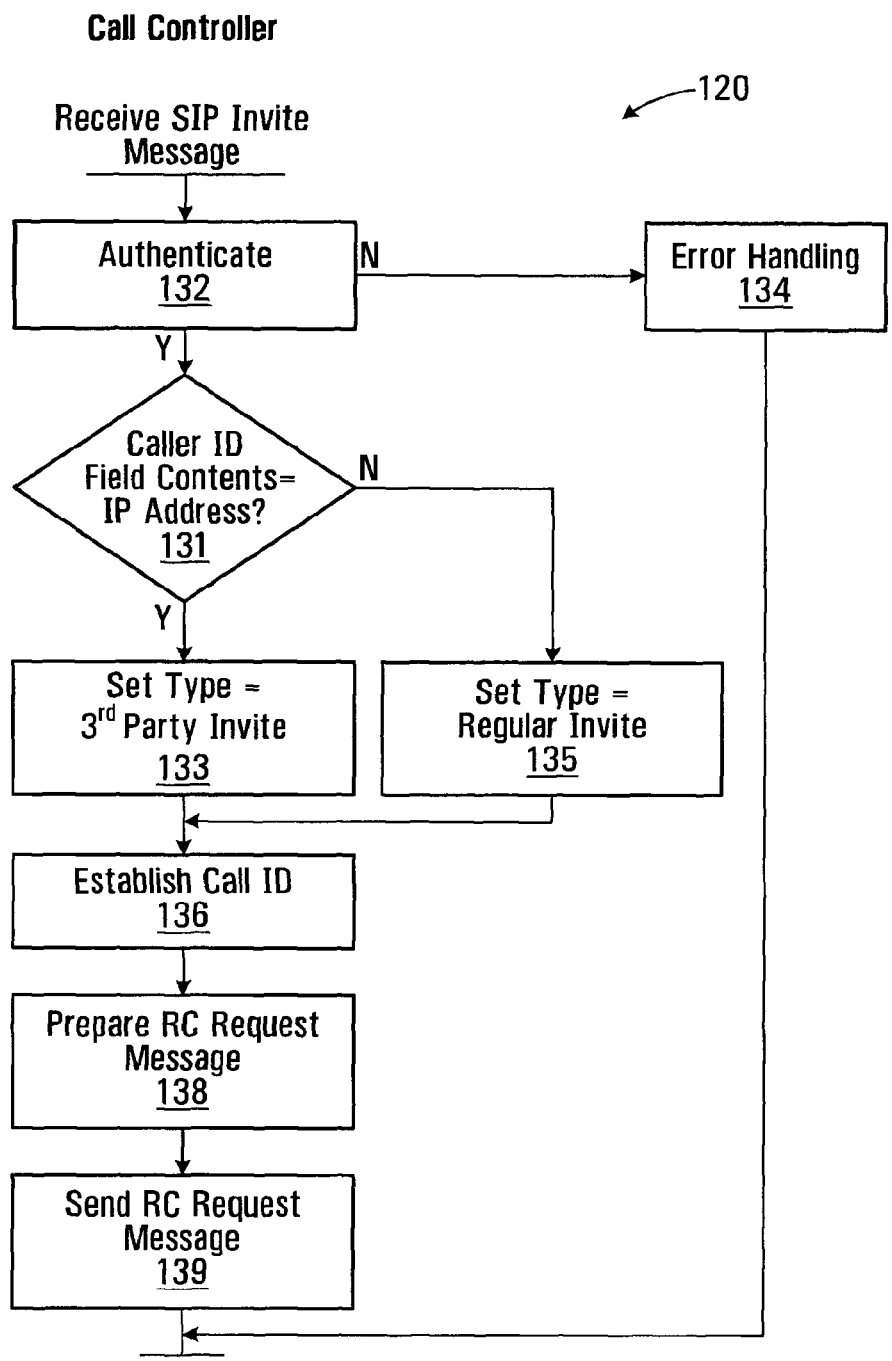
FIG. 5 is a flowchart of a process executed by the call controller shown in FIG. 1.

Referring to FIG. 5, the SIP Invite-to-RC Request process is shown in more detail at 120. On receipt of a SIP Invite message of the type shown in FIG. 3, block 132 of FIG. 5 directs the call controller circuit 100 of FIG. 4 to authenticate the user operating the telephone from which the SIP Invite message originated. This may be done, for example, by prompting the user for a password by sending a message back to the caller telephone 12 in FIG. 1, which is interpreted at the telephone as a request for password entry or the password may automatically be sent to the call controller 14 from the telephone, in response to the message. The call controller 14 may then make enquiries of the database 18 to determine whether or not the user's password matches a password stored in the database. Various functions may be used to pass encryption keys or hash codes back and forth to ensure the secure transmission of passwords. Authentication may be bypassed when the call is to the ERC.

Should the authentication process fail, the call controller circuit 100 is directed to an error handling block 134 which causes messages to be displayed at the caller telephone 12 to indicate that there was an authentication error. If the authentication process is successful, block 131 directs the call controller circuit 100 of FIG. 4 to determine whether or not the contents of the caller identifier field 60 of the SIP Invite message shown in FIG. 3 is a validly formatted IP address. If it is a valid IP address, then block 133 of FIG. 5 directs the call controller circuit 100 of FIG. 4 to associate a type code with the call to indicate that the call type is a third party invite.

If at block 131 the caller identifier field 60 contents do not identify an IP address (for example, they may identify a PSTN number or Emergency Calling short number such as 911), then block 135 directs the call controller circuit 100 to associate a type code with the call to indicate the call type is a regular invite. Then, block 136 directs the call controller circuit 100 to establish a call ID by reading the call ID provided in the call ID field 65 of the SIP Invite message from the telephone 12, and at block 138 the call controller circuit is directed to produce a routing request message of the type shown in FIG. 6 that includes that call ID. Block 139 of FIG. 5 then directs the call controller circuit 100 of FIG. 4 to send the RC Request message to the routing controller 16 of FIG. 1.

Figures 6, 7:
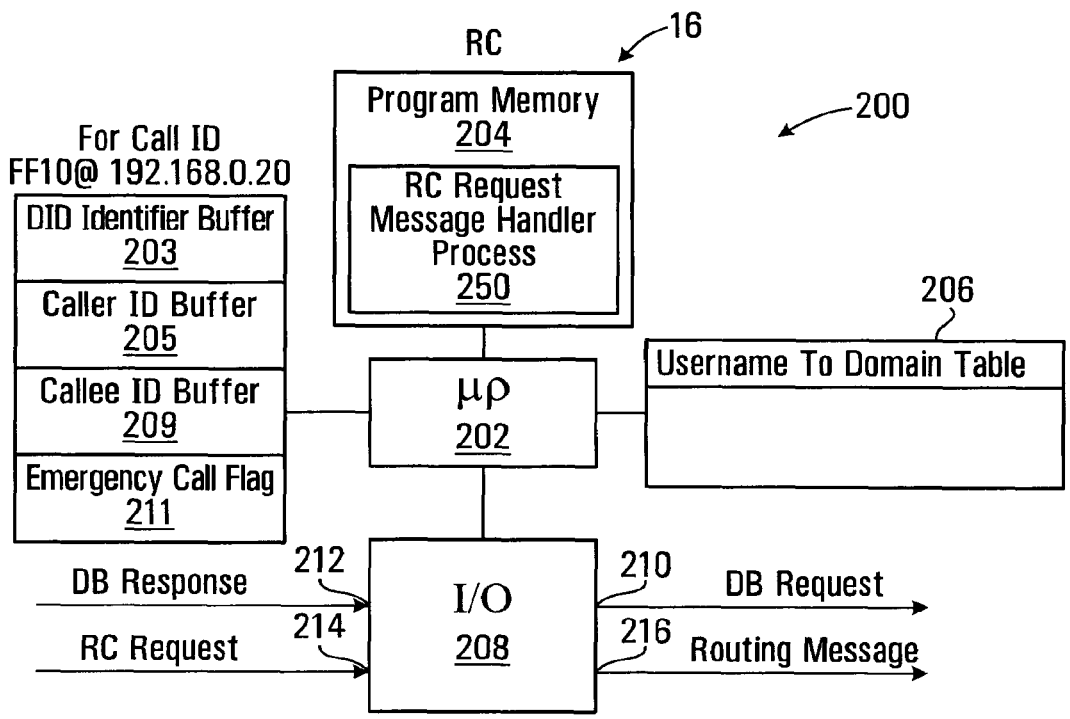
FIG. 6 is a schematic representation of a routing controller (RC) Request message produced by the call controller shown in FIG. 1.
FIG. 7 is a block diagram of a routing controller (RC) processor circuit of the routing controller shown in FIG. 1.

Referring to FIG. 6, a routing request message is shown generally at 150 and includes a caller identifier field 152, a callee identifier field 154, a digest field 156, a call ID field 158 and a type field 160. The caller, callee, digest, and call ID fields 152, 154, 156 and 158 contain copies of the caller, callee, digest parameters and call ID fields 60, 62, 64 and 65 of the SIP Invite message shown in FIG. 3. The type field 160 contains the type code established at blocks 133 or 135 of FIG. 5 to indicate whether the call is from a third party or system subscriber, respectively. For a normal non-emergency call the callee identifier field 154 may include a PSTN number or a system subscriber username as shown, for example. For an emergency call, the callee identifier field 154 includes the Emergency short number 911, in this embodiment.

Routing Controller

Referring to FIG. 7, the routing controller 16 is shown in greater detail and includes an RC processor circuit shown generally at 200. The RC processor circuit 200 includes a processor 202, program memory 204, a table memory 206, a DID identifier buffer 203, a caller ID buffer 205, a callee ID buffer 209, an emergency call flag 211, a DID identifier buffer 203, a and an I/O interface 208, all in communication with the processor. (As earlier indicated, there may be a plurality of processors (202), memories (204), etc.) Separate caller ID buffers 205, callee id buffers 209 and emergency call flags 211 are instantiated for each call and are associated with respective call IDs.

The I/O interface 208 includes a database output port 210 through which a request to the database 18 (FIG. 1) can be made and includes a database response port 212 for receiving a reply from the database. The I/O interface 208 further includes an RC Request message input 214 for receiving the routing request message from the call controller 14. Thus, the routing controller receives a routing request message including a caller identifier and a callee identifier. The I/O interface 208 further includes a routing message output 216 for sending a routing message back to the call controller 14.

The program memory 204 includes blocks of codes for directing the RC processor circuit 200 to carry out various functions of the routing controller 16. One of these blocks includes an RC Request message handler process 250 which directs the RC processor circuit to produce a routing message in response to a received routing request message of the type shown at 150 in FIG. 6. The RC Request message handler process is shown in greater detail at 250 in FIGS. 8A through 8D.

RC Request Message Handler

Figure 8A:
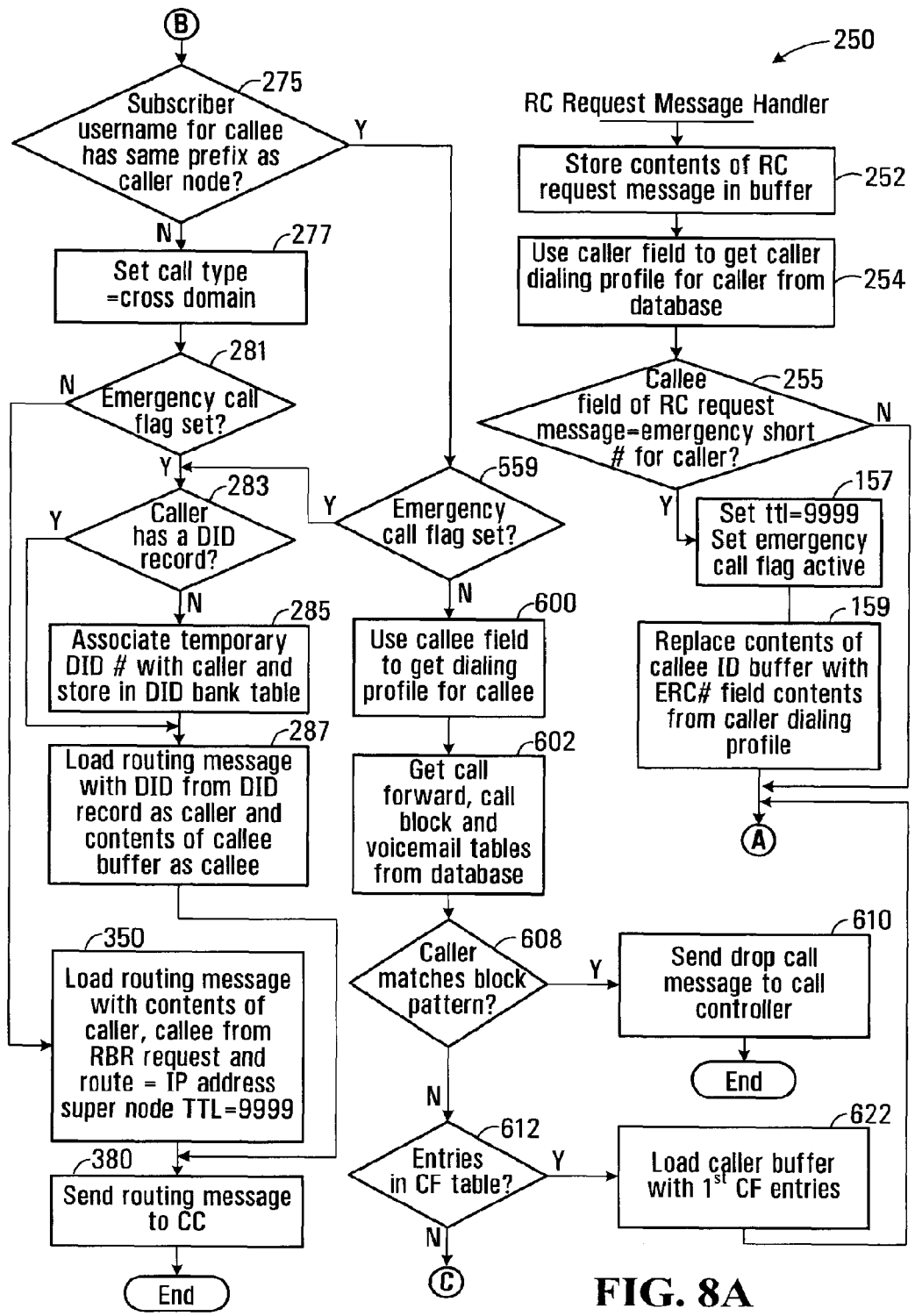
FIGS. 8A-8D are flowcharts of a RC Request message handler executed by the RC processor circuit shown in FIG. 7.

Referring to FIG. 8A, the routing request message handler 250 begins with a first block 252 that directs the RC processor circuit 200 (FIG. 7) to store the contents of the RC Request message 150 (FIG. 6) in the callee ID buffer 209 and the caller buffer 205 buffers for separately storing the contents of the callee field (154 in FIG. 6) and the caller field (152 in FIG. 6) respectively of the RC Request message. Block 254 then directs the RC processor circuit 200 to use the contents of the caller field (152 in FIG. 6) in the RC Request message 150, to search the database 18 shown in FIG. 1 and retrieve a dialing profile associated with the caller.

Referring to FIG. 9, a dialing profile is shown generally at 256 and includes system fields including a username field 258, a domain field 260, a national dialing digits (NDD) field 262, an International dialing digits (IDD) field 264, a country code field 266, a local area codes field 267, a caller minimum local length field 268, a caller maximum local length field 270, a reseller field 273, a user address field 275, an emergency call identifier field 277 and an emergency response center (ERC) field 279.

An exemplary dialing profile for the Vancouver subscriber is shown generally at 276 in FIG. 10 and indicates that the username field 258 includes the username 2001 1050 8667 which is the same as the contents of the username field 50 in the Vancouver telephone 12 shown in FIG. 2.

Referring back to FIG. 10, the domain field 260 includes a domain name as shown at 282, including a supernode type identifier 284, a location code identifier 286, a system provider identifier 288 and a top level domain identifier 290, identifying a domain or supernode associated with the user identified by the contents of the username field 258.

In this embodiment, the supernode type identifier 284 includes the code "sp" identifying a supernode and the location code identifier 286 identifies the supernode as being in Vancouver (yvr). The system provider identifier 288 identifies the company supplying the service and the top level domain identifier 290 identifies the "com" domain.

The NDD field 262 in this embodiment includes the digit "1" and in general includes a digit specified by the International Telecommunications Union—Telecommunications Standardization Sector (ITU-T) E.164 Recommendation which assigns national dialing digits to certain countries.

The IDD field 264 includes the code 011 and, in general, includes a code assigned by the ITU-T according to the country or geographical location of the subscriber.

The country code field 266 includes the digit "1" and, in general, includes a number assigned by the ITU-T to represent the country in which the subscriber is located.

The local area codes field 267 includes the numbers 604 and 778 and generally includes a list of area codes that have been assigned by the ITU-T to the geographical area in which the subscriber is located. The caller minimum and maximum local number length fields 268 and 270 each hold the number 10 representing minimum and maximum local number lengths permitted in the area code(s) specified by the contents of the local area codes field 267. The reseller field 273 holds a code identifying a retailer of the telephone services, and in the embodiment shown, the retailer is "Klondike".

The address field 275 holds an address at which the subscriber telephone is normally located. The emergency short number field 277 holds the short emergency number such as "911" that the user is expected to dial in the event of an emergency. The ERC number field 279 holds a full PSTN number associated with an emergency response center that would desirably be geographically nearest to the address specified in the address field 275.

A dialing profile of the type shown at 256 in FIG. 9 is produced whenever a user registers with the system or agrees to become a subscriber to the system. An ERC may register as a user, but need not do so since, as will be appreciated below, provisions are made for making VoIP to PSTN calls which may include calls to an ERC only available via the PSTN. Of importance here is that the contents of the emergency short number field 277 and the contents of the ERC number field 279 are assigned when the user registers with the system and thus it may be said that these numbers are "pre-assigned" to the user before the user makes any calls.

A user wishing to subscribe to the system may contact an office maintained by a system operator. Personnel in the office may ask the user certain questions about his location and service preferences, whereupon tables can be used to provide office personnel with appropriate information to be entered into the username, domain, NDD, IDD, country code, local area codes and caller minimum and maximum local length fields, emergency short number field and ERC number field 258, 260, 262, 264, 266, 267, 268, 270, 277, 279 to establish a dialing profile for the user.

Referring to FIGS. 10A, 11, and 12, dialing profiles for the ERC subscriber, Calgary subscriber, and the London subscriber, respectively for example, are shown.

In addition to creating dialing profiles when a user registers with the system, a direct-in-dial (DID) record of the type shown at 268 in FIG. 13 may optionally be added to a direct-in-dial table in the database 18 to associate the username and a host name of the supernode, with which the user is associated, with an E.164 number on the PSTN network. If the user does not have such an E.164 number, no DID record need be created at this time for that user.

In this embodiment, the DID bank table records include a username field 291, a user domain field 272 and DID identifier field 274, for holding the username, hostname of the supernode and E.164 number respectively. Thus a DID bank table record pre-associates a DID identifier with a user (e.g., caller).

A DID bank table record may also include a creation time field and an expiration time field for use when the DID bank table record is a temporary record as will be explained below.

DID bank table records for the Vancouver, Calgary and London subscribers are shown in FIGS. 13A, 13B, and 14, respectively In addition to creating dialing profiles and DID records when a user registers with the system, call blocking records of the type shown in FIG. 26, call forwarding records of the type shown in FIG. 28 and voicemail records of the type shown in FIG. 30 may be added to the database 18 when a new subscriber is added to the system.

Referring back to FIG. 8A, after being directed at block 254 to retrieve a dialing profile associated with the caller, such as shown at 276 in FIG. 10, the RC processor circuit (200) is directed to block 255 which causes it to determine whether the contents of the callee ID buffer 209 shown in FIG. 7 are equal to the contents of the emergency call identifier field 277 of the dialing profile 276 for the caller, shown in FIG. 10. If the contents of the callee ID buffer 209 are not equal to the contents of the emergency short number field 277, the call is deemed not to be an emergency call and the RC processor circuit 200 is directed to location A in FIG. 8B to carry out further processing on the basis that the call is to be a normal, non-emergency call.

If the contents of the callee ID buffer 209 match the contents of the emergency call identifier field (277 in FIG. 10), the call is deemed to be an emergency call and block 157 directs the RC processor circuit 200 to set a time to live (TTL) value to a high number such as 9999 to indicate that the call may have a long duration of 9999 seconds, for example. In addition block 157 directs the RC processor circuit 200 to set active the emergency call flag 211 in FIG. 7, to indicate that the call is an emergency call. Then, block 159 directs the RC processor circuit 200 to replace the contents of the callee ID buffer 209 with the contents of the ERC # field 279 of the caller dialing profile 276 (FIG. 10). Thus, the RC processor circuit produces an emergency response center identifier in response to the emergency call identifier by copying the emergency response center identifier from the ERC field 279 of the dialing profile 276 (FIG. 10) associated with the caller to the callee ID buffer 209 shown in FIG. 7 so that effectively, the contents of the callee ID buffer are replaced with the Emergency Response Center number. The RC processor circuit 200 is then directed to location A in FIG. 8B.

Figure 8B:
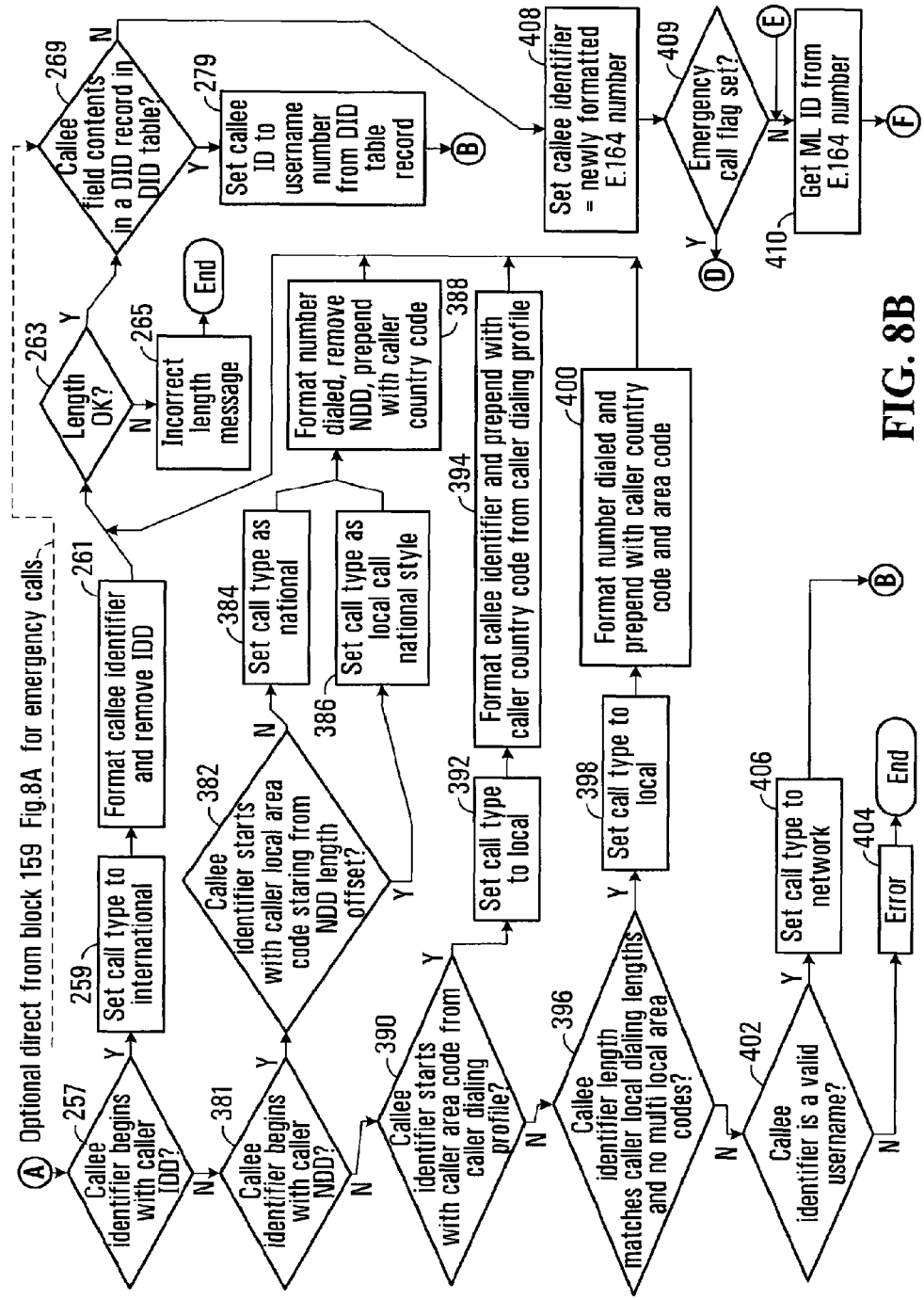

In this embodiment, for regular and emergency call processing, beginning at location A in FIG. 8B, the RC processor circuit 200 is directed to perform certain checks on the callee identifier provided by the contents of the callee identifier buffer 209 shown in FIG. 7. Most of these checks are shown in greater detail in FIG. 8B and are used for regular non-emergency call handling. Emergency calls in which the ERC number has been substituted for the short emergency calling number (i.e., 911) will pass all of the checks. Subjecting both emergency and non-emergency calls to these checks enables all calls, whether emergency or non-emergency, to be passed through the same process and, simplifies the introduction of emergency call handling processes into regular call processing routines depicted in FIGS. 8A to 8D. Alternatively, the RC processor circuit may be directed directly from block 159 to block 269 in FIG. 8B whenever the emergency call flag is set, as shown in broken outline in FIG. 8B.

FIG. 8B

IDD Testing

Referring to FIG. 8B, to start the first of the checks, the RC processor circuit 200 is directed to a first block 257 that causes it to determine whether a digit pattern of the callee identifier provided in the callee ID buffer 209 includes a pattern that matches the contents of the IDD field 264 in the caller dialing profile 276 shown in FIG. 10. If so, then block 259 directs the RC processor circuit 200 to set a call type identifier code (not shown) to indicate that the call is a long distance call, e.g., from the Vancouver subscriber to the London subscriber, and block 261 directs the RC processor circuit 200 to produce a reformatted callee identifier by reformatting the current callee identifier into a predetermined target format. In this embodiment, this is done by removing the pattern of digits matching the IDD field contents 264 of the caller dialing profile 276 to effectively shorten the number. Then, block 263 directs the RC processor circuit 200 to determine whether or not the reformatted callee identifier meets criteria establishing it as an E.164 compliant number and if the length does not meet this criteria, block 265 directs the RC processor circuit 200 to send back to the call controller 14 a message indicating that the length of the call identifier is not correct. The process 250 is then ended. At the call controller 14, routines may respond to the incorrect length message by transmitting a message back to the telephone 12 to indicate that an invalid number has been dialed, for example. Thus at the conclusion of block 263 a callee identifier having a pre-defined format should be available.

NDD Testing

Referring back to FIG. 8B, if at block 257, the callee identifier specified by the contents of the callee buffer 209 FIG. 7 does not begin with an IDD, block 381 directs the RC processor circuit 200 to determine whether or not the callee identifier begins with the same NDD code as assigned to the caller. To do this, the RC processor circuit is directed to refer to the caller dialing profile 276 shown in FIG. 10. In the embodiment shown, the NDD code stored in an NDD field 262 is the digit 1. Thus, if the callee identifier begins with the digit 1, the RC processor circuit 200 is directed to block 382 in FIG. 8B.

Block 382 directs the RC processor circuit 200 to examine the callee identifier to determine whether or not digits following the NDD code identify an area code that is the same as any of the area codes identified in the local area codes field 267 of the caller dialing profile 276 shown in FIG. 10. If not, block 384 directs the RC processor circuit 200 to set a call type variable (not shown) to a code indicating the call is a national call. If the digits identify an area code that is the same as a local area code associated with the caller, block 386 directs the RC processor circuit 200 to set the call type variable to indicate that the call type is as a local call, national style. After executing blocks 384 or 386, block 388 directs the RC processor circuit 200 to reformat the callee identifier by removing the national dial digit and prepending a caller country code identified by the country code field 266 of the caller dialing profile 276 shown in FIG. 10. The RC processor circuit 200 is then directed to block 263 to perform the processes described above beginning at block 263. Again, at the conclusion of block 263 a callee identifier having a predefined format should be available.

Area Code Testing

If at block 381 the callee identifier does not begin with an NDD code, block 390 directs the RC processor circuit 200 to determine whether the callee identifier in the callee ID buffer 209 begins with digits that identify the same area code as the caller. Again, the reference for this is the caller profile 276 shown in FIG. 10 and the RC processor circuit 200 determines whether or not the first few digits in the callee identifier identify an area code identified by the local area code field 267 of the caller profile 276. If so, then block 392 directs the RC processor circuit 200 to set the call type to a code indicating the call is a local call and block 394 directs the RC processor circuit 200 to prepend the caller country code to the callee identifier, the caller country code being determined from the country code field 266 in the caller profile 276. The RC processor circuit 200 is then directed to block 263 for processing as described above beginning at block 263. Emergency calls are likely to follow this path since the Emergency Response Center number that supplants the short emergency number (911) will normally be formatted to include an area code, but no IDD or NDD. Again at the conclusion of block 263 a callee identifier having a pre-defined length should be available.

Callee ID Length Testing

If at block 390, the callee identifier does not have the same area code as the caller, as may be the case with non-emergency calls, block 396 directs the RC processor circuit 200 to determine whether the callee identifier in the callee ID buffer 209 has the same number of digits as the number of digits indicated in either the caller minimum local number length field 268 or the caller maximum local number length field 270 of the caller profile 276 shown in FIG. 10. If so, then block 398 directs the RC processor circuit 200 to set the call type to local and block 400 directs the processor to prepend to the callee identifier the caller country code as indicated by the country code field 266 of the caller profile 276 followed by the caller area code as indicated by the local area code field 267 of the caller profile shown in FIG. 10. The RC processor circuit 200 is then directed to block 263 for further processing as described above beginning at block 263. Again at the conclusion of block 263 a callee identifier having a pre-defined length should be available.

Valid Subscriber Testing

If at block 396, the callee identifier in the callee ID buffer 209 has a length that does not match the length specified by the contents of the caller minimum local number length field 268 or the caller maximum local number length field 270 of the caller profile 276, block 402 directs the RC processor circuit 200 to determine whether or not the callee identifier identifies a valid username. To do this, the RC processor circuit 200 searches through the database 18 of dialing profiles to find a dialing profile having a username field 258 that matches the callee identifier. If no match is found, block 404 directs the RC processor circuit 200 to send an error message back to the call controller (14). If at block 402, a dialing profile having a username field 258 that matches the callee identifier is found, block 406 directs the RC processor circuit 200 to set the call type to a code indicating the call is a network call and the processor is directed to block 275 of FIG. 8A, to continue executing the RC message handler process 250.

From FIG. 8B, it will be appreciated that there are certain groups of blocks of codes that direct the RC processor circuit 200 to determine whether the callee identifier in the callee ID buffer 209 has certain features such as an IDD code, a NDD code, an area code and a length that meet certain criteria and to reformat the callee identifier, as necessary, into a predetermined target format including only a country code, area code, and a normal telephone number, for example, to cause the callee identifier to be compatible with the E.164 standard, in this embodiment. This enables the RC processor circuit 200 to have a consistent format of callee identifiers for use at block 269 in searching through the DID bank table records of the type 268 shown in FIG. 13 to determine how to route calls for subscriber to subscriber calls on the same system. Recall that the ERC may be a subscriber.

Still referring to FIG. 8B, if the length of the reformatted callee identifier meets the length criteria set forth at block 263, block 269 directs the RC processor circuit 200 to determine whether or not the reformatted callee identifier is associated with a direct-in-dial bank (DID) record of the type shown at 268 in FIG. 13.

Exemplary DID records for the Vancouver, Calgary and London subscribers are shown in FIGS. 13A, 13B and 14. The username field 291 and user domain field 272 are as specified in the username and user domain fields 258 and 260 of the corresponding dialing profiles shown in FIGS. 10, 11 and 12 respectively. Referring to FIG. 13A the contents of the DID field 274 include an E.164 telephone number including a country code 293, an area code 295, an exchange code 297 and a number 299. If the user has multiple telephone numbers, then multiple records of the type shown at 276 would be included in the DID bank table in the database 18, each having the same username and user domain, but different DID field 274 contents reflecting the different E.164 telephone numbers associated with that user.

Referring back to FIG. 8B, at block 269, if the RC processor circuit 200 determines that the current, (e.g., reformatted callee identifier produced at block 261) can be found in a record in the DID bank table, then the callee is a subscriber to the system and block 279 directs the RC processor circuit 200 to copy the contents of the corresponding username field 291 from the DID bank table record into the callee ID buffer 209 shown in FIG. 7. Thus, the RC processor circuit 200 locates a subscriber username associated with the reformatted callee identifier. If the call is being made to the Emergency Response Center and the Emergency Response Center (ERC) is a subscriber to the system, a DID record would be found in the DID bank table, otherwise a DID record for the ERC would not be found. Assuming the Emergency Response Center is a subscriber to the system, the RC processor circuit 200 is directed to block 275 at point B in FIG. 8A for further processing now that it is known that the call is essentially a subscriber to subscriber call.

Subscriber to Subscriber Calls Between Different Nodes

Referring back to FIG. 8A, block 275 directs the RC processor circuit 200 to determine whether or not the username stored in the callee ID buffer 209 (in FIG. 7) is associated with the same supernode as the caller. To do this, the RC processor circuit 200 determines whether or not the prefix (i.e., the leftmost digit) of the username stored in the callee ID buffer 209 is the same as the prefix of the username of the caller specified by the caller identifier field 152 of the RC Request message 150 shown in FIG. 6. If they are not the same, block 277 of FIG. 8A directs the RC processor circuit (200) to set a call type flag (not shown) to indicate that the call is a cross-domain call. Then, block 281 directs the RC processor circuit (200) to determine whether the emergency call flag 211 shown in FIG. 7 has been set and if so, block 283 of FIG. 8A directs the RC processor to determine whether the caller identifier is associated with a pre-associated direct inward dialing (DID) identifier. This is done by searching the DID bank table to attempt to locate a DID record having DID field (274) contents matching the contents of the caller identifier stored in the caller ID buffer (205). If such a DID record is found, the processor circuit 200 has effectively determined that the caller has a pre-associated DID identifier.

If no such DID record is found, the RC processor circuit 200 has effectively determined that the caller has no pre-associated DID identifier. In this case, block 285 then directs the RC processor circuit 200 to produce a DID identifier for the caller by associating a temporary DID identifier with the caller identifier by associating with the caller identifier a DID identifier from a pool of predetermined DID identifiers. This is done by creating and associating with the caller a temporary DID record of the type shown in FIG. 13. The temporary DID record has a DID identifier field 274 populated with the DID identifier from the pool. The DID identifier from the pool may be 1 604 867 5309, for example. The pool may be provided by causing the RC processor circuit 200 to maintain a list of pre-defined DID identifiers and pointers identifying a current read point in the list and a current write point in the list. The current read pointer may be incremented each time the pool is addressed to obtain a temporary DID identifier.

A temporary DID record may be canceled after a pre-defined period of time. For example, the temporary DID identifier records are desirably as shown in FIG. 13 and may further include a creation time field and an expiry time field for holding a creation time value and an expiry time value respectively. The expiry time may be 2 hours after the creation time, for example, such that the temporary DID record is deleted two hours after it is created. A separate process, not shown, may continuously or periodically scan the DID records to determine whether any DID records have expiry times that have been exceeded and if so, cause such temporary DID records to be cancelled or deleted. Thus, the RC processor produces a direct inward dialing identifier for the caller by associating a temporary DID identifier with the caller identifier when the emergency call flag is active and it is determined that the caller has no pre-associated DID identifier, or by associating a DID identifier pre-assigned to the caller identifier.

After a temporary DID record has been created and stored in the DID bank table in the database 18 shown in FIG. 1, or if the caller already had a DID record, block 287 of FIG. 8A directs the RC processor circuit to load the DID identifier buffer 203 with the contents of the field of DID temporary or pre-associated DID record. Then the RC processor circuit loads a routing message buffer with the contents of the DID identifier buffer 203 acting as the caller identifier and the contents of the callee ID buffer 209 as the callee identifier. This will provide for a PSTN call back number to be provided to the emergency response center.

Thus, where the caller identifier has no pre-assigned DID identifier, the RC processor produces a routing message including the emergency response center identifier and the temporary DID identifier for receipt by the routing controller to cause the routing controller to establish a route between the caller and the emergency response center.

Referring to FIG. 15, a routing message buffer is shown generally at 352 and includes a supplier prefix field 354, a delimiter field 356, a callee field 358, at least one route field 360, a time-to-live (TTL) field 362 and a caller ID field 364. The supplier prefix field 354 holds a code for identifying supplier traffic. The delimiter field 356 holds a symbol that delimits the supplier prefix code from the callee field 358 and in this embodiment, the symbol is a number sign (#) as illustrated in FIG. 25. Referring back to FIG. 15, the callee field 358 holds a copy of the contents of the callee ID buffer 209 of FIG. 7. The route field 360 holds a domain name or an IP address of a gateway or supernode that is to carry the call and the TTL field 362 holds a value representing the number of seconds the call is permitted to be active, based on subscriber available minutes and other billing parameters, for example.

Desirably, the time to live field holds a number indicating a maximum call time for the call and where the call is an emergency call, desirably the maximum call time exceeds a duration of an average non-emergency telephone call. The caller ID field 364 holds a caller identifier which in this case, is the temporary or pre-associated DID number from the DID record associated with the caller.

Referring to FIG. 8A and FIG. 16, a routing message produced by the RC processor circuit 200 at block 287 is shown generally at 366 and includes only the callee field 358, route field 360, TTL field 362 and caller ID field 364.

The callee field 358 holds the full username of the callee, and where the call is an emergency call as shown, the full username of the callee is the username of the emergency response center. The route field 360 contains the identification of the domain with which the emergency response center is associated, i.e., sp.yvr.digifonica.com. The TTL field holds the value 9999 set at block 157 in FIG. 8A and the caller ID field 364 holds the DID identifier associated with the caller. Block 380 then directs the RC processor circuit to send the routing message shown in FIG. 16 to the call controller 14 (FIG. 1).

Referring to FIG. 8A, if at block 281, the emergency call flag is not set, the call is not an emergency call, and the RC processor is directed to block 350 which causes it to direct the RC processor circuit 200 to load the routing message buffer with information identifying the supernode in the system with which the callee is associated and to set a time to live for the call to a high value such as 9999. The supernode, with which the callee is associated, is determined by using the callee username stored in the callee ID buffer 209 to address a supernode table having records of the type as shown at 370 in FIG. 17.

Referring to FIG. 17, each prefix to a supernode table record 370 has a prefix field 372 and a supernode address field 374. The prefix field 372 includes the first n digits of the callee identifier. In this case n=1. The supernode address field 374 holds a code representing the IP address or a fully qualified domain name (FQDN) of the supernode associated with the code stored in the prefix field 372. Referring to FIG. 18, for example, if the prefix is 4, the supernode address associated with that prefix is sp.lhr.digifonica.com, identifying the London supernode (21 in FIG. 1), for example. After the routing message buffer has been loaded with identification of the supernode, block 380 of FIG. 8A directs the RC processor circuit to send the routing message shown in FIG. 16A to the call controller 14 (FIG. 1).

Subscriber to Subscriber Calls within the Same Node

Referring back to FIG. 8A, if at block 275, the callee identifier stored in the callee ID buffer 209 (FIG. 7) has a prefix that identifies the same supernode as that associated with the caller, block 559 directs the RC processor circuit 200 to determine whether or not the emergency call flag 211 of FIG. 7 has been set. If at block 559, the RC processor circuit 200 determines that the emergency call flag 211 is set, the RC processor circuit 200 is directed to resume processing at block 283 to scan the DID bank table to determine whether the caller has a DID record and to assign a temporary DID number if necessary, as described above and then to send a routing message of the type shown in FIG. 16 to the call controller.

If at block 559 the emergency call flag has not been set, regular non-emergency call processing ensues beginning with block 600 which directs the RC processor circuit 200 to use the callee identifier to locate and retrieve a dialing profile for the callee identified by the callee identifier stored in the callee ID buffer 209. The dialing profile is of the type shown in FIG. 9, and may contain data as shown in FIG. 11, for example. In this case the same-node subscriber is the Calgary subscriber. Block 602 of FIG. 8A directs the RC processor circuit 200 to get call block, call forward and voicemail tables from the database 18 based on the username identified in the callee dialing profile retrieved by the RC processor circuit at block 600. Call block, call forward and voicemail tables have records as shown in FIGS. 26, 28 and 30 for example.

Referring to FIG. 26, the call block records include a username field 604 and a block pattern field 606. The username field 604 holds a username matching the username in the username field 258 of the dialing profile (FIG. 9) associated with the callee, and the block pattern field 606 holds one or more E.164-compatible numbers or usernames identifying PSTN telephone numbers or system subscribers from whom the subscriber identified by the contents of the username field 604 does not wish to receive calls.

Referring back to FIG. 8A and referring to FIG. 27, block 608 directs the RC processor circuit 200 to determine whether or not the caller identifier matches a block pattern stored in the block pattern field 606 of the call block record associated with the callee identified by the contents of the username field 604 in FIG. 26. If the caller identifier matches a block pattern stored in the field 606, block 610 directs the RC processor circuit 200 to send a drop call or non-completion message to the call controller 14 and the process 250 is ended. If the caller identifier does not match a block pattern associated with the callee, block 612 directs the RC processor circuit 200 to determine whether or not call forwarding is required.

Referring to FIG. 28, records in the call forwarding table include a username field 614, a destination number field 616 and a sequence number field 618. The username field 614 stores a code representing a username of a subscriber with whom the call forwarding record is associated. The destination number field 616 holds a username or E.164 number representing a number to which the current call should be forwarded, and the sequence number field 618 holds an integer number indicating the order in which the username associated with the corresponding destination number field should be attempted for call forwarding. The call forwarding table may have a plurality of records for a given subscriber. The RC processor circuit 200 uses the contents of the sequence number field 618 to place the records for a given subscriber in order. As will be appreciated below, this enables the call forwarding numbers to be tried in an ordered sequence.

Referring back to FIG. 8A and referring to FIG. 28, if at block 612, the call forwarding record for the callee identified by the callee identifier contains no contents in the destination number field 616 and accordingly no contents in the sequence number field 618, then there are no call forwarding entries and the RC processor circuit 200 is directed to load the routing message buffer shown in FIG. 32 with the callee username, domain and time to live as shown at 650. The RC processor circuit 200 is then directed to block 620 in FIG. 8C. However, if there are contents in the call forwarding record as shown in FIG. 29, block 622 shown in FIG. 8A directs the RC processor circuit 200 to search the dialing profile table in the database 18 to find a dialing profile record of the type shown in FIG. 9, for the callee identified in the destination number field 616 of the first call forwarding record and to store the contents in the routing message buffer. The RC processor circuit 200 is then directed to load the contents of the domain field 260 associated with the dialing profile specified by the contents of the destination number field 616 of the first call forwarding record into the routing message buffer as shown at 652 in FIG. 32. This process is repeated for each call forwarding record associated with the callee identified by the callee identifier to add to the routing message buffer all call forwarding usernames and domains associated with the callee.

Figure 8C:
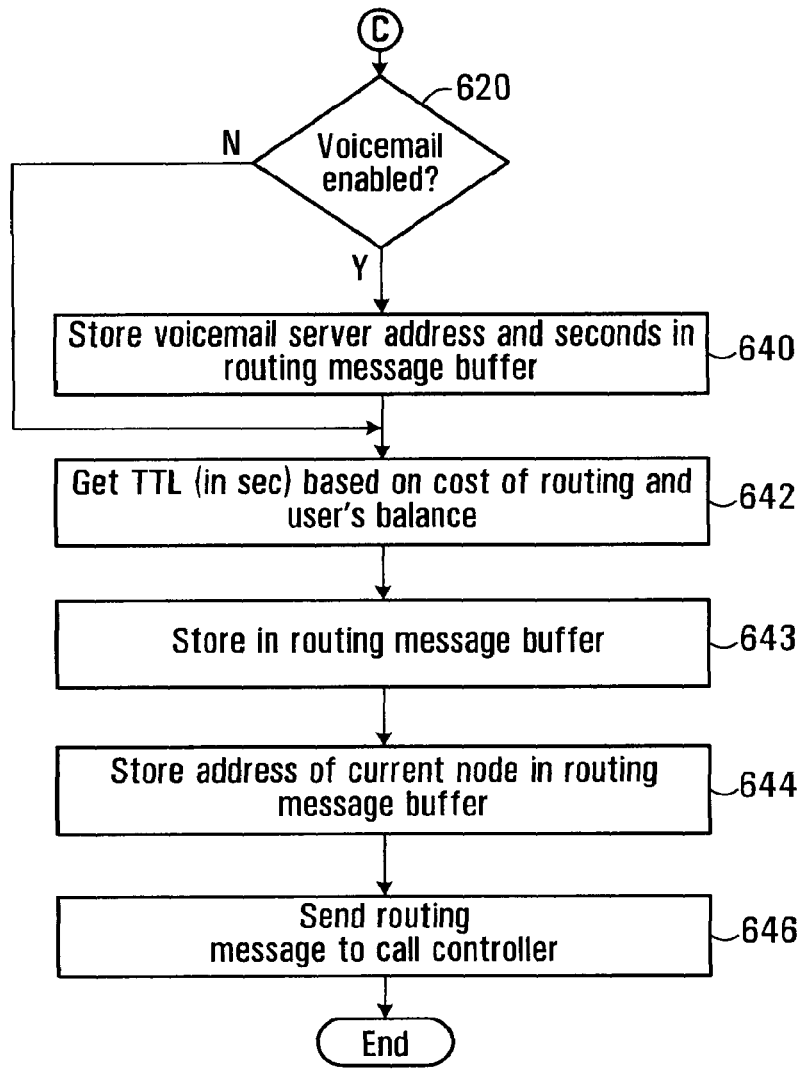

Referring to FIG. 8C, at block 620 the RC processor circuit 200 is directed to determine whether or not the user identified by the callee identifier has paid for voicemail service and this is done by checking to see whether or not a flag 630 is set in a voicemail record of the type shown in FIG. 30 in a voicemail table stored in the database 18 in FIG. 1.

Referring to FIG. 30, voicemail table records include a username field 624, a voicemail server field 626, a seconds-to-voicemail field 628 and an enabled field 630. The username field 624 stores the username of the subscriber who purchased the service. The voicemail server field 626 holds a code identifying an IP address or a fully qualified domain name (FQDN) of a voicemail server associated with the subscriber identified by the username field 624. The seconds-to-voicemail field 628 holds a code identifying the time to wait before engaging voicemail and the enable field 630 holds a code representing whether or not voice mail is enabled for the user identified by the contents of the username field 624. Therefore, referring back to FIG. 8C, at block 620 the RC processor circuit 200 finds a voicemail record as shown in FIG. 31 having username field 624 contents matching the callee identifier and examines the contents of the enabled field 630 to determine whether or not voicemail is enabled. If voicemail is enabled, then block 640 in FIG. 8C directs the RC processor circuit 200 to store the contents of the voicemail server field 626 of FIG. 31, and the contents of the seconds to voicemail field 628 of FIG. 31 in the routing message buffer as shown at 654 in FIG. 32.

Referring back to FIG. 8C, block 642 then directs the processor to get time to live (TTL) values for each route specified by the routing message according to any of a plurality of criteria such as, for example, the cost of routing and the user's account balance. These TTL values are then appended to corresponding routes already stored in the routing message buffer. Block 643 then directs the RC processor circuit 200 to store the TTL value determined at block 642 in the routing message buffer. In the routing message shown in FIG. 32, the time to live value is set at 60 seconds, for example.

Block 644 of FIG. 8C then directs the RC processor circuit 200 to store the IP address or FQDM of the current supernode in the routing message buffer as shown at 656 in FIG. 32. An exemplary routing message for a subscriber to subscriber call on the same node is thus shown in the routing message buffer shown in FIG. 32.

Subscriber to Non-Subscriber Calls

Not all calls will be subscriber-to-subscriber calls and this will be detected by the RC processor circuit 200 when it executes block 269 of FIG. 8B and does not find a DID bank table record associated with the callee in the DID bank table. This may be the case, for example, where the Emergency Response Center (ERC) is not a subscriber to the system. When this occurs, the RC processor circuit 200 is directed to block 408 in FIG. 8B which causes it to set the contents of the callee identifier buffer 209 equal to the reformatted callee identifier, i.e., the E.164 compatible number produced prior to block 263 in FIG. 8B. Block 409 then directs the RC processor circuit 200 to determine whether the emergency call flag 211 in FIG. 7 has been set. If the emergency call flag is set, block 411 in FIG. 8D directs the RC processor to search the DID bank table to attempt to locate a DID record having DID field (274, FIG. 13) contents matching the contents of the caller identifier stored in the caller ID buffer (205 in FIG. 7).

If no such DID record is found, the RC processor circuit 200 has effectively determined that the caller identifier is not associated with a pre-associated DID identifier. In this case, block 413 then directs the RC processor circuit 200 to associate a temporary DID identifier with the caller identifier by associating with the caller identifier a DID identifier from the pool of pre-determined DID identifiers. Again, this is done by creating and associating with the caller a temporary DID record of the type shown in FIG. 13.

After a temporary DID record has been created or if the caller already has a DID record, block 415 directs the RC processor circuit to store the DID number (274 in FIG. 13) in the caller ID buffer 205 in FIG. 7.

After having loaded the caller ID buffer 205 with the temporary or pre-associated DID number, or after having determined that the emergency call flag is not set, block 410 (FIG. 8B) directs the RC processor circuit 200 to initiate a process for identifying gateways to the PSTN through which the call will be established. This process begins with block 410 which directs the RC processor circuit 200 to address a master list having records of the type shown in FIG. 19.

Each master list record includes a master list ID field 500, a dialing code field 502, a country code field 504, a national sign number field 506, a minimum length field 508, a maximum length field 510, a NDD field 512, an IDD field 514 and a buffer rate field 516.

The master list ID field 500 holds a unique code such as 1019, for example, identifying the record. The dialing code field 502 holds a predetermined number pattern that the RC processor circuit 200 uses at block 410 in FIG. 8B to find the master list record having a dialing code matching the first few digits of the reformatted callee identifier. The country code field 504 holds a number representing the country code associated with the record and the national sign number field 506 holds a number representing the area code associated with the record. (It will be observed that the dialing code 502 is a combination of the contents of the country code field 504 and the national sign number field 506.) The minimum length field 508 holds a number representing the minimum number of digits that can be associated with the record and the maximum length field 510 holds a number representing the maximum number of digits in a number with which the record may be compared. The NDD field 512 holds a number representing an access code used to make a call within the country specified by the country code 504 and IDD field 514 holds a number representing the international prefix needed to dial a call from the country indicated by the country code.

Thus, for example, a master list record may have a format as shown in FIG. 20 with exemplary field contents as shown.

Referring back to FIG. 8B, using the country code and area code portions of the reformatted callee identifier that has been formatted for compatibility with the E.164 standard, block 410 directs the RC processor circuit 200 to find a master list record such as the one shown in FIG. 20 having a dialing code that matches the country code and area code of the reformatted callee identifier held in the callee identifier buffer 209. Thus, in this example, the RC processor circuit 200 might find a master list record having an ID field with the number 1019. This number may be also referred to as a route ID number. Thus, a route ID number is found in the master list record associated with a predetermined number pattern in the reformatted callee identifier.

Figure 8D:
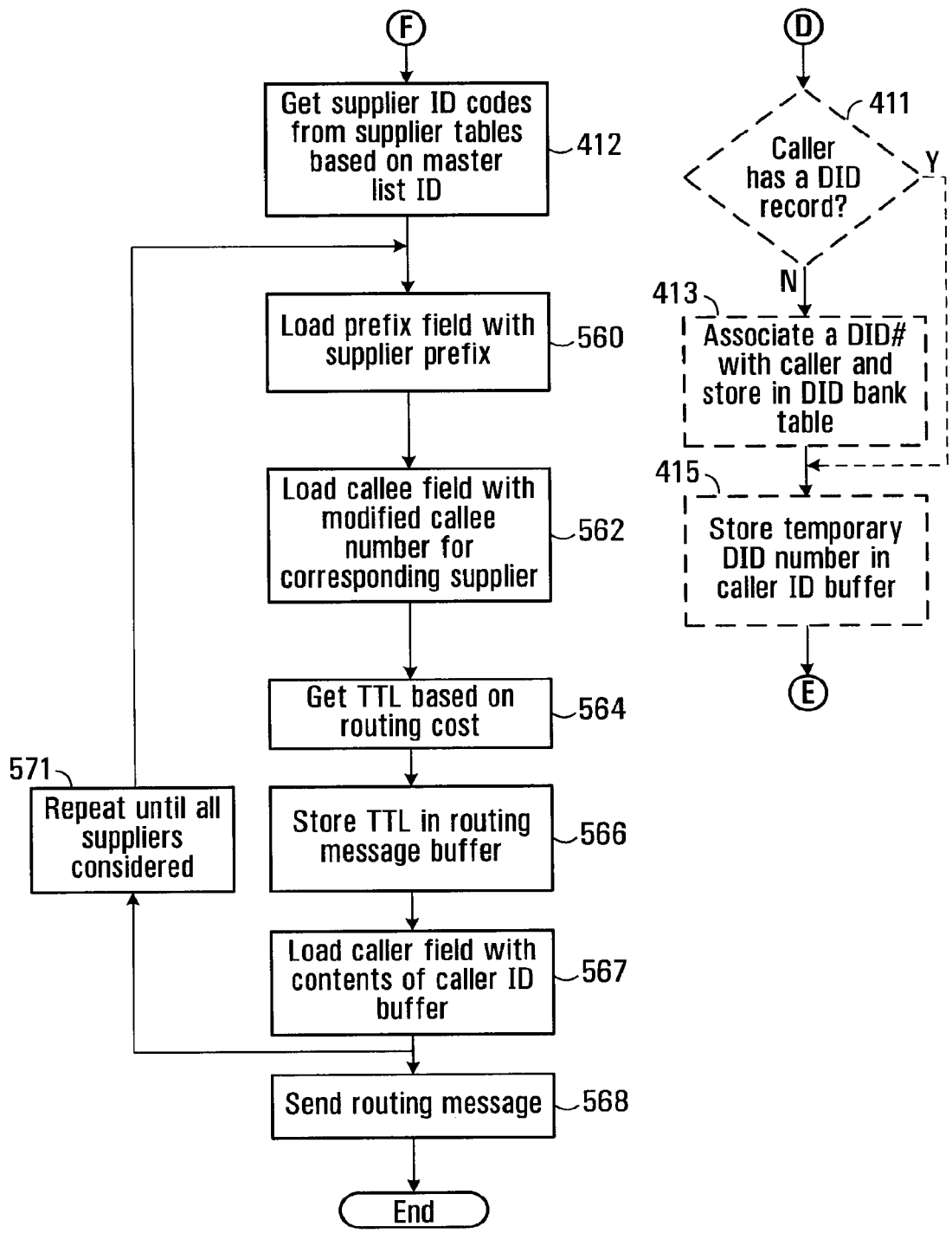

After execution of block 410 in FIG. 8B, the process 250 continues as shown in FIG. 8D. Referring to FIG. 8D, block 412 directs the RC processor circuit 200 to use the route ID number determined at block 410 to locate at least one supplier record identifying a supplier operable to supply a communications link for this route. To do this, block 412 directs the RC processor circuit 200 to search a supplier ID table having records of the type shown in FIG. 21.

Referring to FIG. 21, supplier list records include a supplier ID field 540, a master list ID field 542, an optional prefix field 544, a route identifier field 546, a NDD/IDD rewrite field 548 and a rate field 550. The supplier ID field 540 holds a code identifying the name of the supplier and the master list ID field 542 holds a code for associating the supplier record with the master list record. The prefix field 544 optionally holds a string used to identify the supplier traffic and the route identifier field 546 holds an IP address of a gateway operated by the supplier indicated by the supplier ID field 540. The NDD/IDD rewrite field 548 holds a code and the rate field 550 holds a code indicating the cost per second to the system operator to use the route through the gateway specified by the contents of the route identifier field 546. Exemplary supplier records are shown in FIGS. 22, 23 and 24 for Telus, Shaw and Sprint, respectively, for example.

Referring back to FIG. 8D, at block 412 the RC processor circuit 200 finds all supplier records that contain the master list ID found at block 410 of FIG. 8B.

Block 560 of FIG. 8D directs the RC processor circuit 200 to begin to produce routing messages. To do this, the RC processor circuit 200 loads a routing message buffer as shown in FIG. 25 with a supplier prefix of the least costly supplier where the least costly supplier is determined from the rate fields 550 of the records associated with respective suppliers.

Referring to FIGS. 22-24, in the embodiment shown, the supplier "Telus" has the lowest number in the rate field 550 and therefore the prefix 4973 associated with that supplier is loaded into the routing message buffer shown in FIG. 25 first. At block 562, the prefix 4973 is then delimited by the number sign (as defined by the contents of the delimiter field 356 in the routing message format 352 in FIG. 15) and the reformatted callee identifier is next loaded into the routing message buffer after the delimiter. Then, the contents of the route identifier field 546 of the record associated with the supplier Telus are added to the message after an @ sign delimiter and then block 564 in FIG. 8D directs the RC processor circuit 200 to get a TTL value (algorithm not shown), which in this embodiment may be 3600 seconds, for example. Block 566 of FIG. 8D then directs the RC processor circuit 200 to append this TTL value to the contents already in the routing message buffer shown in FIG. 25. Block 567 of FIG. 8D then directs the processor circuit to append the contents of the caller ID buffer 205 of FIG. 7 to the contents already in the routing message buffer shown in FIG. 25. Accordingly, the first part of the routing message is shown generally at 570 in FIG. 25.

Referring back to FIG. 8D, block 571 directs the RC processor circuit 200 back to block 560 and causes it to repeat blocks 560, 562, 564, 566 and 567 for each successive supplier until the routing message buffer is loaded with information pertaining to each supplier. Thus, the second portion of the routing message is shown at 572 in FIG. 25 and this second portion relates to the second supplier identified by the record shown in FIG. 23 and referring back to FIG. 25, the third portion of the routing message is shown at 574 which is associated with a third supplier as indicated by the supplier record shown in FIG. 24. Consequently, referring to FIG. 25, the routing message buffer holds a routing message identifying a plurality of different suppliers able to provide gateways to establish a communication link to permit the caller to contact the callee. Each of the suppliers is identified, in succession, according to rate contained in the rate field 550 of the supplier list record shown in FIG. 21, in this embodiment. Other criteria for determining the order in which suppliers are listed in the routing message may include preferred supplier priorities which may be established based on service agreements, for example.

Response to Routing Message

Referring back to FIG. 1, the routing message of the type shown in FIG. 16, 16A, 25 or 32, is received at the call controller 14. It will be recalled that the call controller 14 already has the original SIP invite message shown in FIG. 3. Referring to FIG. 4, the program memory 104 of the call controller 14 includes a routing-to-media relay routine depicted generally at 122.

Figure 38:
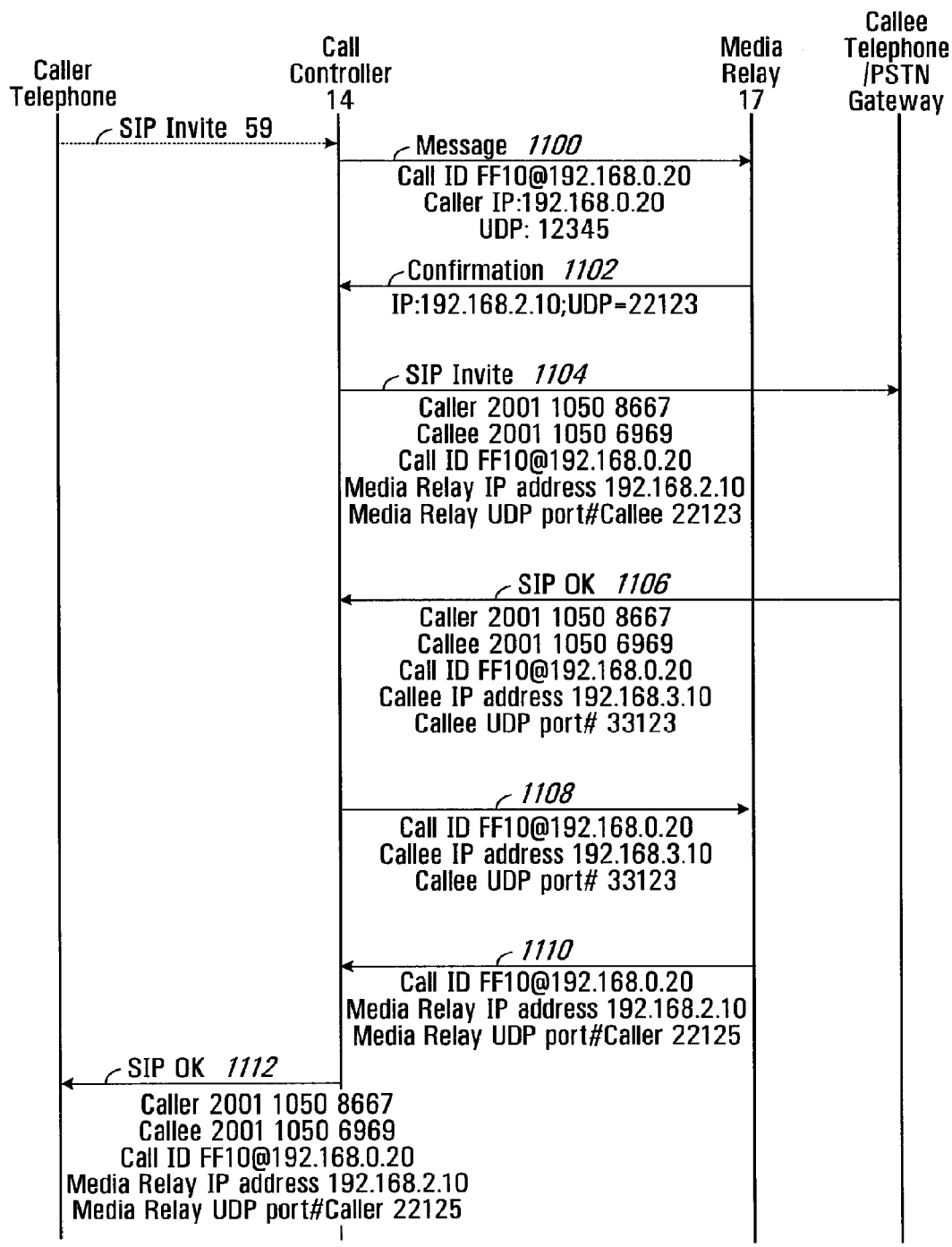
FIG. 38 is a schematic representation of messages exchanged during a process for establishing audio paths between telephones and a media relay.

Referring to FIG. 38, the routing to media relay routine 122 directs the processor to participate in a process for establishing audio paths. Assume the call is directed to the ERC.

As a first step in the process for establishing audio paths, a message 1100 is sent from the call controller 14 to the media relay 17, the message including the call ID, the caller telephone IP address and UDP port as determined from the caller IP address field 67 and caller UDP port field 69 in the SIP Invite message 59 shown in broken outline.

In response, the media relay (MR) 17 sends a confirmation message 1102 back to the call controller 14, the message including a media relay IP address (192.168.2.10) and UDP port number (22123) defining a callee socket that the media relay will use to establish an audio path to the ERC telephone or a PSTN gateway to the ERC, where the Emergency Response Center is only available through the PSTN The call controller 14 then sends a SIP Invite message 1104 of type shown in FIG. 3 to the callee telephone 15 (or PSTN gateway), to advise the callee that telephone of the socket the media relay expects to use for audio communication with the caller telephone. The SIP invite message includes the caller and callee identifiers (60 and 62), the call ID (65) and the media relay 17 IP address (192.168.2.10) and the media relay UDP port number (22123) assigned to the callee socket as received from the confirmation message 1102. The caller identifier may be that which was associated with the caller at blocks 413 in FIG. 8D or block 285 in FIG. 8A, for example, or may be the DID associated with the caller as determined from a DID record already associated with the caller. Such caller identifier, as obtained from the routing message, may be used as calling line identification (CLID) information and may be caused to appear on a display of the callee telephone, which is particularly advantageous where the callee telephone is one at an ERC. Such CLID information provides an ERC operator with callback information, enabling the operator to call back the caller who made the emergency call. Since the temporarily assigned DID records persist for some time after the emergency call has taken place, the ERC operator can call back the person who made the emergency call during a period of time after the emergency call is terminated. In this embodiment, assume the callee telephone identifies its socket as IP address 192.168.3.10 and UDP 33123.

The callee (ERC) telephone 33 of FIG. 1 (or PSTN gateway) stores the media relay 17 IP address (192.168.2.10) and assigned UDP port number (22123) and configures itself to create a socket for an audio path between the media relay. Referring to FIGS. 1 and 38 the callee telephone 15 (or PSTN gateway) then sends a SIP OK message 1106 back to the call controller 14, the message including the CALL ID, the callee IP address (192.168.3.10) and UDP port number (33123) to advise the call controller of the socket at which it expects to use for audio communications with the media relay 17.

The call controller 14 then sends a message 1108 to the media relay 17 including the IP address (192.168.3.10) and UDP port number (33123) identifying the socket at that the callee telephone 15 (or PSTN gateway) that is to be used for audio communications with the media relay. The media relay 17 then creates a caller socket identified by IP address 192.168.2.10 and UDP port number 22125 and creates an internal bridge for relaying audio traffic between the caller socket (192.168.2.10: 22125) and the callee socket (192.168.2.10: 22123).

The media relay 17 then sends a message 1110 including the call ID and the IP address (192.168.2.10) and UDP port number (22125) identifying the caller socket that the media relay assigned to the caller telephone 12, back to the call controller 14 to indicate that the caller and callee sockets have been established and that the call can proceed.

The call controller 14 then sends a SIP OK message 1112 to the caller telephone 12 to indicate that the call may now proceed. The SIP OK message includes the caller and callee usernames, the call ID and the IP address (192.168.2.10) and UDP port number (22125) identifying the caller socket at the media relay 17.

Alternatively, referring back to FIG. 1, if the routing message is of a type that identifies a domain associated with another supernode in the system, the call controller 14 may communicate with a different media relay (for example 27) adapted to establish the above-mentioned links between separate media relays associated with respective supernodes, where the IP network links are provided by the communications medium 23.

In the case of an emergency call, the routing message is unlikely to identify a domain other than that of the caller.

In the case of a regular, non-emergency call, if the routing message is of the type shown in FIG. 25 where there are a plurality of suppliers available, the process proceeds as described above with the exception that instead of communicating with the callee telephone directly, the call controller 14 communicates with a gateway provided by a supplier. If a SIP OK message is not received back from the first gateway, the processor is directed to send the SIP Invite message 1104 to a gateway of the next indicated supplier. For example, the call controller 14 sends the SIP Invite message 1104 to the first supplier, in this case Telus, to determine whether or not Telus is able to handle the call. If Telus does not send back an OK message 1106 or sends a message indicating that it is not able to handle the call, the call controller proceeds to send a SIP Invite message 1104 to the next supplier, in this case Shaw. The process is repeated until one of the suppliers responds with a SIP OK message 1106 indicating that it is available to carry the call and the process proceeds as shown in connection with messages 1108, 1110 and 1112.

Referring to FIG. 2, in response to receiving the SIP OK message 1112 at the network interface 48, the microprocessor 32 of the caller telephone 12 stores the media relay IP address (192.168.2.10) and UDP port number (22125) identifying the caller socket at the media relay in an audio path IP address buffer 47 in the temporary memory 40. The microprocessor 32 is now ready to transfer audio signals and from the handset and the media relay 17 using the sockets created above.

Referring back to FIG. 1, if the call is a regular, non-emergency call, and the call controller 14 receives a message of the type shown in FIG. 32, i.e., a type which has one call forwarding number and/or a voicemail number, the call controller attempts to establish a call (using message 1104 in FIG. 38) to the callee telephone 15 and if no call is established (i.e., message 1106 in FIG. 38 is not received) within the associated TTL (3600 seconds), the call controller 14 attempts to establish a call with the next user identified in the call routing message. This process is repeated until all call forwarding possibilities have been exhausted after respective times to live, in which case an audio path is established with the voicemail server 19 identified in the routing message. The voicemail server 19 sends message 1106 in response to receipt of message 1104 and functions as described above in connection with the callee telephone 15 to permit an outgoing audio message provided by the voicemail server to be heard by the caller and to permit the caller to record an audio message on the voicemail server.

When audio paths are established, a call timer (not shown) maintained by the call controller logs the start date and time of the call and logs the call ID and an identification of the route (i.e., audio path IP address) for later use in billing, for example.

Terminating the Call

In the event that either the caller or the callee (or callee via the PSTN) terminates a call, the telephone of the terminating party (or gateway associated with the terminating party) sends a SIP Bye message to the call controller 14. An exemplary SIP Bye message is shown at 900 in FIG. 33 and includes a caller field 902, a callee field 904 and a call ID field 906. The caller field 902 holds the caller username, the callee field 904 holds a PSTN compatible number or username, and the call ID field 906 holds a unique call identifier field of the type shown in the caller ID field 65 of the SIP Invite message shown in FIG. 3.

Figure 34:
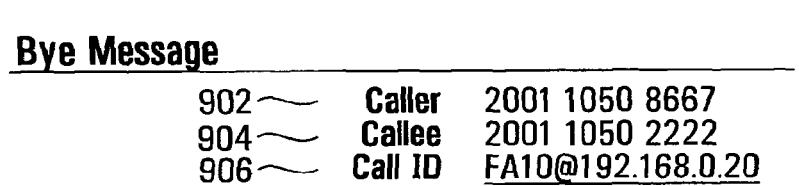
FIG. 34 is a tabular representation of a SIP Bye message sent to the call controller from the callee or caller gateway.

Thus, when terminating a regular non-emergency call, such as initiated by the Vancouver subscriber to the Calgary subscriber for example, referring to FIG. 34, a SIP Bye message is produced as shown generally at 908 and the caller field 902 holds a username identifying the Vancouver caller, in this case 2001 1050 8667, the callee field 904 holds a username identifying the Calgary callee, in this case 2001 1050 2222, and the callee ID field 906 holds the code FA10 @ 192.168.0.20, which is the call ID for the call.

Figure 35:
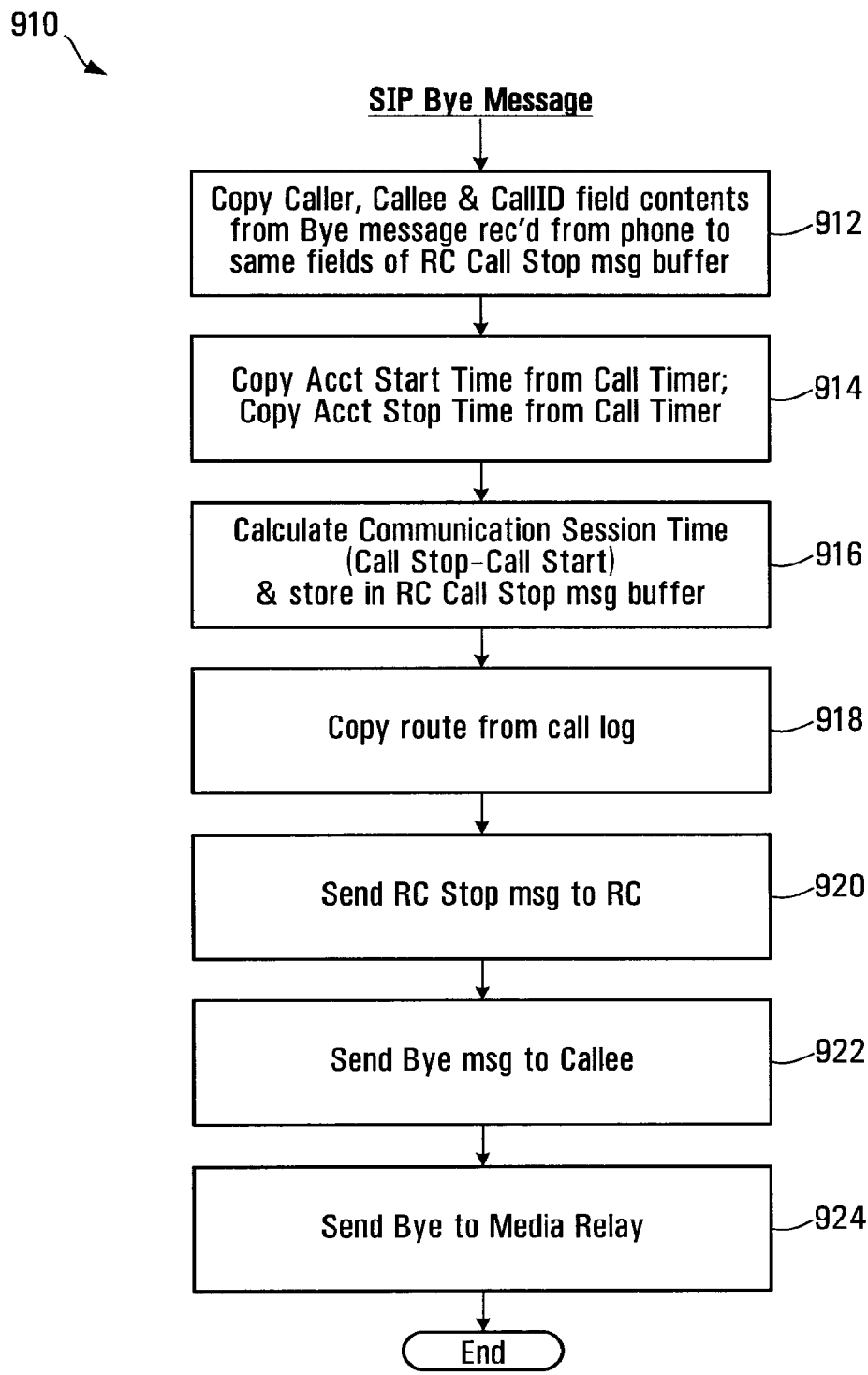
FIG. 35 is a flowchart of a process executed by the call controller for producing a RC Call Stop message in response to receipt of a SIP Bye message.

The SIP Bye message shown in FIG. 34 is received at the call controller 14 and the call controller executes a process as shown generally at 910 in FIG. 35. The process includes a first block 912 that directs the call controller circuit 100 to copy the caller, callee and call ID field contents from the SIP Bye message 900 shown in FIG. 33 received from the terminating party to corresponding fields of an RC Call Stop message buffer (not shown). Block 914 then directs the call controller circuit 100 to copy the call start time from the call timer and to obtain a Call Stop time from the call timer. Block 916 then directs the call controller to calculate a communication session time by determining the difference in time between the call start time and the call stop time. This communication session time is then stored in a corresponding field of the RC Call Stop message buffer. Block 918 then directs the call controller circuit 100 to copy the route identifier from the call log. An RC Call Stop message produced as described above is shown generally at 1000 in FIG. 36. An RC Call Stop message specifically associated with the call made to the Calgary callee is shown generally at 1020 in FIG. 37.

Referring to FIG. 36, the RC Call Stop message includes a caller field 1002, callee field 1004, a call ID field 1006, an account start time field 1008, an account stop time field 1010, a communication session time 1012 and a route field 1014. The caller field 1002 holds a username, the callee field 1004 holds a PSTN-compatible number or system number, the call ID field 1006 holds the unique call identifier received from the SIP Invite message shown in FIG. 3, the account start time field 1008 holds the date and start time of the call, the account stop time field 1010 holds the date and time the call ended, the account session time field 1012 holds a value representing the difference between the start time and the stop time, in seconds, and the route field 1014 holds the IP address for the communications link that was established.

Referring to FIG. 37, an exemplary RC stop call message for the Calgary callee is shown generally at 1020. In this example the caller field 1002 holds the username 2001 1050 8667 identifying the Vancouver caller and the callee field 1004 holds the username 2001 1050 2222 identifying the Calgary callee. The contents of the call ID field 1006 are FA10 @ 192.168.0.20. The contents of the accounting start time field 1008 are 2006-12-30 12:12:12 and the contents of the accounting stop time field are 2006-12-30 12:12:14. The contents of the communication session time field 1012 are 2 to indicate 2 seconds call duration and the contents of the route field are 72.64.39.58.

Referring back to FIG. 35, after having produced an RC Call Stop message, block 920 directs the call controller circuit 100 to send the RC stop message contained in the RC Call Stop message buffer to the routing controller 16.

The routing controller 16 receives the Call Stop message and an RC Call Stop message process is invoked at the RC to deal with charges and billing for the call.

Block 922 directs the call controller circuit 100 to send a Bye message back to the party that did not terminate the call.

Figure 33:
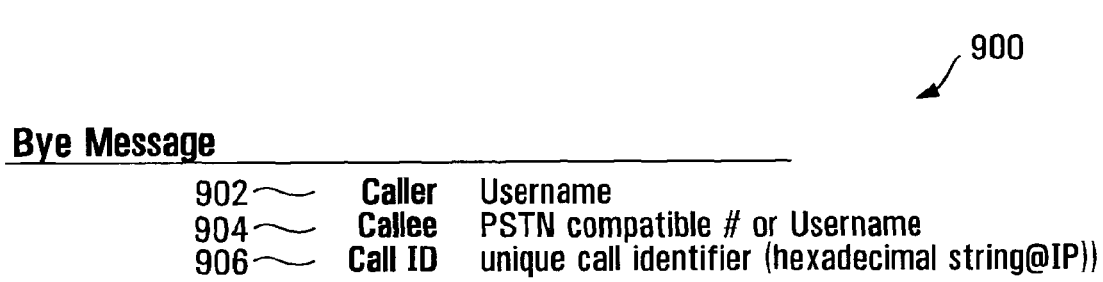
FIG. 33 is a tabular representation of a SIP Bye message transmitted from any of the telephones to the call controller.

Block 924 then directs the call controller circuit 100 to send a "Bye" message of the type shown in FIG. 33 to the media relay 17 to cause the media relay to delete the caller and callee sockets it established for the call and to delete the bridge between the sockets.

While specific embodiments of the invention have been described and illustrated, such embodiments should be considered illustrative of the invention only and not as limiting the invention as construed in accordance with the accompanying claims.

What is claimed is:

1. A process for routing emergency communications having a caller identifier associated with a caller and a callee identifier associated with a callee, the process comprising:

receiving a routing request including the caller identifier and the callee identifier;

using the caller identifier to identify a unique dialing profile associated with the caller from among a plurality of dialing profiles that are persistently stored in a memory, each dialing profile associated with a particular caller, and each dialing profile including an emergency call identifier and an emergency response center identifier both having been assigned to each particular caller, wherein the emergency call identifier is selected and stored in the dialing profile corresponding to each particular caller prior to any emergency call being made, and wherein each dialing profile includes a username and a user domain, wherein the emergency call identifier is one among a set of predefined emergency call identifiers, each predefined emergency call identifier being exclusive to one or more countries;

when said callee identifier matches said emergency call identifier:

producing a routing message for receipt by a call controller operable to cause a route to be established between the caller and an emergency response center, said routing message having a first portion and a second portion, said first portion including said emergency response center identifier; and initiating a search of a direct inward dial (DID) database for a DID record associating a DID identifier with said caller, wherein each of the DID records stored in the DID database comprise a username, a user domain and a DID identifier, and wherein each particular caller has optionally been pre-assigned to one of the DID records stored in the DID database, and when said search finds a DID record having the same username and user domain as the dialing profile of the particular caller and associating a DID identifier with said caller, causing said second portion to include said DID identifier from said DID record, and when said search does not find a DID record associating a DID identifier with said caller, associating a temporary DID identifier with said caller and causing said second portion to include said temporary DID identifier.

2. The process of claim 1, wherein causing said second portion to include said DID identifier from said DID record comprises copying said DID identifier from said DID record to a DID identifier buffer.

3. The process of claim 2, wherein causing said second portion to include said DID identifier from said DID record comprises causing the contents of said DID identifier buffer to define said DID identifier in said second portion of said routing message.

4. The process of claim 1, wherein associating said temporary DID identifier with said caller comprises associating with said caller identifier a DID identifier from a pool of pre-determined DID identifiers.

5. The process of claim 4, wherein associating said DID identifier from said pool comprises associating a temporary DID record with said caller, said temporary DID record having a DID identifier field populated with said DID identifier from said pool.

6. The process of claim 5, wherein associating said DID identifier from said pool comprises copying said DID identifier from said temporary DID record to a DID identifier buffer.

7. The process of claim 6, wherein causing said second portion of said routing message to include said temporary DID identifier comprises causing the contents of said DID identifier buffer to define said temporary DID identifier in said routing message.

8. The process of claim 5, further comprising canceling said temporary DID record after a pre-defined period of time.

9. The process of claim 1, wherein producing said routing message comprises copying an emergency response center identifier from an emergency response center identifier field of said dialing profile associated with said caller to a routing message buffer such that the emergency response center identifier is included in the routing message.

10. The process of claim 1, wherein producing said routing message further comprises causing said routing message to specify a maximum call time for said emergency call, said maximum call time being greater than a pre-defined call time.

11. The process of claim 1, wherein the emergency response center identifier is associated with the emergency response center.

12. The process of claim 1, wherein the DID record associating a DID identifier with said caller is pre-assigned.

13. The process of claim 12, wherein each pre-assigned DID record is assigned at a time of caller registration or subscription.

14. The process of claim 12, wherein said pre-assigned DID record is assigned to said caller prior to any emergency call being made by said caller.

15. The process of claim 1, wherein the temporary DID identifier is obtained from a list of predetermined DID identifiers using a read pointer to address the list so as to obtain the DID identifier from the list, and wherein the list is a separate structure from the DID database.

16. The process of claim 1, wherein the temporary DID identifier associated with the caller populates a temporary DID record stored in the DID database, wherein the temporary DID record is valid for a pre-defined period of time.

17. An apparatus for routing emergency communications having a caller identifier associated with a caller and a callee identifier associated with a callee, the apparatus comprising:

means for receiving a routing request including the caller identifier and the callee identifier;

means for using the caller identifier to identify a unique dialing profile associated with the caller from among a plurality of dialing profiles that are persistently stored in a memory, each dialing profile associated with a particular caller, and each dialing profile including an emergency call identifier and an emergency response center identifier both having been assigned to each particular caller, wherein the emergency call identifier is selected and stored in the dialing profile corresponding to each particular caller prior to any emergency call being made, and wherein each dialing profile includes a username and a user domain, wherein the emergency call identifier is one among a set of predefined emergency call identifiers, each predefined emergency call identifier being exclusive to one or more countries;

means for determining whether said callee identifier matches said emergency call identifier:

means for producing a routing message, when said callee identifier matches said emergency call identifier, said routing message being prepared for receipt by a call controller operable to cause a route to be established between the caller and an emergency response center, said routing message having a first portion and a second portion, said first portion including said emergency response center identifier;

means for initiating a search of a direct inward dial (DID) database for a DID record associating a DID identifier with said caller, wherein each of the DID records stored in the DID database comprise a username, a user domain and a DID identifier, and wherein each particular caller has optionally been pre-assigned to one of the DID records stored in the DID database;

means for causing said second portion to include said DID identifier from said DID record when said search finds a DID record having the same username and user domain as the dialing profile of the particular caller and associating a DID identifier with said caller;

means for associating a temporary DID identifier with said caller when said search does not find a DID record associating a DID identifier with said caller; and means for causing said second portion to include said temporary DID identifier.

18. The apparatus of claim 17, wherein said means for using the caller identifier comprises means for accessing a dialing profile database of dialing profiles associated with respective subscribers to said system to identify said dialing profile associated with said caller.

19. The apparatus of claim 18, further comprising a DID identifier buffer and wherein said means for causing said second portion to include said DID identifier from said DID record comprises means for copying said DID identifier from said DID record to said DID identifier buffer.

20. The apparatus of claim 19, wherein said means for causing said second portion to include said DID identifier from said DID record comprises means for causing the contents of said DID identifier buffer to define said DID identifier in said second portion.

21. The apparatus of claim 17, further comprising means for accessing a pool of pre-determined DID identifiers and wherein said means for associating said temporary DID identifier with said caller comprises means for associating a DID identifier from said pool of pre-determined DID identifiers with said caller identifier.

22. The apparatus of claim 21, wherein said means for associating said DID identifier from said pool comprises means for associating a temporary DID record with said caller, said temporary DID record having a DID identifier field populated with said DID identifier from said pool.

23. The apparatus of claim 22, wherein said means for associating said temporary DID identifier comprises means for copying said DID identifier from said temporary DID record to a DID identifier buffer.

24. The apparatus of claim 23, wherein said means for causing said second portion to include said temporary DID identifier comprises means for causing the contents of said DID identifier buffer to define said temporary DID identifier in said second portion.

25. The apparatus of claim 22, further comprising means for canceling said temporary DID record after a period of time.

26. The apparatus of claim 17, further comprising a routing message buffer and means for copying the contents of an emergency response center identifier field of said dialing profile associated with said caller to said routing message buffer such that said contents of said emergency response center identifier field are included as said emergency response center identifier in said routing message.

27. The apparatus of claim 17, wherein said means for producing said routing message further comprises means for causing said routing message to include a maximum call time for said emergency call, said maximum call time being greater than a pre-defined call time.

28. The apparatus of claim 17, wherein the emergency response center identifier is associated with the emergency response center.

29. An apparatus for routing emergency communications having a caller identifier associated with a caller and a callee identifier associated with a callee, the apparatus comprising a processor circuit operably configured to:
  receive a routing request including the caller identifier and the callee identifier;
  cause a data storage to be searched using the caller identifier to identify a unique dialing profile associated with the caller from among a plurality of dialing profiles that are persistently stored in a memory, each dialing profile associated with a particular caller, and each dialing profile including an emergency call identifier and an emergency response center identifier both having been assigned to each particular caller, wherein the emergency call identifier is selected and stored in the dialing profile corresponding to each particular caller prior to any emergency call being made, and wherein each dialing profile includes a username and a user domain,
  wherein the emergency call identifier is one among a set of predefined emergency call identifiers, each predefined emergency call identifier being exclusive to one or more countries;
  when said callee identifier matches said emergency call identifier:
    produce a routing message for receipt by a call controller operable to cause a route to be established between the caller and an emergency response center, said routing message having a first portion and a second portion, said first portion including said emergency response center identifier; and
    initiate a search of a direct inward dial (DID) database for a DID record associating a DID identifier with said caller, wherein each of the DID records stored in the DID database comprise a username, a user domain and a DID identifier, and wherein each particular caller has optionally been pre-assigned to one of the DID records stored in the DID database, and
    when said search finds a DID record having the same username and user domain as the dialing profile of the particular caller and associating a DID identifier with said caller, cause said second portion to include said DID identifier from said DID record, and
    when said search does not find a DID record associating a DID identifier with said caller, associate a temporary DID identifier with said caller and cause said second portion to include said temporary DID identifier.

30. The apparatus of claim 29, wherein said processor circuit is operably configured to copy said DID identifier from said DID record to a DID identifier buffer.

31. The apparatus of claim 30, wherein said processor circuit is operably configured to cause the contents of said DID identifier buffer to define said DID identifier in said routing message.

32. The apparatus of claim 29, wherein said processor circuit is operably configured to associate with said caller identifier a DID identifier from a pool of pre-determined DID identifiers.

33. The apparatus of claim 32, wherein said processor circuit is operably configured to associate a temporary DID record with the caller, said temporary DID record having a DID identifier field populated with said DID identifier from said pool.

34. The apparatus of claim 33, wherein said processor circuit is operably configured to copy said temporary DID identifier from said temporary DID record to a DID identifier buffer.

35. The apparatus of claim 34, wherein said processor circuit is operably configured to cause the contents of said DID identifier buffer to define said temporary DID identifier in said routing message.

36. The apparatus of claim 33, wherein said processor circuit is operably configured to cancel said temporary DID record after a period of time.

37. The apparatus of claim 29, further comprising a routing message buffer and wherein said processor circuit is operably configured to copy an emergency response center identifier from said dialing profile associated with said caller to said routing message buffer such that said emergency response center identifier is included in said routing message.

38. The apparatus of claim 29, wherein said processor circuit is operably configured to cause said routing message to include a maximum call time for said emergency call, said maximum call time being greater than a pre-defined call time.

39. The apparatus of claim 29, wherein the emergency response center identifier is associated with the emergency response center.

40. A non-transitory computer readable medium encoded with codes for directing a processor circuit to route emergency communications having a caller identifier associated with a caller and a callee identifier associated with a callee, the computer readable medium being encoded with codes for directing the processor circuit to:
  receive a routing request including the caller identifier and the callee identifier;
  use the caller identifier to identify a unique dialing profile associated with the caller from among a plurality of dialing profiles that are persistently stored in a memory, each dialing profile associated with a particular caller, and each dialing profile including an emergency call identifier and an emergency response center identifier both having been assigned to each particular caller, wherein the emergency call identifier is selected and stored in the dialing profile corresponding to each particular caller prior to any emergency call being made, and wherein each dialing profile includes a username and a user domain,
  wherein the emergency call identifier is one among a set of predefined emergency call identifiers, each predefined emergency call identifier being exclusive to one or more countries;
  produce a routing message, when said callee identifier matches said emergency call identifier, for receipt by a call controller operable to cause a route to be established between the caller and an emergency response center, said routing message having a first portion and a second portion, said first portion including said emergency response center identifier;
  initiate a search of a direct inward dial (DID) database for a DID record associating a DID identifier with said caller, wherein each of the DID records stored in the DID database comprise a username, a user domain and a DID identifier, and wherein each particular caller has optionally been pre-assigned to one of the DID records stored in the DID database;
  cause said second portion to include said DID identifier from said DID record when said search finds a DID record having the same username and user domain as the dialing profile of the particular caller and associating a DID identifier with said caller; and
  associate a temporary DID identifier with said caller and cause said second portion to include said temporary DID identifier when said search does not find a DID record associating a DID identifier with said caller.

41. The non-transitory computer readable medium of claim 40, wherein the emergency response center identifier is associated with the emergency response center.

* * * * *

UNITED STATES PATENT AND TRADEMARK OFFICE
CERTIFICATE OF CORRECTION

PATENT NO. : 9,565,307 B2
APPLICATION NO. : 13/968217
DATED : February 7, 2017
INVENTOR(S) : Johan Emil Viktor Björsell et al.

It is certified that error appears in the above-identified patent and that said Letters Patent is hereby corrected as shown below:

On the Title Page

Item (72), (Inventors) at Lines 2-3, Change "New Warminster" for Maksym Sobolyev to --New Westminster--.

In Column 1 (page 6, item (56)) at Line 50, Under Other Publications, after "U.S." insert --Provisional--.

In Column 2 (page 6, item (56)) at Line 40, Under Other Publications, change "-callflowS-" to -- -callflows- --.

In Column 2 (page 6, item (56)) at Line 40, Under Other Publications, change "Feb. 1, 2002, No. 3, Feb. 1, 2002," to --Feb. 1, 2002,--.

In Column 2 (page 6, item (56)) at Line 43, Under Other Publications, change "ViOP" to --VoIP--.

In Column 2 (page 6, item (56)) at Line 52, Under Other Publications, change "/Roarning," to --/Roaming,--.

In Column 2 (page 6, item (56)) at Line 64, Under Other Publications, change "ISRAM" to --ISCRAM--.

In Column 2 (page 7, item (56)) at Line 49, Under Other Publications, change "Talktone" to --Talkatone--.

In Column 2 (page 7, item (56)) at Line 52, Under Other Publications, before "and" insert --Vodafone in the UK;--.

In Column 1 (page 8, item (56)) at Line 15, Under Other Publications, after "U.S." insert --Provisional--.

Signed and Sealed this
Twenty-sixth Day of June, 2018

Andrei Iancu
*Director of the United States Patent and Trademark Office*

CERTIFICATE OF CORRECTION (continued)
U.S. Pat. No. 9,565,307 B2

In Column 2 (page 8, item (56)) at Line 19, Under Other Publications, change "4361." to --436.7.--.

In the Drawings

Sheet 7 of 22 (Reference Numeral 382, FIG. 8B) at Line 4, Change "staring" to --starting--.

Sheet 13 of 22 (Reference Numeral 274, FIG. 13) at Line 1, Change "E164#" to --E.164#--.

Sheet 15 of 22 (Reference Numeral 512, FIG. 19) at Line 2, Change "on" to --one--.

Sheet 19 of 22 (Reference Numeral 906, FIG. 33) at Line 1, Change "string@IP))" to --string@IP)--.

In the Specification

In Column 1 at Line 35, Change "presended" to --presented--.

In Column 2 at Line 33, Change "~n" to --an--.

In Column 8 at Line 20, Change "outing" to --routing--.

In Column 9 at Line 65, Change "keypad. For" to --keypad, for--.

In Column 11 at Line 31, Change "110" to --I/O--.

In Column 11 at Line 40, Change "110" to --I/O--.

In Column 14 at Line 65, After "respectively" insert --.--.

In Column 15 at Lines 57-58, Above "IDD Testing" delete "FIG. 8B".

In Column 25 at Line 31, After "PSTN" insert --.--.